US010529038B2

(12) United States Patent
Baker

(10) Patent No.: US 10,529,038 B2
(45) Date of Patent: Jan. 7, 2020

(54) DYNAMIC INTERSTITIAL HOTELS AND RELATED TECHNOLOGY

(71) Applicant: Theodore W. Baker, Portland, OR (US)

(72) Inventor: Theodore W. Baker, Portland, OR (US)

(73) Assignee: Spacement Inc., Portland, OR (US)

( * ) Notice: Subject to any disclaimer, the term of this patent is extended or adjusted under 35 U.S.C. 154(b) by 770 days.

(21) Appl. No.: 15/140,785

(22) Filed: Apr. 28, 2016

(65) Prior Publication Data

US 2018/0293675 A1    Oct. 11, 2018

Related U.S. Application Data

(60) Provisional application No. 62/154,209, filed on Apr. 29, 2015.

(51) Int. Cl.
*E04B 1/348* (2006.01)
*G06Q 50/12* (2012.01)
*G06Q 10/02* (2012.01)

(52) U.S. Cl.
CPC ............ *G06Q 50/12* (2013.01); *G06Q 10/02* (2013.01)

(58) Field of Classification Search
CPC ... E04B 1/34869; E04B 1/34807; A47K 4/00; E04H 1/04; E04H 1/005
See application file for complete search history.

(56) References Cited

U.S. PATENT DOCUMENTS

| 2,638,635 | A |   | 5/1953  | Priebe                      |
|-----------|---|---|---------|-----------------------------|
| 2,644,203 | A |   | 7/1953  | Donahue                     |
| 3,603,047 | A |   | 9/1971  | Tournler                    |
| 3,900,994 | A | * | 8/1975  | Van der Lely ...... E04B 1/34815 52/67 |
| 4,181,347 | A | * | 1/1980  | Clark ................... A61B 6/4405 280/763.1 |
| 4,268,925 | A |   | 5/1981  | Marple                      |
| 4,464,877 | A | * | 8/1984  | Gebhardt ................. E04B 1/35 52/236.7 |
| 4,630,664 | A | * | 12/1986 | Magro ..................... E06B 9/15 160/232 |

(Continued)

OTHER PUBLICATIONS http://web.archive.org/web/20140718040353/http://www.templehotels.ca/properties.asp?region=AB (Year: 2014).*

(Continued)

*Primary Examiner* — Brian E Glessner
*Assistant Examiner* — Daniel J Kenny

(57) ABSTRACT

A hotel in accordance with a particular embodiment of the present technology includes a first lodging unit at a first interior region of a first building, a second lodging unit at a second interior region of a second building, and a third lodging unit at a third interior region of a third building. The first, second, and third interior regions can be purpose-built for respective uses independently selected from a group consisting of retail uses, office uses, restaurant uses, industrial uses, warehouse uses, storage uses, garage uses, and combinations thereof. In the first, second, and third lodging units, the first, second, and third interior regions can be at least substantially reversibly retrofitted for lodging use. The first, second, and third buildings are dispersed among miscellaneous other buildings within an urban area.

20 Claims, 31 Drawing Sheets

(56) References Cited

U.S. PATENT DOCUMENTS

| | | | |
|---|---|---|---|
| 4,745,712 A * | 5/1988 | O'Leary | E04B 1/34869 52/34 |
| 4,745,719 A | 5/1988 | Blankstein et al. | |
| 5,228,984 A | 7/1993 | Lindstrom | |
| 5,265,384 A | 11/1993 | Menke et al. | |
| 5,761,857 A | 6/1998 | Kaufman et al. | |
| 5,931,642 A | 8/1999 | Friedman et al. | |
| 5,979,754 A * | 11/1999 | Martin | G07C 9/00103 235/375 |
| 6,016,636 A | 1/2000 | Caputo | |
| 6,155,012 A | 12/2000 | Halbitte | |
| 6,179,358 B1 | 1/2001 | Hirayama et al. | |
| 6,330,771 B1 | 12/2001 | Hester, Jr. | |
| 7,373,763 B2 * | 5/2008 | Voegele, Jr. | E04C 1/42 52/223.7 |
| 7,779,585 B2 | 8/2010 | Hester, Jr. | |
| 8,474,203 B1 | 7/2013 | Stewart et al. | |
| 8,919,049 B2 | 12/2014 | Meserini | |
| 9,097,030 B1 | 8/2015 | Manterfield | |
| 2003/0140571 A1 | 7/2003 | Muha et al. | |
| 2003/0140572 A1 | 7/2003 | Hertzog et al. | |
| 2003/0233311 A1 * | 12/2003 | Bramnick | G06Q 30/0601 705/37 |
| 2004/0206011 A1 | 10/2004 | Meeker | |
| 2004/0214600 A1 * | 10/2004 | Schechet | H04M 1/0214 455/557 |
| 2006/0157110 A1 | 7/2006 | Yeh | |
| 2007/0051068 A1 | 3/2007 | Towerman et al. | |
| 2008/0115416 A1 | 5/2008 | Clark | |
| 2009/0026196 A1 | 1/2009 | Leedekerken | |
| 2009/0100769 A1 * | 4/2009 | Barrett | A47K 4/00 52/35 |
| 2010/0235206 A1 | 9/2010 | Miller et al. | |
| 2013/0014451 A1 | 1/2013 | Russell et al. | |
| 2013/0335336 A1 | 12/2013 | Esparza et al. | |
| 2014/0327405 A1 | 11/2014 | Carkner | |
| 2015/0300008 A1 | 10/2015 | Gosling et al. | |
| 2015/0354200 A1 * | 12/2015 | Leclerc | E04B 1/34869 52/79.1 |
| 2015/0354201 A1 | 12/2015 | Gruetering | |
| 2016/0002938 A1 | 1/2016 | Vale et al. | |
| 2016/0148237 A1 | 5/2016 | Ifrach et al. | |

OTHER PUBLICATIONS

Epes, James. "Retail space requirement puts apartments into hotel business." Puget Sound Business Journal, Feb. 11, 1994, p. 1+. General OneFile, http://link.galegroup.com/apps/doc/A15198416/ITOF?u=umuser&sid=ITOF&xid=8c7995d5.*

U.S. Appl. No. 15/263,527, filed Sep. 13, 2016, entitled School Spaces Retrofitted for Alternative Uses and Related Technology.

U.S. Appl. No. 15/390,731, filed Dec. 27, 2016, entitled Garages Retrofitted for Alternative Uses and Related Technology.

U.S. Appl. No. 15/456,523, filed Mar. 11, 2017; entitled Commercial Loading, Storage, Parking, and Vehicle-Servicing Spaces Retrofitted for Alternative Uses and Related Technology.

U.S. Appl. No. 15/675,745, filed Aug. 13, 2017, entitled Commercial Storefront Spaces Retrofitted for Alternative Uses and Related Technology.

* cited by examiner

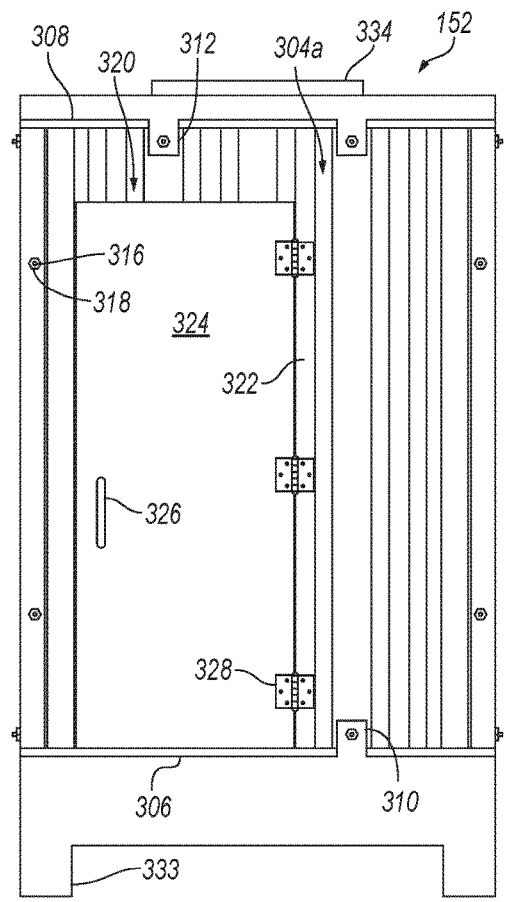
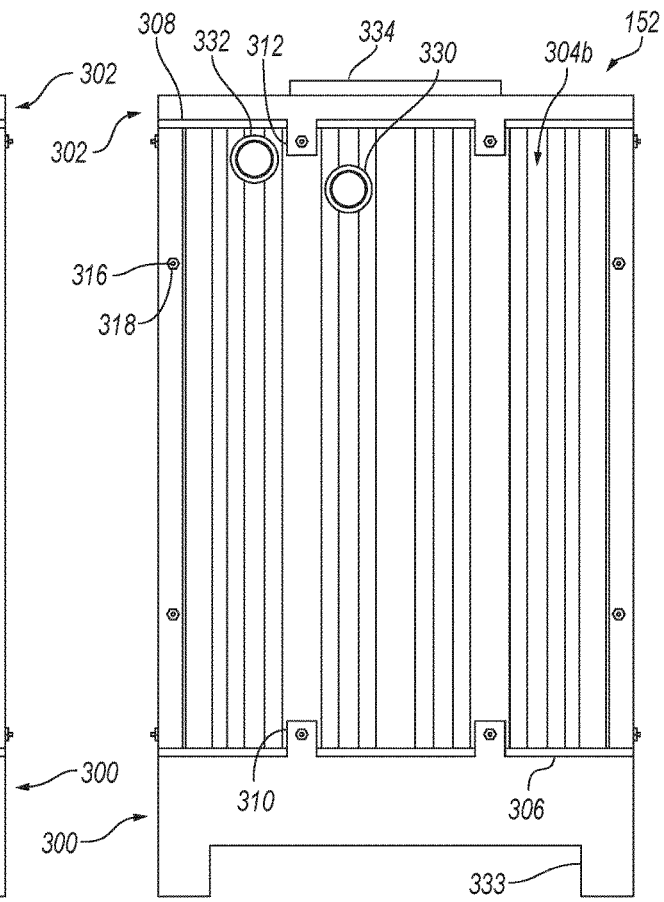
*Fig. 7*  *Fig. 8*
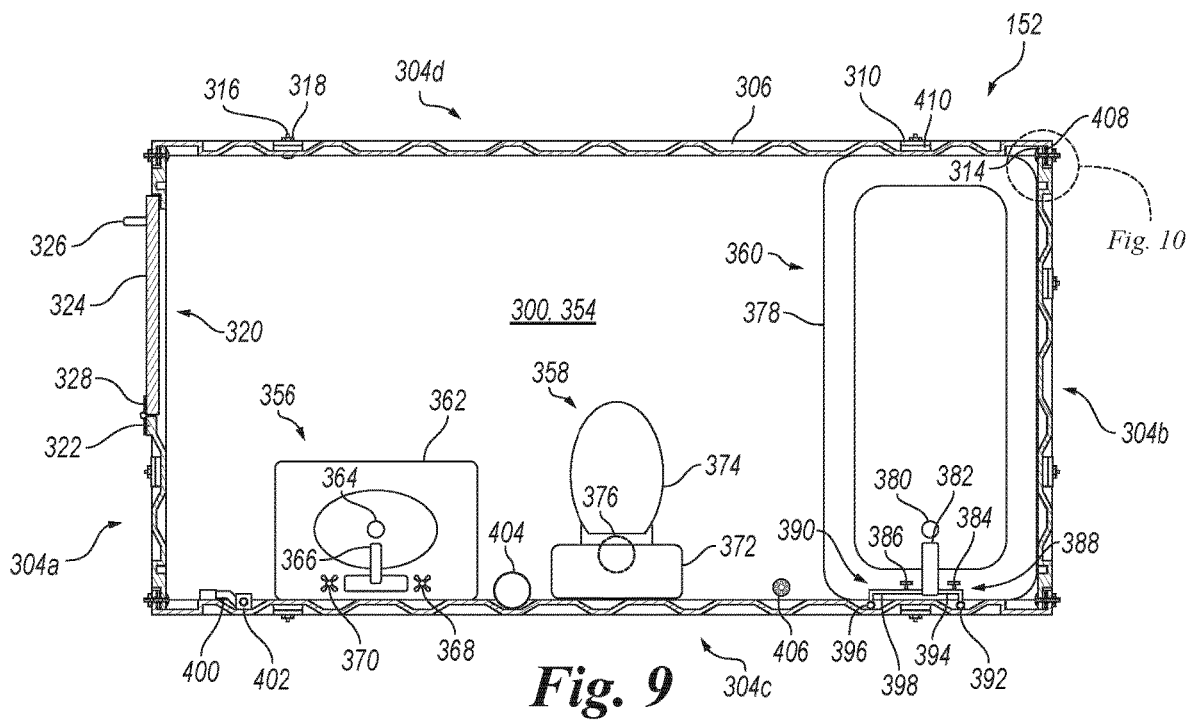
*Fig. 9*

— = LODG. OCCUP.
------ = NON-LODG. OCCUP.
······· = MOVEMENT OF MODULES

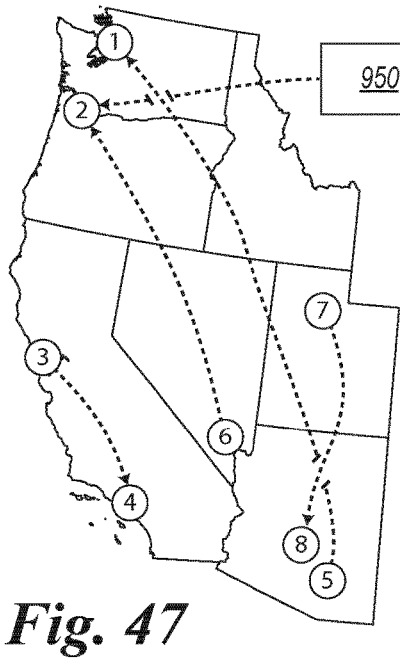

*Fig. 47*

| HOTEL | SEASON | | | | FAVORED MODULE ALLOC. BY FACTOR | | | IMPLEM. MODULE ALLOC. | |
|---|---|---|---|---|---|---|---|---|---|
| | SPRING | SUMMER | FALL | WINTER | SEAS. LODG. OCCUP. | GEN. LODG. OCCUP. TREND | NON-LODG. OCCUP. TREND | EXISTING MODULES | NEW MODULES |
| 1 | | | | | IN | IN | OUT | IN | - |
| 2 | | | | | IN | IN | IN | IN | IN |
| 3 | | | | | IN | OUT | OUT | OUT | - |
| 4 | | | | | IN | OUT | IN | IN | - |
| 5 | | | | | OUT | IN | OUT | OUT | - |
| 6 | | | | | OUT | OUT | IN | OUT | - |
| 7 | | | | | OUT | OUT | OUT | OUT | - |
| 8 | | | | | OUT | IN | IN | IN | - |

— = LODG. OCCUP.
------ = NON-LODG. OCCUP.
······· = MOVEMENT OF MODULES

*Fig. 48*

| HOTEL | SEASON | | | | FAVORED MODULE ALLOC. BY FACTOR | | | IMPLEM. MODULE ALLOC. | |
|---|---|---|---|---|---|---|---|---|---|
| | SPRING | SUMMER | FALL | WINTER | SEAS. LODG. OCCUP. | GEN. LODG. OCCUP. TREND | NON-LODG. OCCUP. TREND | EXISTING MODULES | NEW MODULES |
| 1 | | | | | - | IN | OUT | - | - |
| 2 | | | | | - | IN | IN | - | IN |
| 3 | | | | | - | OUT | OUT | - | - |
| 4 | | | | | - | OUT | IN | - | - |
| 5 | | | | | - | IN | OUT | - | - |
| 6 | | | | | - | OUT | IN | - | - |
| 7 | | | | | - | OUT | OUT | - | - |
| 8 | | | | | - | IN | IN | - | IN |

Fig. 49

Fig. 50

— = LODG. OCCUP.
------ = NON-LODG. OCCUP.
······· = MOVEMENT OF MODULES

| HOTEL | SEASON | | | | FAVORED MODULE ALLOC. BY FACTOR | | | IMPLEM. MODULE ALLOC. | |
|---|---|---|---|---|---|---|---|---|---|
| | SPRING | SUMMER | FALL | WINTER | SEAS. LODG. OCCUP. | GEN. LODG. OCCUP. TREND | NON-LODG. OCCUP. TREND | EXISTING MODULES | NEW MODULES |
| 1 | | | | | OUT | IN | OUT | OUT | - |
| 2 | | | | | OUT | IN | IN | IN | - |
| 3 | | | | | OUT | OUT | OUT | OUT | - |
| 4 | | | | | OUT | OUT | IN | OUT | - |
| 5 | | | | | IN | IN | OUT | IN | - |
| 6 | | | | | IN | OUT | IN | IN | - |
| 7 | | | | | IN | OUT | OUT | OUT | - |
| 8 | | | | | IN | IN | IN | IN | IN |

— = LODG. OCCUP.
------ = NON-LODG. OCCUP.
······· = MOVEMENT OF MODULES

| HOTEL | SEASON | | | | FAVORED MODULE ALLOC. BY FACTOR | | | IMPLEM. MODULE ALLOC. | |
|---|---|---|---|---|---|---|---|---|---|
| | SPRING | SUMMER | FALL | WINTER | SEAS. LODG. OCCUP. | GEN. LODG. OCCUP. TREND | NON-LODG. OCCUP. TREND | EXISTING MODULES | NEW MODULES |
| 1 | | | | | - | IN | OUT | - | - |
| 2 | | | | | - | IN | IN | - | IN |
| 3 | | | | | - | OUT | OUT | - | - |
| 4 | | | | | - | OUT | IN | - | - |
| 5 | | | | | - | IN | OUT | - | - |
| 6 | | | | | - | OUT | IN | - | - |
| 7 | | | | | - | OUT | OUT | - | - |
| 8 | | | | | - | IN | IN | - | IN |

DYNAMIC INTERSTITIAL HOTELS AND RELATED TECHNOLOGY

CROSS-REFERENCE TO RELATED APPLICATION AND LIST OF OTHER APPLICATIONS INCORPORATED BY REFERENCE

This claims the benefit of prior U.S. Provisional Patent Application No. 62/154,209, filed Apr. 29, 2015, which is incorporated herein by reference in its entirety.

The following applications are also incorporated herein by reference in their entireties:

U.S. Patent Application No. 62/222,750, filed Sep. 23, 2015, entitled "School Spaces Retrofitted for Alternative Uses and Related Technology,"

U.S. Patent Application No. 62/273,700, filed Dec. 31, 2015, entitled "Garages Retrofitted for Alternative Uses and Related Technology," and U.S. Patent Application No. 62/310,045, filed Mar. 18, 2016, entitled "Commercial Loading, Storage, Parking, and Vehicle-Servicing Spaces Retrofitted for Alternative Uses and Related Technology."

To the extent the foregoing applications or any other material incorporated herein by reference conflicts with the present disclosure, the present disclosure controls.

TECHNICAL FIELD

This disclosure is related to real estate technology.

BACKGROUND

Building a conventional hotel is capital intensive and slow. Accordingly, short-term changes in demand for lodging do not conventionally lead to rapid changes in lodging capacity. For example, markets with high demand for lodging often suffer from insufficient lodging capacity for years before new conventional hotel projects are approved and completed. Peer-to-peer lodging networks mitigate this problem to some degree, but have other significant disadvantages, such as high transaction costs, inconsistent quality, and regulatory issues. Independent of these problems, valuable real estate in major urban areas is often unutilized or under utilized. For example, even in markets with high demand for retail space, retail storefronts often stay vacant for many months or even years between tenancies. These and other aspects of conventional real estate represent inefficiencies with the potential to be at least partially addressed by innovation.

BRIEF DESCRIPTION OF THE DRAWINGS

Many aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity of illustration, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

FIGS. 5, 6, 7 and 8 are, respectively, a first side profile view, an opposite second side profile view, a first end profile view, and an opposite second end profile view of a bathroom of the lodging unit shown in FIG. 4.

FIG. 9 is a cross-sectional top plan view of the bathroom of the lodging unit shown in FIG. 4 taken along the line 9-9 in FIG. 5.

FIG. 47 is an operational diagram showing spring intake and migration of capital within the network of hotels shown in FIGS. 44 and 45.

FIG. 48 is a operational diagram showing summer intake of capital within the network of hotels shown in FIGS. 44 and 45.

FIG. 49 is a operational diagram showing fall intake and migration of capital within the network of hotels shown in FIGS. 44 and 45.

FIG. 50 is a operational diagram showing winter intake of capital within the network of hotels shown in FIGS. 44 and 45.

DETAILED DESCRIPTION

Figure 1:
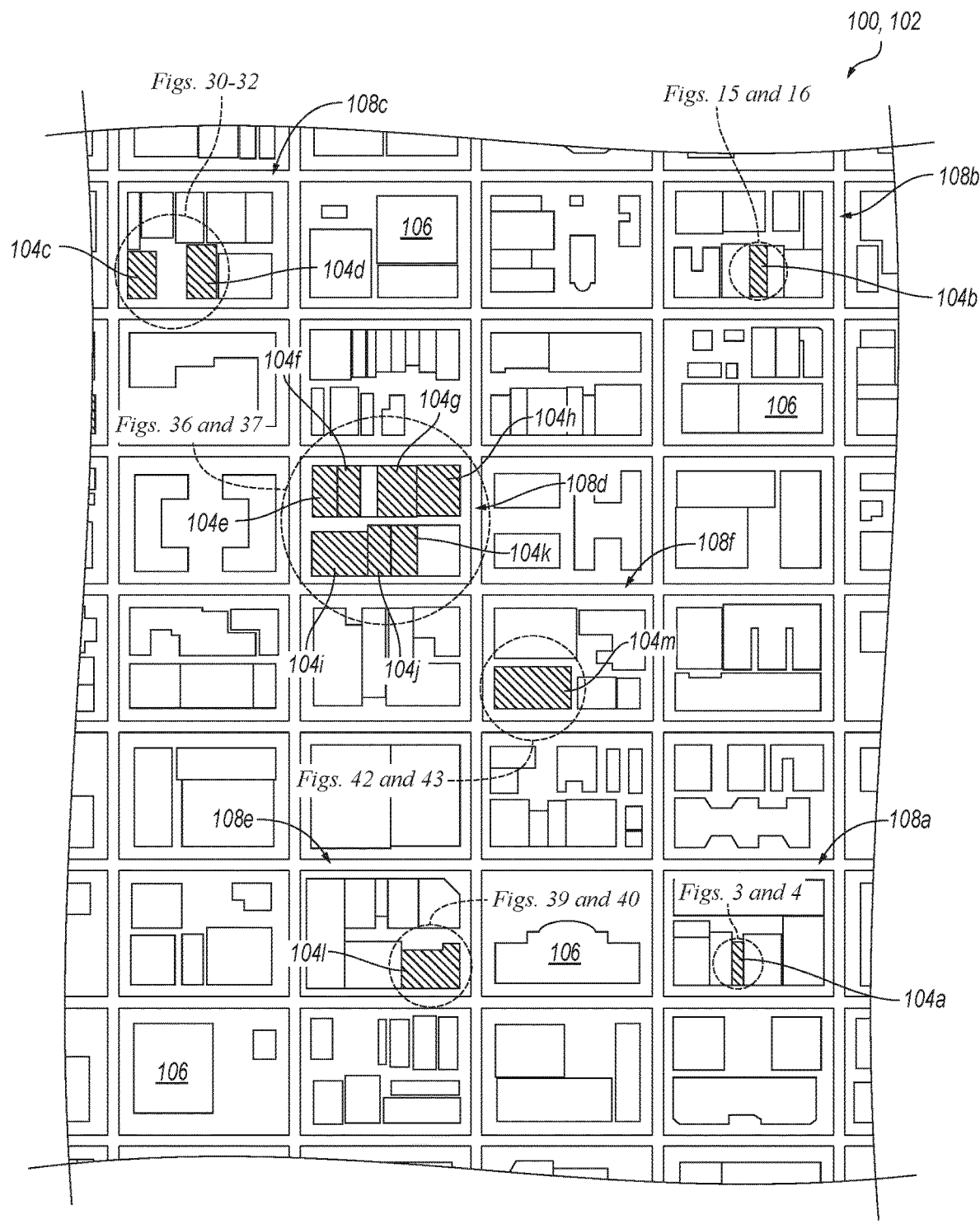
FIG. 1 is a top plan view of an urban area and a hotel in accordance with an embodiment of the present technology at the urban area.

Disclosed herein are examples of dynamic interstitial hotels and related technology. Hotels in accordance with embodiments of the present technology can at least partially address one or more of the problems described above and/or other problems associated with conventional technologies whether or not such problems are stated herein. Hotels in accordance with at least some embodiments of the present technology are dynamic. For example, dynamic hotels can include inventories of lodging units that change over time. In addition or alternatively, hotels in accordance with at least some embodiments of the present technology are interstitial. For example, interstitial hotels can include lodging units (e.g., individual lodging units and/or clusters of lodging units) retrofitted (e.g., at least substantially reversibly retrofitted) at urban interstices.

In association with being interstitial, hotels in accordance with at least some embodiments of the present technology are highly decentralized relative to conventional hotels. Examples of suitable urban interstices include buildings, portions of buildings, land, and other pieces of real estate dispersed among miscellaneous other pieces of real estate in an urban area. Intervening spaces between urban interstices retrofitted for lodging use in accordance with embodiments of the present technology can be public spaces (e.g., public streets, alleys, and sidewalks) and/or privately owned spaces (e.g., unaffiliated private buildings and land). Some of these intervening spaces can serve functions similar to the functions served by common areas (e.g., common corridors, lounges, restaurants, etc.) in conventional hotels. Furthermore, hotels in accordance at least some embodiments of the present technology include lodging units formed at urban interstices that are temporarily or perpetually underutilized. A vacant commercial space, for example, may be a temporarily underutilized urban interstice. An excess portion of an occupied commercial space, for example, may be a perpetually underutilized urban interstice. In addition or alternatively, these and other hotels in accordance embodiments of the present technology can include lodging units formed at urban interstices that are fully utilized before (e.g., immediately before) being retrofitted for use as lodging units.

A hotel in accordance with a particular embodiment of the present technology includes lodging units having reusable bathrooms removably disposed within respective commercial buildings. The bathrooms and/or other suitable components of the lodging units can be configured for low-cost deployment, removal, and redeployment. Use of these components can allow revenue from operating a given one of the lodging units to exceed costs associated with transitioning space within the corresponding commercial building from its purpose-built use (e.g., retail use, office use, restaurant use, industrial use, warehouse use, garage use, etc.) to lodging use even if the given lodging unit is only operated for a short period of time (e.g., less than one year). Thus, an operator of the hotel may lease spaces within commercial buildings short-term (e.g., monthly) from owners of the commercial buildings and retrofit the spaces for provision of lodging to third parties with little or no risk of incurring significant economic loss. Even if the owners terminate the leases or if demand for the newly created lodging units is lower than expected, most of the capital associated with retrofitting the spaces can be recoverable. Furthermore, capital embodied in the components can be readily relocatable in response to long-term and short-term (e.g., seasonal) changes in demand for lodging.

Among various types of real estate, commercial buildings are particularly well suited to be retrofitted to accommodate lodging uses. For example, commercial buildings tend to be unfurnished or sparsely finished in their purpose-built uses, which can facilitate retrofitting. As another example, commercial buildings often have large openings and/or storefronts at ground level. These openings and storefronts can be well suited for use as sources of natural light and/or as points of direct exterior access. As another example, commercial buildings are often vacant for long periods of time between commercial tenancies. Commercial buildings compatible with embodiments of the present technology can have other desirable attributes in addition to or instead of the forgoing attributes. Furthermore, embodiments of the present technology can be implemented in other types of real estate, such as residential garages.

Specific details of several embodiments of the present technology are disclosed herein with reference to FIGS. 1-50. Although these embodiments may be described primarily or entirely in the context of lodging, other use types in addition to lodging are within the scope of the present technology. For example, retrofitted interior regions of buildings in accordance with at least some embodiments of the present technology can be used as offices and/or residential units instead of or in addition to being used as lodging units. Furthermore, the lodging units disclosed herein need not be used exclusively for lodging. In at least some cases, these units can be used primarily as lodging units, but also as offices, residential units, studios, and/or units of one or more other suitable types. It should be noted, in general, that other embodiments in addition to those disclosed herein are within the scope of the present technology. For example, embodiments of the present technology can have different configurations, components, and/or operations than those disclosed herein. Moreover, a person of ordinary skill in the art will understand that embodiments of the present technology can have configurations, components, and/or operations in addition to those disclosed herein and that these and other embodiments can be without several of the configurations, components, and/or operations disclosed herein without deviating from the present technology. The headings provided herein are for convenience only and should not be construed as limiting the subject matter disclosed herein.

FIG. 1 is a top plan view of an urban area 100 and a hotel 102 in accordance with an embodiment of the present technology at the urban area 100. The urban area 100 can include buildings 104 (individually identified as buildings 104a-104m) at which lodging units (not shown in FIG. 1) and other portions of the hotel 102 are respectively located. The buildings 104 can be clustered (e.g., in neighboring pairs or groups) or separate (e.g., surrounded by the miscellaneous other buildings 106). The buildings 104 can have the same or different respective owners. The buildings 104 can be dispersed among the miscellaneous other buildings 106 within the urban area 100. In at least some embodiments, the urban area 100 is mostly or entirely non-residential. For example, the urban area 100 can be a central commercial district, a mostly or entirely retail and/or office district, or a mostly or entirely industrial and/or warehouse district of a greater urban area. Furthermore, the buildings 104 can have a municipal zoning that prohibits residential use and limits lodging use by floor-space allocation. For example, the buildings 104 can have a municipal zoning that limits lodging use to not more than a maximum floor-space allocation area (e.g., a maximum within a range from 1,000 to 8,000 square feet) and/or limits lodging use to not more than maximum floor-space allocation percentage (e.g., a maximum within a range from 10% to 50%). In other embodiments, the urban area 100 can have other suitable predominant use types and/or zoning restrictions.

Figure 2:
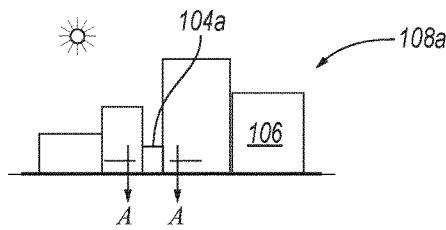
FIG. 2 is a front profile view of a first block of the urban area shown in FIG. 1.
Figure 3:
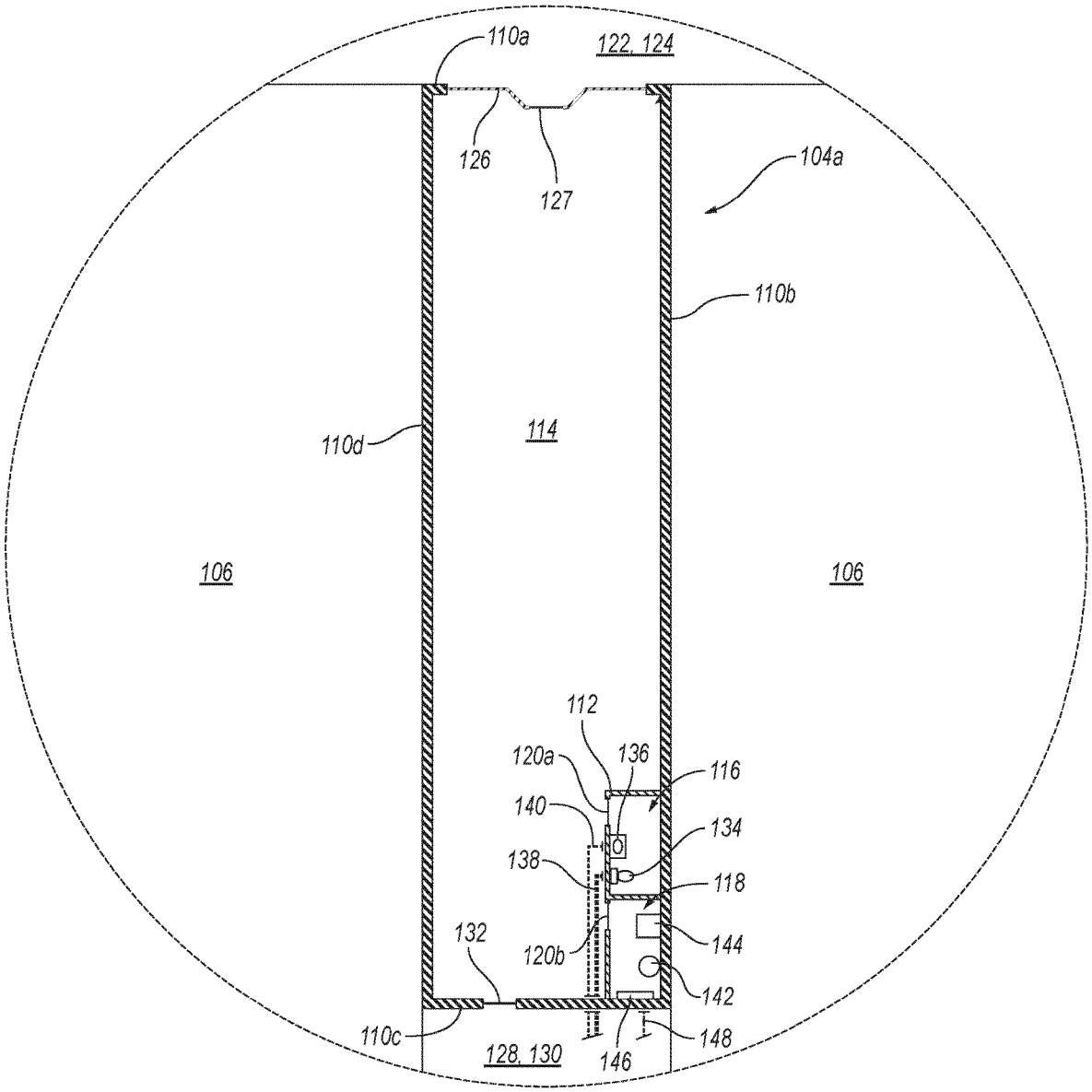
FIG. 3 is a cross-sectional top plan view of a building at the first block of the urban area shown in FIG. 1 taken along the line A-A in FIG. 2 with an interior region within the building in a first state.

The urban area 100 can include blocks 108 (individually identified as blocks 108a-108f) at which the buildings 104 are disposed. FIG. 2 is a front profile view of the block 108a. FIG. 3 is a cross-sectional top plan view of the building 104a at the block 108a taken along the line A-A in FIG. 2. The building 104a can include permanent exterior walls 110 (individually identified as exterior walls 110a-110d), and permanent interior walls 112. Within the exterior walls 110, the building 104a can include an interior region 114. The building 104a can further include a building bathroom 116 and a utility room 118. Opening into the building bathroom 116 and the utility room 118, respectively, the building 104a can include interior doors 120 (individually identified as interior doors 120a, 120b). The exterior wall 110a can be between the interior region 114 and a first outdoor area 122 that includes a sidewalk 124. At the exterior wall 110a, the building 104a can include a storefront 126. The storefront 126 can be heavily fenestrated (e.g., greater than 50% fenestrated by area), and can include a front door 127. The exterior wall 110c can be between the interior region 114 and a second outdoor area 128 that includes a yard 130. At the exterior wall 110c, the building 104a can include a back door 132. In at least some cases, the yard 130 is paved and/or otherwise configured to facilitate automobile parking. Although the exterior wall 110c in the illustrated embodiment is a back wall, in other embodiments a counterpart of the exterior wall 110c can be a side wall.

As shown in FIG. 3, the building bathroom 116 can include a toilet 134 and a sink 136. The building 104a can include a plumbing drain trunk line 138 and a water supply trunk line 140 operably associated with the building bathroom 116. The plumbing drain trunk line 138 can follow a drainage route from the building bathroom 116 toward a sewage destination (e.g., a municipal sewer, not shown). Similarly, the water supply trunk line 140 can follow a supply route from a water source (e.g., a municipal water source, not shown) toward the building bathroom 116. The plumbing drain trunk line 138 can be below-ground, such as positioned below a ground surface outside the building 104a along the drainage route. In addition or alternatively, the plumbing drain trunk line 138 can be below-floor, such as positioned below a finished floor surface of the building 104a along the drainage route. Similarly, the water supply trunk line 140 can be below-ground, such as positioned below a ground surface outside the building 104a along the supply route. In addition or alternatively, the water supply trunk line 140 can be below-floor, such as positioned below a finished floor surface of the building 104a along the supply route.

The plumbing drain trunk line 138 and/or the water supply trunk line 140 can be buried or otherwise permanently installed within a basement, a crawlspace, a chase, a foundation, a volume of dirt, or another suitable environment directly below the building bathroom 116 and/or directly below an area around the building bathroom 116. Furthermore, the plumbing drain trunk line 138 can be sloped to convey liquid waste (e.g., sewage) from the building bathroom 116 toward the sewage destination at least partially by gravity. The water supply trunk line 140 can be configured to convey potable water from the water source to the building bathroom 116 under pressure. In at least some cases, the building 104a includes a building water heater 142 operably associated with the water supply trunk line 140. In these cases, the water supply trunk line 140 can bifurcate into branches (not shown) that supply cold and hot water, respectively, to the building bathroom 116, such as at the sink 136. The building water heater 142 can be operably associated with a branch of the water supply trunk line 140 that supplies hot water to the building bathroom 116. As shown in FIG. 3, the building water heater 142 can be disposed within the utility room 118. The building 104a can include a furnace 144 and an electrical panel 146 also disposed within the utility room 118. The building 104a can further include a main electrical supply line 148 through which the electrical panel 146 is operably connected to an electrical source (e.g., a municipal power source, not shown). Electrical lines and fixtures downstream from the electrical panel 146 are omitted for clarity of illustration.

Figure 4:
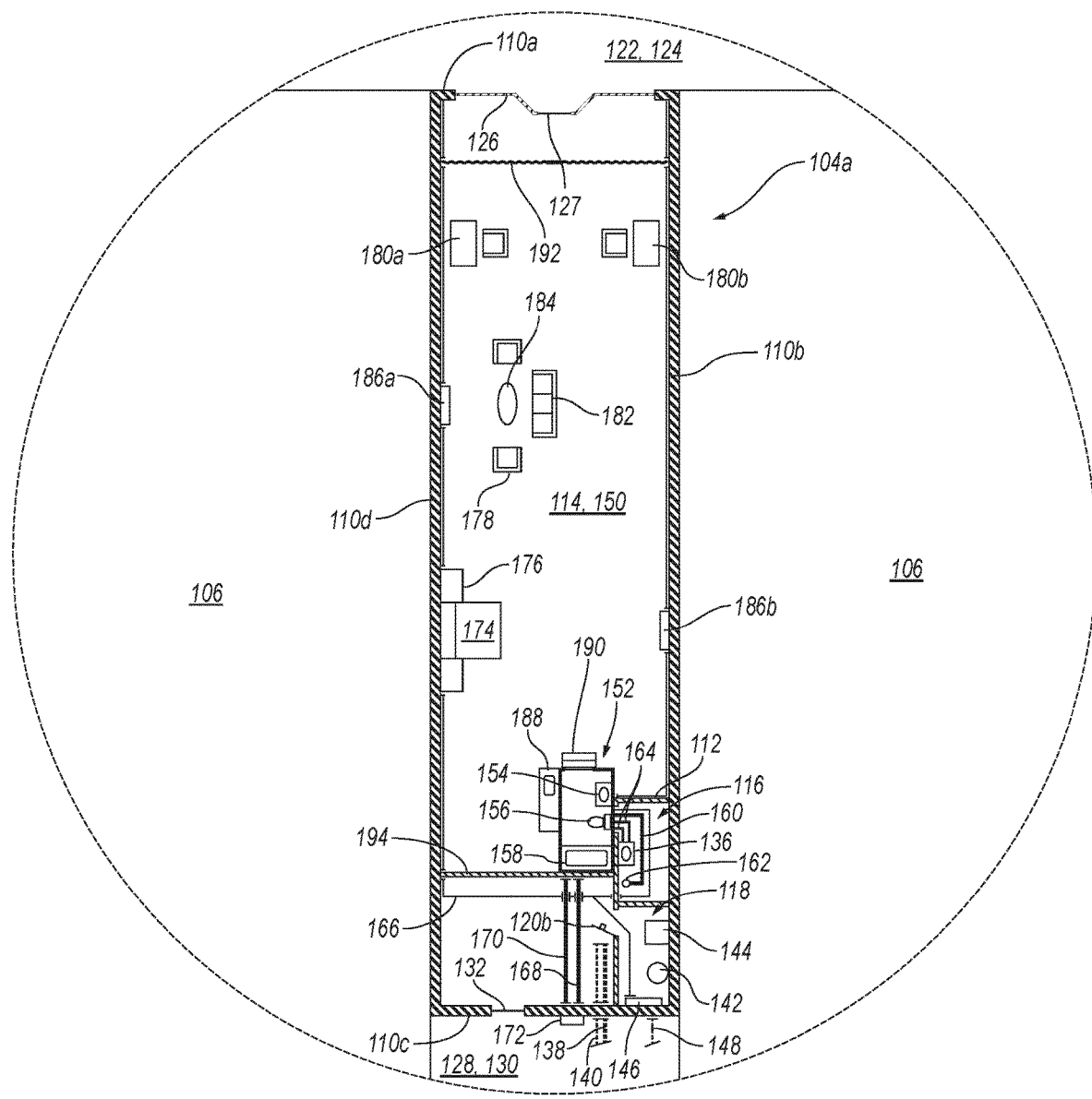
FIG. 4 is a cross-sectional top plan view of the building at the first block of the urban area shown in FIG. 1 taken along the line A-A in FIG. 2 and showing a lodging unit of the hotel shown in FIG. 1, the lodging unit including the interior region within the building in a second state.

In FIG. 3 the interior region 114 is shown in a first state, which can be an original, pre-retrofit, or similar state. In at least some embodiments, the interior region 114 is purpose-built for a use selected from a group consisting of retail use, office use, restaurant use, industrial use, warehouse use, storage use, garage use, and combinations thereof. FIG. 4 is a cross-sectional top plan view of the building 104a taken along the line A-A in FIG. 2 and showing a lodging unit 150 of the hotel 102. The lodging unit 150 can include the interior region 114 in a second state, which can be a non-original, post-retrofit, or similar state. The interior region 114 and the lodging unit 150 can be at a ground floor of the building 104a. In the second state, the interior region 114 can be retrofitted (e.g., at least substantially reversibly retrofitted) for lodging use. The lodging unit 150 can include a variety of retrofits (e.g., at least substantially reversible retrofits) to the building 104a that change at least a portion of the building 104a from being well suited its purpose-built use to being well suited for lodging use. In at least some cases, reversal of all or a portion of these retrofits returns the portion of the building 104a from being well suited for lodging use to again being well suited for its purpose-built use.

Examples of reversible retrofits include removing, installing, and relocating furniture and fixtures with little or no associated demolition of the exterior and interior walls 110, 112 or other permanent fabric of the building 104a. The interior region 114 and other suitable portions of the building 104a can be at least substantially reversibly retrofitted to accommodate the lodging unit 150. For example, a total cost of reversible retrofits to the building 104a (e.g., a present value of at least substantially reversibly installed reusable components of the lodging unit 150) for a given transformation of the interior region 114 from being well suited for a purpose-built use to being well suited for lodging use can be greater (e.g., at least 50% greater or at least 100% greater) than a total cost of permanent retrofits to the building 104a (e.g. modifications to the permanent fabric of the building 104a) for the given transformation. Capital associated with the lodging use can be readily re-deployable after the lodging use becomes inactive. In some cases, the lodging use and the lodging unit 150 are active for less than one year (e.g., six months or less) between successive transformations. In other cases, the lodging use and the lodging unit 150 can have longer durations or even be permanent.

As shown in FIG. 4, the lodging unit 150 can include a bathroom 152 disposed (e.g., removably disposed) within the building 104a. The bathroom 152 can include a sink 154, a toilet 156, and a bath/shower 158. In at least some embodiments, the bathroom 152 is reusable and removably disposed within the building 104a. For example, unlike a conventional bathroom that can only be installed by heavy construction and removed by heavy demolition, the bathroom 152 can be configured to be installed with little or no need for heavy construction and removed with little or no need for heavy demolition. Furthermore, the bathroom 152 can be configured to be conveniently transported and reused after its removal. In the illustrated embodiment, the bathroom 152 is an assembly of reusable bathroom modules configured for rapid deployment into and removal from the building 104a in an at least partially disassembled state. For example, the bathroom 152 can be made up mostly or entirely of reusable modular components. In other embodiments, a counterpart of the bathroom 152 can be portable and configured for rapid deployment into and removal from the building 104a without significant disassembly. This deployment and removal can occur by forklift, by dolly, by operation of wheels integrated into the counterpart of the bathroom 152, or in another manner. In still other embodiments, a counterpart of the bathroom 152 can have other forms.

The lodging unit 150 can further include retrofitted support systems (e.g., retrofitted plumbing). The retrofitted support systems can include an above-floor plumbing drain line 160 through which the bathroom 152 is operably connected to the plumbing drain trunk line 138. The above-floor plumbing drain line 160 can be disposed (e.g., removably disposed) between the bathroom 152 and the building bathroom 116. The interior door 120a can be removed and the bathroom 152 can be adjacent to the building bathroom 116 and positioned such that the above-floor plumbing drain line 160 extends through a doorway from which the interior door 120a was removed. The toilet 134 can also be removed exposing a toilet hookup 162 of the building bathroom 116. The above-floor plumbing drain line 160 can be operably connected to the plumbing drain trunk line 138 via the toilet hookup 162. The retrofitted support systems can further include water supply lines 164 (e.g., hot and cold) through which the bathroom 152 is operably connected to the water supply trunk line 140. For example, the water supply lines 164 can be disposed (e.g., removably disposed) between the bathroom 152 and sink hookups within the building bathroom 116.

The retrofitted support systems can still further include a retrofitted electrical system. For example, the lodging unit 150 can include an electrical line 166 through which the bathroom 152 and outlets (not shown) within the bathroom 152 are operably connected to the electrical panel 146. The electrical line 166 can be disposed (e.g., removably disposed) between the bathroom 152 and the electrical panel 146. The interior door 120b can be propped open (as shown) or removed to allow passage of the electrical line 166 between the bathroom 152 and the electrical panel 146. The lodging unit 150 can further include a plumbing ventilation line 168 and an exhaust line 170 through which the bathroom 152 is operably connected to an exterior of the building 104a. For example, the lodging unit 150 can include an exhaust filter 172 (e.g., containing activated carbon) disposed (e.g., removably disposed) on an exterior surface of the exterior wall 110c, and the plumbing ventilation line 168 and the exhaust line 170 can extend between the bathroom 152 and the exhaust filter 172. The above-floor plumbing drain line 160, the water supply lines 164, the electrical line 166, the plumbing ventilation line 168, and the exhaust line 170 can be temporary and configured for reuse or disposal after the lodging unit 150 is decommissioned. Alternatively, these lines can be permanent.

The lodging unit 150 can be furnished or otherwise outfitted with suitable furnishings, fixtures, accessories, etc. to accommodate lodging use. In the illustrated embodiment, the lodging unit 150 includes a bed 174, side tables 176, upholstered chairs 178, workstations 180 (individually identified as workstations 180a, 180b), a sofa 182, a coffee table 184, monitors 186 (individually identified as monitors 186a, 186b), a kitchenette 188, and a set of step stairs 190. The monitor 186a can be horizontally slidable on a track (not shown) from a location well suited for viewing from the sofa 182 to a location well suited for viewing from the workstation 180a. Similarly, the monitor 186b can be horizontally slidable on a track (not shown) from a location well suited for viewing from the bed 174 to a location well suited for viewing from the workstation 180b. The kitchenette 188 and the set of step stairs 190 can be operably associated with the bathroom 152. The lodging unit 150 can further include a curtain 192 and a partition 194. The curtain 192 can be located inside the storefront 126 and can be closed for privacy. The partition 194 can separate a main portion of the lodging unit 150 from a service area including the utility room 118. In other embodiments, the lodging unit 150 can include other suitable furnishings, fixtures, accessories, etc.

FIGS. 5, 6, 7 and 8 are, respectively, a first side profile view, an opposite second side profile view, a first end profile view, and an opposite second end profile view of the bathroom 152. With reference to FIGS. 5-8 together, the bathroom 152 can include a rectangular floor module 300, a rectangular ceiling module 302 vertically spaced apart from the floor module 300, and a plurality of wall modules 304 (individually identified as wall modules 304a-304d) removably connected to the floor and ceiling modules 300, 302 at respective perimeter portions of the floor and ceiling modules 300, 302. The bathroom 152 can further include a lower gasket 306 disposed between the perimeter portion of the floor module 300 and the wall modules 304, and an upper gasket 308 disposed between the perimeter portion of the ceiling module 302 and the wall modules 304. The floor module 300 can include upwardly extending tabs 310 through which the floor module 300 is secured to the wall modules 304. Similarly, the ceiling module 302 can include downwardly extending tabs 312 through which the ceiling module 302 is secured to the wall modules 304. The wall modules 304c, 304d can include vertical flanges 314 at which the wall modules 304c, 304d are secured to the wall modules 304a, 304b. The bathroom 152 can include bolts 316 and associated nuts 318 at the upwardly extending tabs 310, the downwardly extending tabs 312, and the vertical flanges 314.

At the wall module 304a (FIG. 7), the bathroom 152 can include a doorway opening 320, a frame 322 extending around the doorway opening 320, and a door 324 disposed within the doorway opening 320 and hingedly connected to the frame 322. The bathroom 152 can further include a handle 326 and hinges 328 operably associated with the door 324. At the wall module 304b (FIG. 8), the bathroom 152 can include a plumbing ventilation hookup 330 and an exhaust hookup 332. The plumbing ventilation hookup 330 and the exhaust hookup 332 can be configured for convenient connection to and disconnection from the plumbing ventilation line 168 and the exhaust line 170, respectively, such as via quick release couplings (not shown). The wall modules 304c, 304d can extend between the wall modules 304a, 304b at opposite sides of the bathroom 152. The bathroom 152 can be configured to be elevated above a floor surface of the interior region 114. For this purpose and/or another suitable purpose, the floor module 300 can include feet 333. In at least some embodiments, a gap between the feet 333 is large enough to allow the bathroom 152, when fully assembled, to be conveniently moved by forklift. At the ceiling module 302, the bathroom 152 can include skylights 334 that allow ambient light to enter an interior of the bathroom 152.

At a side of the floor module 300 below the wall module 304c, the bathroom 152 can include a main plumbing drain hookup 335, a main cold water supply hookup 336, and a main hot water supply hookup 338. At an end of the floor module 300 below the wall module 304b, the bathroom 152 can include a main electrical hookup 340. The main plumbing drain hookup 335, the main cold water supply hookup 336, the main hot water supply hookup 338, and the main electrical hookup 340 can be configured for convenient connection to and disconnection from the above-floor plumbing drain line 192, a cold one of the water supply lines 196, a hot one of the water supply lines 196, and the electrical line 198, respectively, such as via quick release couplings (not shown). At a side of the floor module 300 below the wall module 304d, the bathroom 152 can include an auxiliary plumbing drain hookup 342, an auxiliary cold water supply hookup 344, an auxiliary hot water supply hookup 346, and an auxiliary electrical hookup 348. The auxiliary plumbing drain hookup 342, the auxiliary cold water supply hookup 344, the auxiliary hot water supply hookup 346, and the auxiliary electrical hookup 348 can be configured for convenient connection to and disconnection from corresponding lines (not shown) of the kitchenette 188, such as via quick release couplings (not shown).

Figure 5:
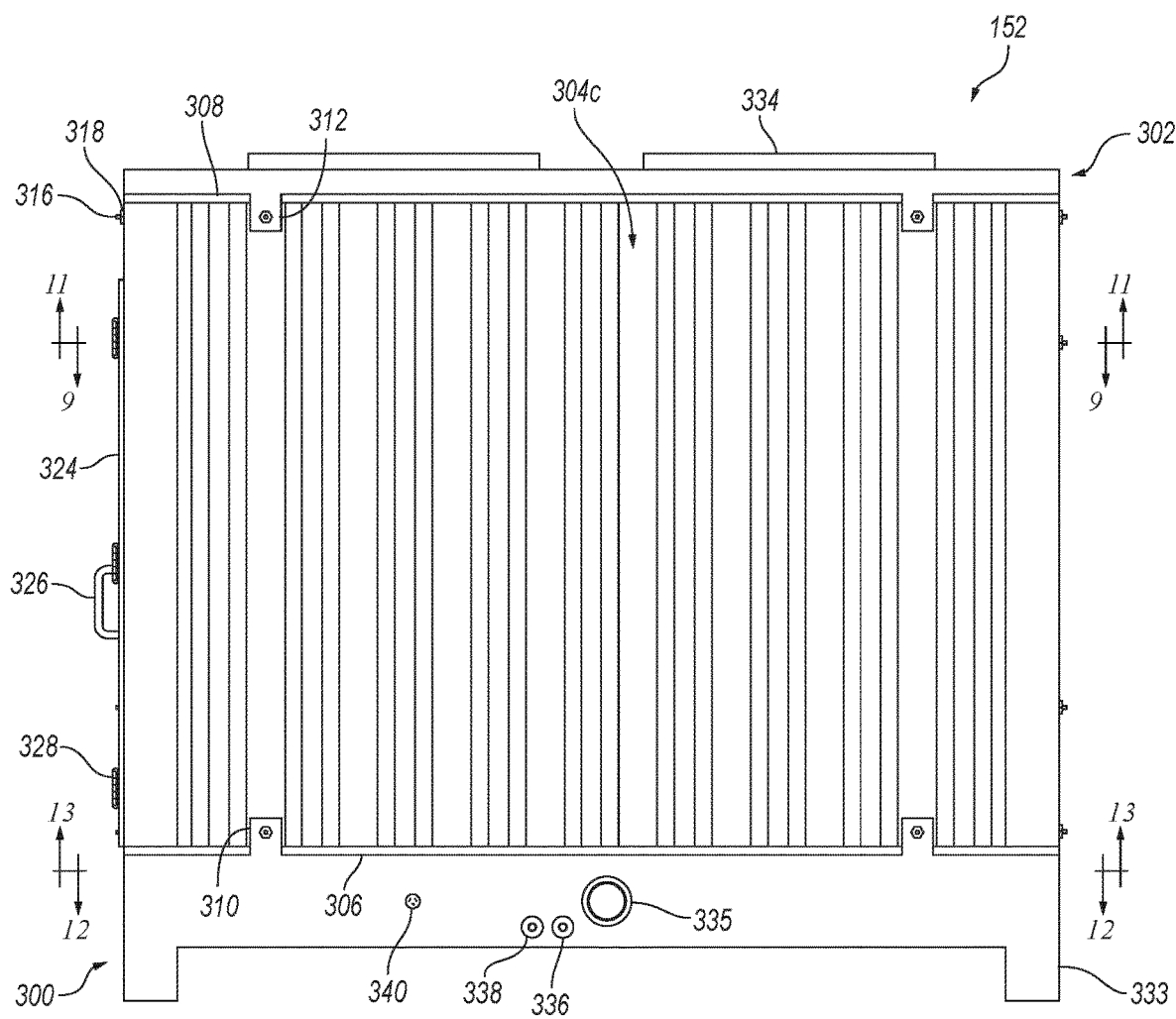
Figure 6:
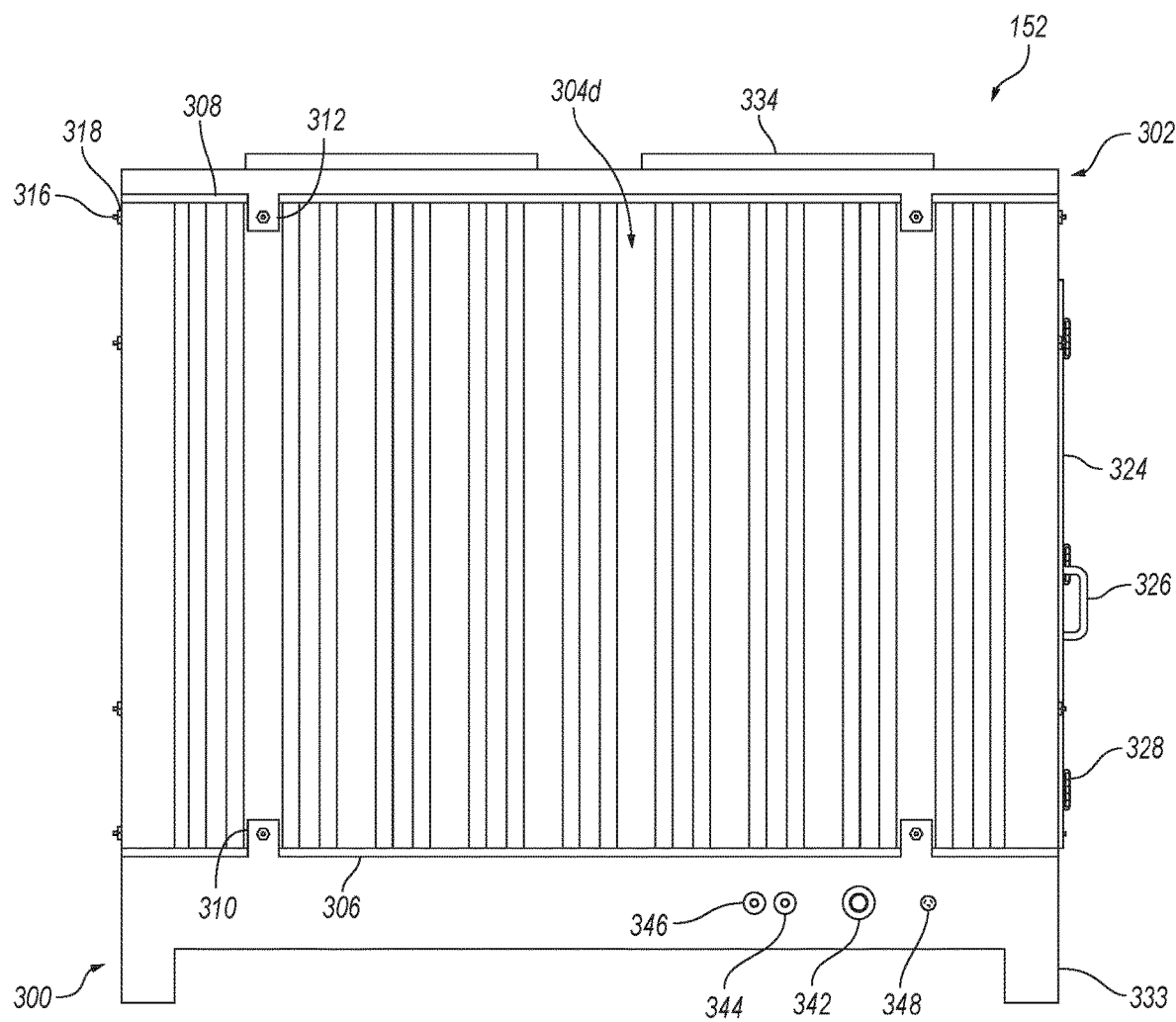

FIG. 9 is a cross-sectional top plan view of the bathroom 152 taken along the line 9-9 in FIG. 5. As shown in FIG. 9, the floor module 300 can include a deck 354, and the bathroom 152 can include a sink 356, a toilet 358, and a bathtub/shower 360 disposed (e.g., removably disposed) on the deck 354. The sink 356 can include a basin 362, a sink drain 364, a sink faucet 366, a sink cold hot knob 368, and a sink cold water knob 370 operably connected to one another. The toilet 358 can include a tank 372, a bowl 374, and a toilet drain 376 operably connected to one another. The bathtub/shower 360 can include a tub 378, a tub drain 380, a tub faucet 382, a tub cold water knob 384, a tub hot water knob 386, a cold water conduit 388, and a hot water conduit 390 operably connected to one another. The cold water conduit 388 can include a riser 392 and a first branch 394 extending between the riser 392 and the tub faucet 382. The tub cold water knob 384 can be disposed along the first branch 394 and operable to control a flow of cold water from the cold water conduit 388 to the tub faucet 382. Similarly, the hot water conduit 390 can include a riser 396 and a first branch 398 extending between the riser 396 and the tub faucet 382. The tub hot water knob 386 can be disposed along the first branch 398 and operable to control a flow of hot water from the hot water conduit 390 to the tub faucet 382.

Figure 10:
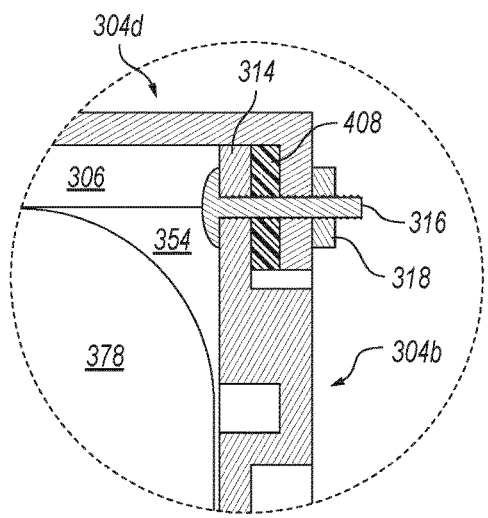
FIG. 10 is an enlarged view of a portion of FIG. 9.

The bathroom 152 can further include an electrical conduit 400, a junction box 402 operably connected to the electrical conduit 400, a plumbing ventilation conduit 404 disposed between the sink 356 and the toilet 358, and a floor drain 406 disposed between the toilet 358 and the bathtub/shower 360. FIG. 10 is an enlarged view of a portion of FIG. 9. With reference to FIGS. 9 and 10 together, the bathroom 152 can include vertical gaskets 408 disposed between the respective vertical flanges 314 and corresponding portions of the wall modules 304a, 304b. Similarly, the bathroom 152 can include lower tab gaskets 410 disposed between the respective upwardly extending tabs 310 and corresponding portions of the wall modules 304.

Figure 11:
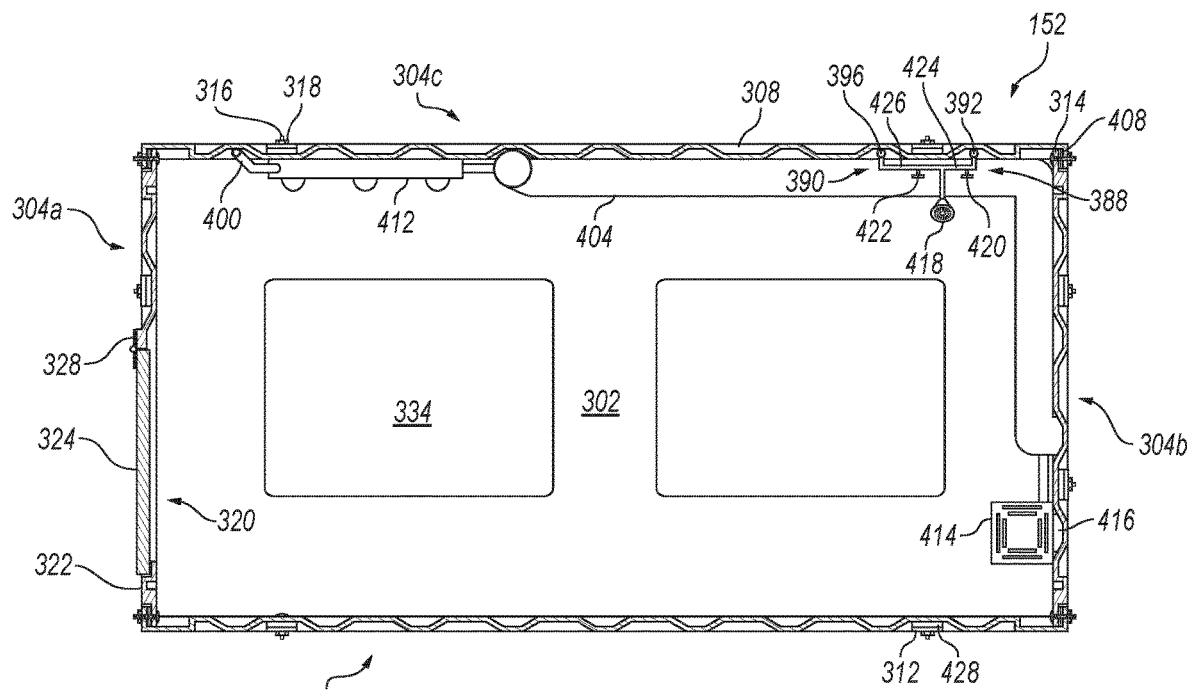
FIG. 11 is a cross-sectional bottom plan view of the bathroom of the lodging unit shown in FIG. 4 taken along the line 11-11 in FIG. 5.

FIG. 11 is a cross-sectional bottom plan view of the bathroom 152 taken along the line 11-11 in FIG. 5. As shown in FIG. 11, the bathroom 152 can include a light fixture 412 attached to the wall module 304c above the sink 356. The bathroom 152 can further include an exhaust intake fan 414 attached to the ceiling module 302. The electrical conduit 400 can extend from the junction box 402 (FIG. 9) to the light fixture 412, and from the light fixture 412 to the exhaust intake fan 414. The plumbing ventilation conduit 404 can extend along an inner corner between the ceiling module 302 and the wall modules 304b, 304c to the plumbing ventilation hookup 330 (FIG. 8). The bathroom 152 can include an exhaust conduit 416 extending between the exhaust intake fan 414 and the exhaust hookup 332 (FIG. 8). Above one end of the tub 378 (FIG. 9), the bathtub/shower 360 (FIG. 9) can include a showerhead 418, a shower cold water knob 420 operably connected to the cold water conduit 388, and a shower hot water knob 422 operably connected to the hot water conduit 390. The cold water conduit 388 can include a second branch 424 extending between the riser 392 and the showerhead 418. The shower cold water knob 420 can be disposed along the second branch 424 and operable to control a flow of cold water from the cold water conduit 388 to the showerhead 418. Similarly, the hot water conduit 390 can include a second branch 426 extending between the riser 396 and the showerhead 418. The shower hot water knob 422 can be disposed along the second branch 426 and operable to control a flow of hot water from the hot water conduit 390 to the showerhead 418. The bathroom 152 can include upper tab gaskets 428 disposed between the respective downwardly extending tabs 312 and corresponding portions of the wall modules 304.

Figure 12:
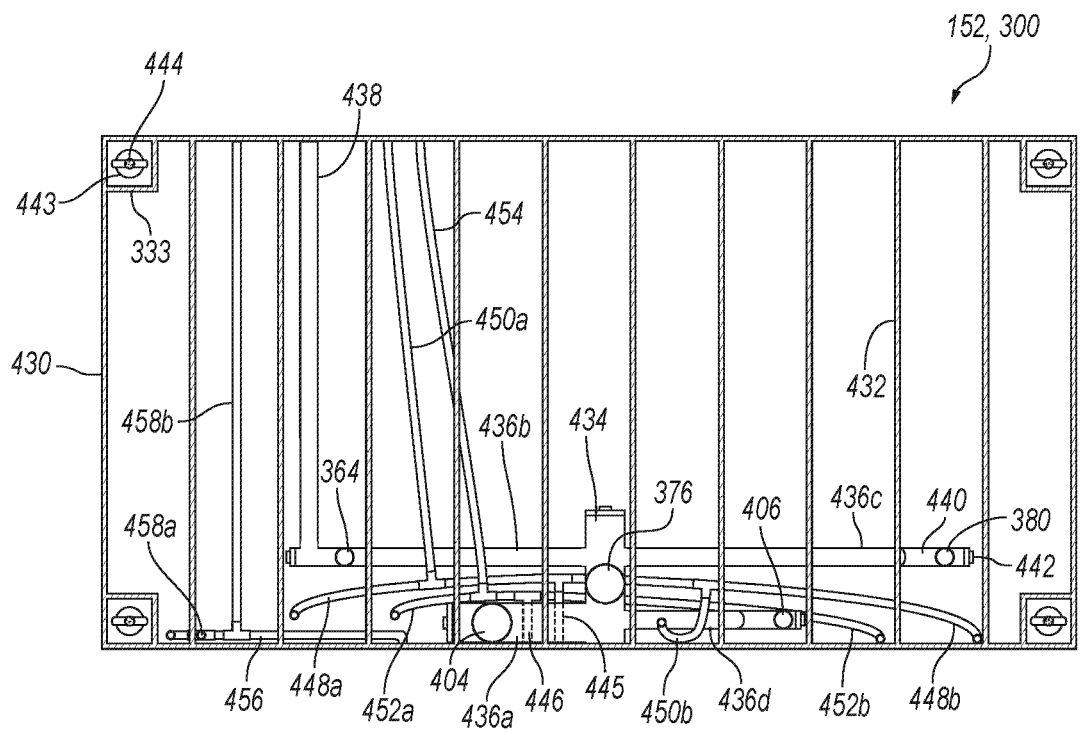
FIG. 12 is a cross-sectional top plan view of the bathroom of the lodging unit shown in FIG. 4 taken along the line 12-12 in FIG. 5.

FIG. 12 is a cross-sectional top plan view of the bathroom 152 taken along the line 12-12 in FIG. 5. With reference to FIGS. 5, 6, 9 and 10 together, the floor module 300 can include a skirt 430 and a series of parallel spaced-apart joists 432 within the skirt 430. The bathroom 152 can include a main plumbing drain conduit 434 operably connected to the main plumbing drain hookup 335 and the toilet drain 376. The main plumbing drain conduit 434 can include branches 436 (individually identified as branches 436a-436d) operably connected to the plumbing ventilation conduit 404, the sink drain 364, the tub drain 380, and the floor drain 406, respectively. The main plumbing drain conduit 434 can further include a sub-branch 438 operably connected to the auxiliary plumbing drain hookup 342 via the branch 436b. The branches 436c, 436d can include respective traps 440. Furthermore, the main plumbing drain conduit 434 and the branches 436 can include respective caps 442. The bathroom 152 can include wheels 443 (e.g., swivel casters) integrated into the floor module 300. In the illustrated embodiment, the wheels 443 are embedded within the feet 333 and accessible via inwardly facing openings (not shown) of the feet 333. The individual wheels 443 can be movable between a retracted state and an extended state. For example, the bathroom 152 can include posts 444 having threads (not shown) that engage corresponding threads (not shown) of the wheels 443 such that the wheels 443 can be rotatably moved between the retracted and extended states. Moving the wheels 443 from the retracted state to the extended state can lift the bathroom 152 off a corresponding floor surface, thereby allowing the bathroom 152 to be conveniently moved along the floor surface.

The bathroom 152 can further include a main cold water conduit 445 and a main hot water conduit 446 operably connected to the main cold water supply hookup 336 and the main hot water supply hookup 338, respectively. The main cold water conduit 445 can include branches 448 (individually identified as branches 448a, 448b) operably connected to the sink 356 and the bathtub/shower 360 (via the riser 392), respectively. The main cold water conduit 445 can further include a sub-branch 450a operably connected to the auxiliary cold water supply hookup 344 via the branch 448a. The main cold water conduit 445 can still further include a sub-branch 450b operably connected to the toilet 358 via the branch 448b. The main hot water conduit 446 can include branches 452 (individually identified as branches 452a, 452b) operably connected to the sink 356 and the bathtub/shower 360 (via the riser 396), respectively. The main hot water conduit 446 can further include a sub-branch 454 operably connected to the auxiliary hot water supply hookup 346 via the branch 452a. The bathroom 152 can still further include a main electrical conduit 456 operably connected to the main electrical hookup 340. The main electrical conduit 456 can include branches 458 (individually identified as branches 458a, 458b) operably connected to the electrical conduit 400 and the auxiliary electrical hookup 348, respectively.

Figure 13:
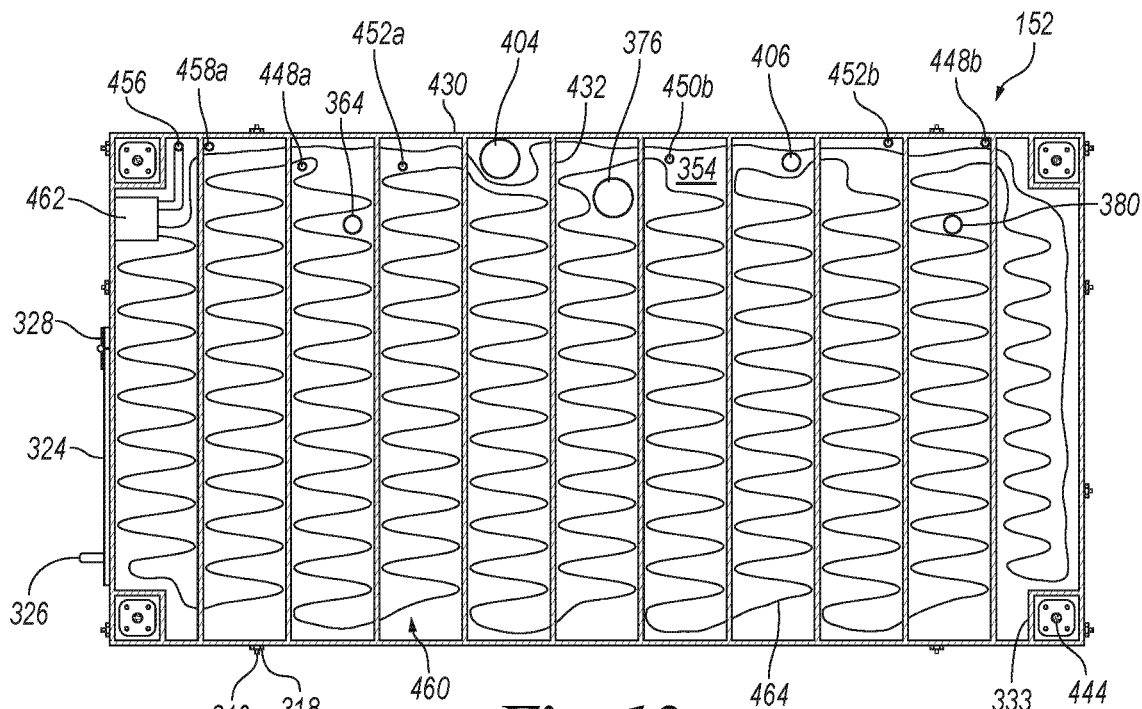
FIG. 13 is a cross-sectional bottom plan view of the bathroom of the lodging unit shown in FIG. 4 taken along the line 13-13 in FIG. 5.

FIG. 13 is a cross-sectional bottom plan view of the bathroom 152 taken along the line 13-13 in FIG. 5. As shown in FIG. 13, the bathroom 152 can include a floor heating system 460 operably associated with the deck 354. The floor heating system 460 can include a control box 462 operably connected to the main electrical conduit 456, and a heating cable 464 operably connected to the control box 462. The heating cable 464 can have a serpentine configuration and be directly connected to an underside of the deck 354 between the joists 432. With reference to FIGS. 5-13 together, the floor drain 406, the main plumbing drain conduit 434 (e.g., including its branches 436 and sub-branch 438), the main cold water conduit 445 (e.g., including its branches 448 and sub-branch 450), the main hot water conduit 446 (e.g., including its branches 452 and sub-branch 454), the main electrical conduit 456 (e.g., including its branches 458), the floor heating system 460, and/or other suitable components of the bathroom 152 can be pre-installed components of the floor module 300. Similarly, the supply plumbing for the bathtub/shower 360 (e.g., including the tub faucet 382, the cold water conduit 388, the hot water conduit 390, and the showerhead 418), the light fixture 412, and/or other suitable components of the bathroom 152 can be pre-installed components of the wall module 304c. These and/or other aspects of the bathroom 152 can facilitate rapid deployment, removal, and redeployment of the bathroom 152.

Figure 14:
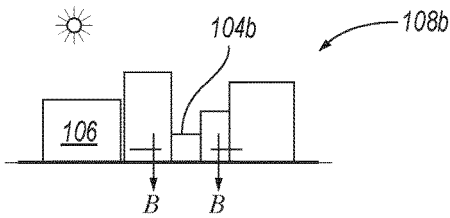
FIG. 14 is a front profile view of a second block of the urban area shown in FIG. 1.
Figure 15:
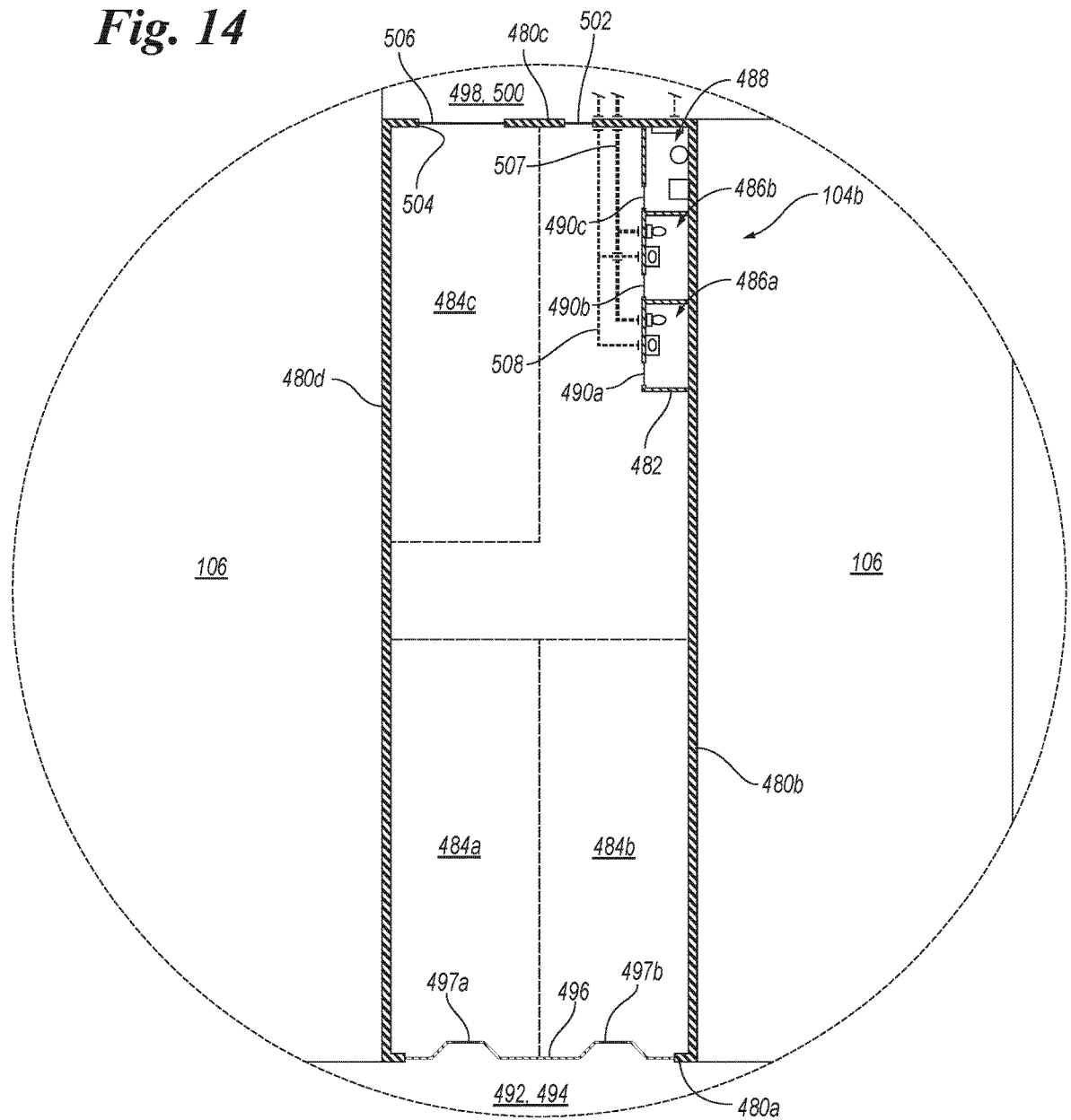
FIG. 15 is a cross-sectional top plan view of a building at the second block of the urban area shown in FIG. 1 taken along the line B-B in FIG. 14 with interior regions within the building in the first state.

FIG. 14 is a front profile view of the block 108b. FIG. 15 is a cross-sectional top plan view of the building 104b at the block 108b taken along the line B-B in FIG. 14. The building 104b can include permanent exterior walls 480 (individually identified as exterior walls 480a-480d), and permanent interior walls 482. Within the exterior walls 480, the building 104b can include interior regions 484 (individually identified as interior regions 484a-484c). In FIG. 15, the interior regions 484 are shown in the first state. In at least some embodiments, the interior regions 484a-484c are purpose-built for respective uses independently selected from a group consisting of retail use, office use, restaurant use, industrial use, warehouse use, storage use, garage use, and combinations thereof. The building 104b can further include building bathrooms 486 (individually identified as building bathrooms 486a, 486b) and a utility room 488. Opening into the building bathroom 486a, the building bathroom 486b, and the utility room 488, respectively, the building 104b can include interior doors 490 (individually identified as interior doors 490a-490c). The exterior wall 480a can be between the interior regions 484a, 484b and a first outdoor area 492 that includes a sidewalk 494. At the exterior wall 480a, the building 104b can include a storefront 496. The storefront 496 can be heavily fenestrated (e.g., greater than 50% fenestrated by area), and can include front doors 497 (individually identified as front doors 497a, 497b).

The exterior wall 480c can be between the interior region 484c and a second outdoor area 498 that includes a yard 500. At the exterior wall 480c, the building 104b can include a back door 502 and an opening 504 between the interior region 484c and the second outdoor area 498. In at least some cases, the yard 500 is paved and/or otherwise configured to facilitate automobile parking. Although the exterior wall 480c in the illustrated embodiment is a back wall, in other embodiments a counterpart of the exterior wall 480c can be a side wall. With reference again to FIG. 15, the opening 504 can be sized to permit loading of large items into the building 104b and/or passage of an automobile between the interior region 484c and the second outdoor area 498. For example, the opening 504 can have a width within a range from 2 to 7 meters (e.g., from 4 to 6 meters). The building 104b can further include an overhead door 506 (e.g., a door that moves upward to open and stows overhead in a rolled or unrolled state) movably disposed at the opening 504. The building 104b can also include a plumbing drain trunk line 507 and a water supply trunk line 508 operably associated with the building bathrooms 486. The plumbing drain trunk line 507 and the water supply trunk line 508 can have features the same as or similar to features of the plumbing drain trunk line 138 and the water supply trunk line 140 of the building 104a described above.

Figure 16:
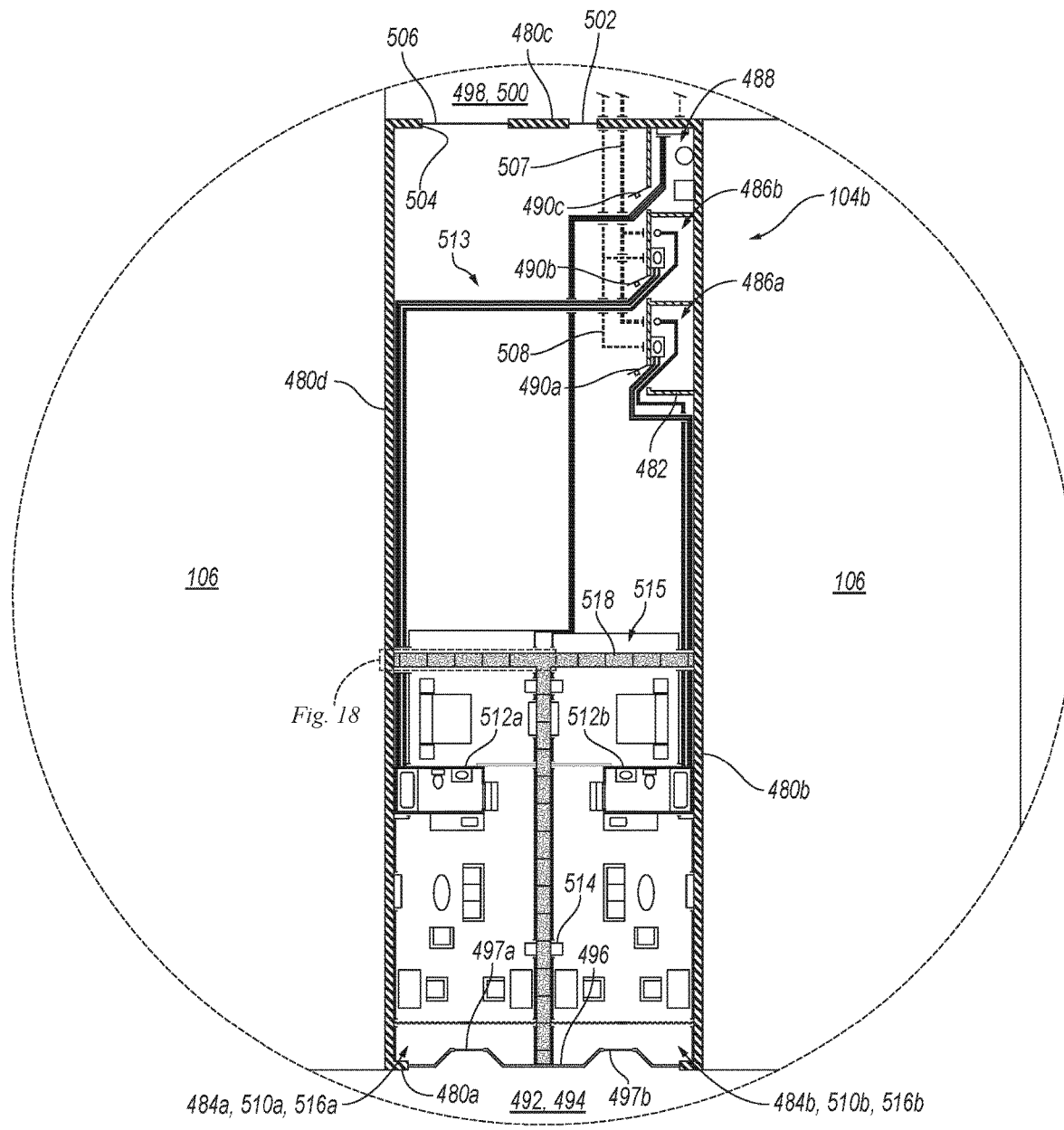
FIG. 16 is a cross-sectional top plan view of the building at the second block of the urban area shown in FIG. 1 taken along the line B-B in FIG. 14 and showing a cluster of lodging units of the hotel shown in FIG. 1, the cluster of lodging units including the interior regions within the building in the second state.

FIG. 16 is a cross-sectional top plan view of the building 104b taken along the line B-B in FIG. 14 and showing a cluster of lodging units 510 (individually identified as lodging units 510a, 510b) of the hotel 102. The lodging units 510a, 510b can include the interior regions 484a, 484b, respectively, in the second state. The interior regions 484 and the lodging units 510 can have features the same as or similar to the features of the interior region 114 and the lodging unit 150 described above. As shown in FIG. 16, the lodging units 510a, 510b can respectively include bathrooms 512 (individually identified as bathrooms 512a, 512b) disposed (e.g., removably disposed) within the building 104b. The bathrooms 512 can have features the same as or similar to the features of the bathroom 152 described above. The cluster of lodging units 510 can further include retrofitted support systems 513 having features the same as or similar to the features of the retrofitted support systems described above for the lodging unit 150. The retrofitted support systems 513 can include retrofitted ventilation lines, retrofitted exhaust lines, and a retrofitted exhaust filter, which are not shown for clarity of illustration. Among other furnishings, the lodging units 510 can include climate-control units 514 (e.g., supplemental heaters) operably connected to the retrofitted support systems 513.

The cluster of lodging units 510 can further include a compartmentalizing assembly 515. The interior regions 484a, 484b can be respectively located within compartments 516 (individually identified as compartments 516a, 516b) at least partially defined by the compartmentalizing assembly 515. The compartmentalizing assembly 515 can include wall components 518 disposed at perimeter portions of the compartments 516. The wall components 518 and/or other suitable components of the compartmentalizing assembly 515 can be reusable and removably disposed within the building 104b. For example, the compartmentalizing assembly 515 can be made up mostly or entirely of reusable modular components. In at least some embodiments, the wall components 518 are stacked and/or interlocking within the compartmentalizing assembly 515.

Figure 17:
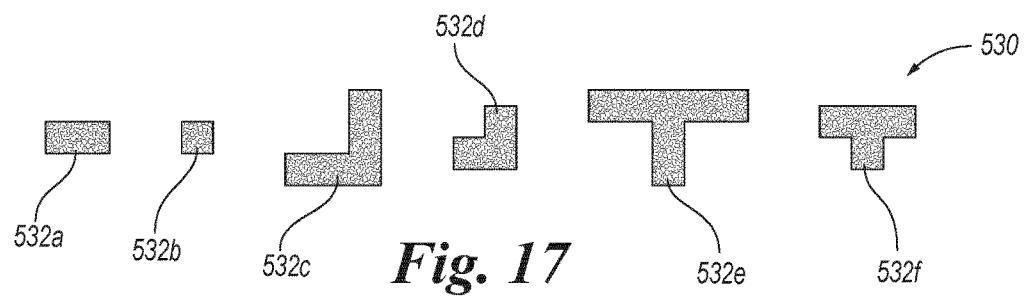
FIG. 17 is top plan view of a set of wall components in accordance with an embodiment of the present technology.

FIG. 17 is top plan view of a set of wall components 530 in accordance with an embodiment of the present technology. The set 530 can include wall components of different types 532 (individually identified as types 532a-532f). Some or all of the wall component types 532 shown in FIG. 17 can be used together to make compartmentalizing assemblies in accordance with embodiments of the present technology, such as the compartmentalizing assembly 515 shown in FIG. 16. With reference to FIGS. 16 and 17 together, the wall components 518 can be of the type 532a in staggered rows of the compartmentalizing assembly 515. At portions of the compartmentalizing assembly 515 closest to the storefront 496 and the exterior walls 480b, 480d, the wall components 518 can be of the type 532b at every other row of the compartmentalizing assembly 515 between wall components 518 of the type 532a. In at least some embodiments, the wall components 518 of the type 532a have rectangular footprints with aspect ratios of 2:1. In these and other embodiments, the wall components 518 of the type 532b can have square footprints. Thus, when seams between the wall components 518 of the type 532a are evenly staggered row-to-row, the wall components 518 of the type 532b can cap the short rows, thereby giving the compartmentalizing assembly 515 vertical end portions at or near the storefront 496 and the exterior walls 480b, 480d. Similarly, the wall components 518 can be of the types 532c, 532d in alternatingly stacked rows at a T-shaped intersection of the compartmentalizing assembly 515. In other embodiments, counterpart compartmentalizing assemblies can include wall components of the types 532e, 532f in alternatingly stacked rows to form L-shaped intersections. Similarly, counterpart compartmentalizing assemblies can include full-size and reduced-size cross-shaped wall components in alternatingly stacked rows to form cross-shaped intersections.

Figure 18:
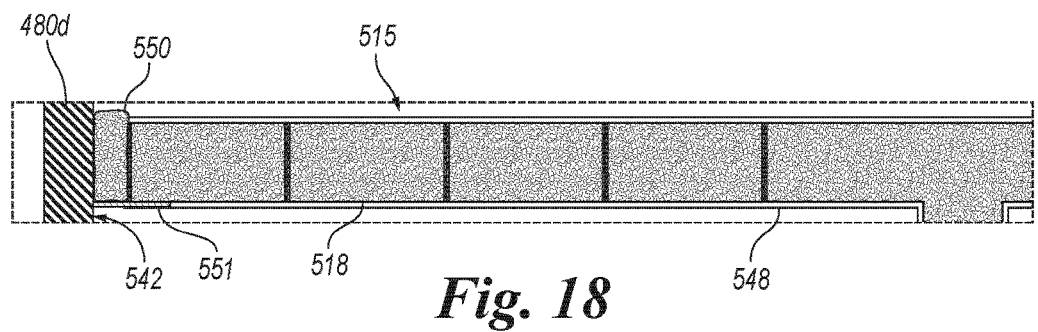
FIG. 18 is an enlarged view of a portion of FIG. 16.
Figure 19:
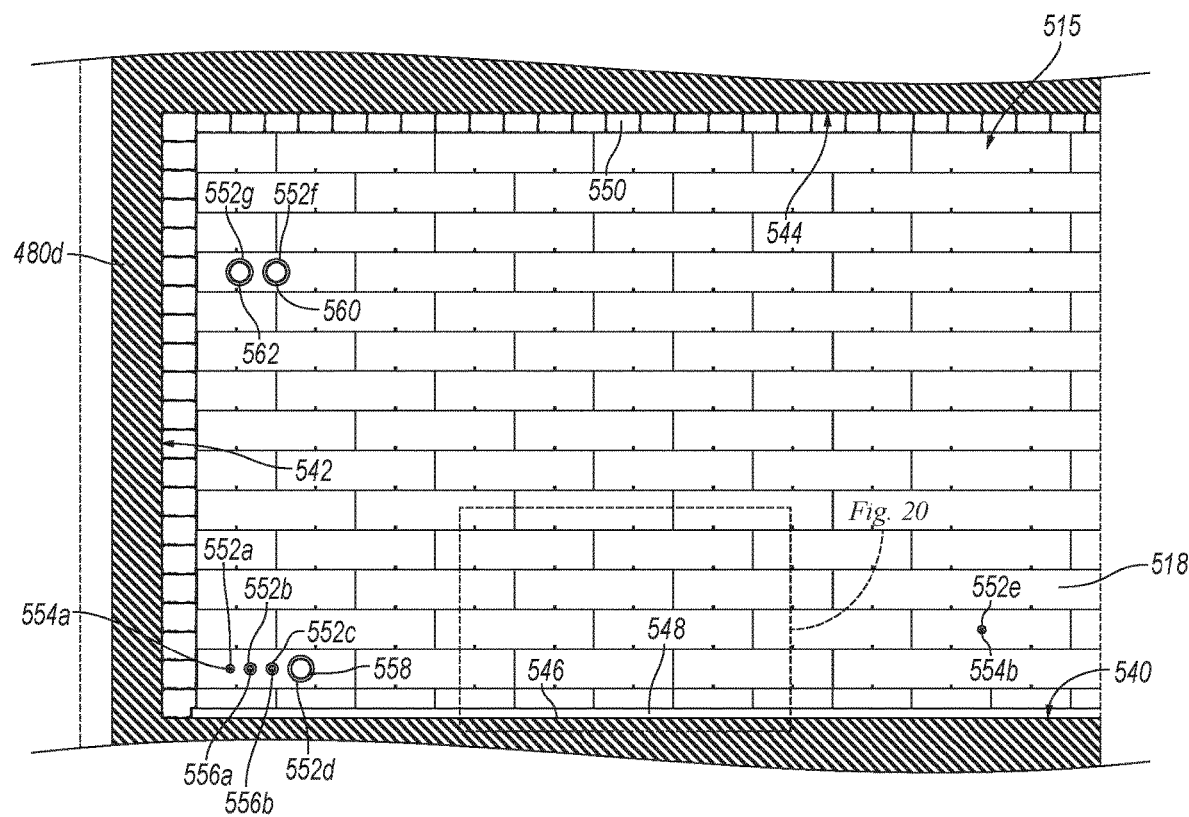
FIG. 19 is a cross-sectional exterior side profile view of a portion of the cluster of lodging units shown in FIG. 16 corresponding to the portion of FIG. 16 shown in FIG. 18.

FIG. 18 is an enlarged view of a portion of FIG. 16. FIG. 19 is a cross-sectional exterior side profile view of a portion of the cluster of lodging units 510 corresponding to the portion of FIG. 16 shown in FIG. 18. With reference to FIGS. 16, 18 and 19 together, the building 104b can have a finished floor surface 540 over which the wall components 518 are removably disposed, a finished wall surface 542 beside which the wall components 518 are removably disposed, and a finished ceiling surface 544 below which the wall components 518 are removably disposed. The compartmentalizing assembly 515 can include a liner 546 disposed (e.g., removably or permanently disposed) on the finished floor surface 540 below the wall components 518.

For example, the liner 546 can be adhesively connected to the finished floor surface 540. The liner 546 can be useful, for example, to protect the finished floor surface 540 from other components of the compartmentalizing assembly 515, to facilitate layout the compartmentalizing assembly 515, to reduce or eliminate the possibility of shifting of the compartmentalizing assembly 515, and/or for other purposes. Suitable materials for the liner 546 include spray-and-peel coatings, strips of peel-and-stick house wrap, and strips of peel-and-stick roof underlayment, among other examples. The liner 546 can be disposable or reusable.

In at least some embodiments, the compartmentalizing assembly 515 includes additional components that facilitate compatibility between the wall components 518 and the building 104b when the wall components 518 have standard dimensions and the building 104b has irregular dimensions. For example, the compartmentalizing assembly 515 can include a mass of self-leveling material 548 (e.g., a disposable mass of hardened self-leveling grout) under the wall components 518 and over the liner 546. The mass of self-leveling material 548 can be molded and, in at least some cases, is integrally formed along most or all of an overall footprint of the compartmentalizing assembly 515. During formation of the mass of self-leveling material 548, the constituent self-leveling material can be of sufficiently low viscosity to level itself by gravity. Thus, the mass of self-leveling material 548 can automatically conform to slopes, dips, and other irregularities in the finished floor surface 540. When at least partially cured, the mass of self-leveling material 548 can provide the compartmentalizing assembly 515 with a reliably level surface that facilitates vertical stacking of the wall components 518.

As shown in FIGS. 18 and 19, the compartmentalizing assembly 515 can include compressible batting 550 disposed (e.g., stuffed) into a vertical gap between the wall components 518 and the finished wall surface 542 and disposed (e.g., stuffed) into a horizontal gap between the wall components 518 and the finished ceiling surface 544. In at least some embodiments, the batting 550 is reusable. Furthermore, the batting 550 can be non-combustible. For example, the batting 550 can be reusable bundles of lined or unlined mineral wool insulation. At its interior side, the compartmentalizing assembly 515 can include molding panels 551 that hide the batting 550. The molding panels 551 can be attached to the wall components 518 magnetically, adhesively, mechanically, or in another suitable manner. In some embodiments, the overall compartmentalizing assembly 515 is self-supporting, free-standing, and has a fire rating of at least two hours. In other embodiments, the overall compartmentalizing assembly 515 can have only some or none of these attributes. As shown in FIG. 19, some of the wall components 518 can be configured to allow passage of retrofitted utility lines. For example, the compartmentalizing assembly 515 can include ports 552 (individually identified as ports 552a-552g). The retrofitted support systems 513 can include electrical lines 554 (individually identified as electrical lines 554a, 554b) extending through the ports 552a, 552e, respectively; water supply lines 556 (individually identified as water supply lines 556a, 556b) extending through the ports 552b, 552c, respectively; a plumbing drain line 558 extending through the port 552d; a plumbing ventilation line 560 extending through the port 552f; and an exhaust vent line 562 extending through the port 552g.

Figure 20:
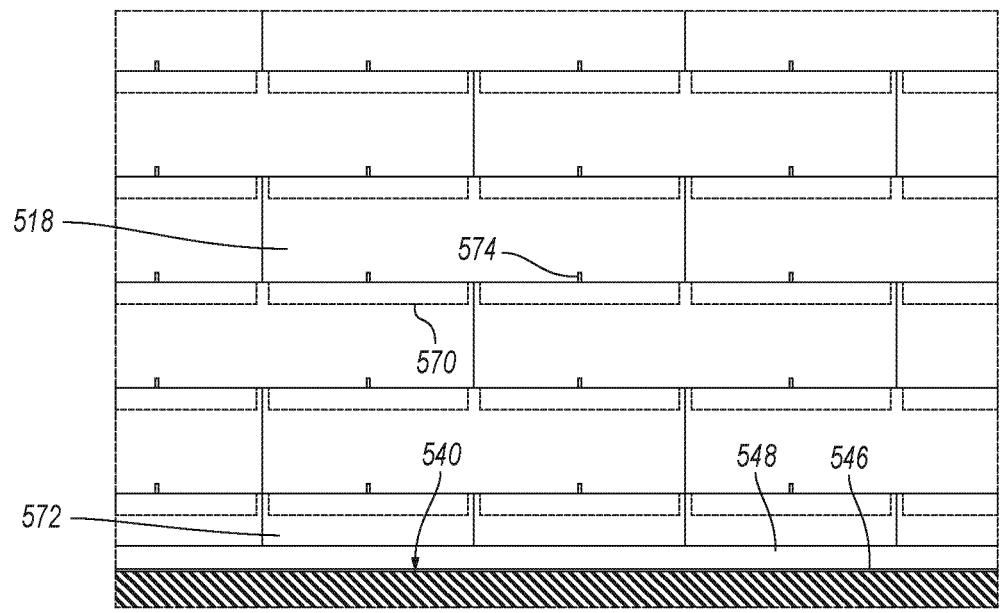
FIG. 20 is an enlarged view of a portion of FIG. 19.

FIG. 20 is an enlarged view of a portion of FIG. 19. As shown in FIG. 20, the wall components 518 can be stacked within the compartmentalizing assembly 515. Furthermore, the wall components 518 can be interlocking within the compartmentalizing assembly 515. For example, the individual wall components 518 can include downwardly extending flanges 570 that are received within successively lower wall components 518. At the mass of self-leveling material 548, the compartmentalizing assembly 515 can include base blocks 572 configured to receive the flanges 570 of the wall components 518 within a lowest row of wall components 518 within the compartmentalizing assembly 515. When fully assembled, the compartmentalizing assembly 515 can be strong enough to support fixtures and accessories (e.g., electrical conduits, monitors, shelving, moldings, artwork, furniture supports, etc.). In at least some embodiments, exposed portions of the wall components 518 are at least partially made of ferrous metal such that suitable fixtures and accessories can be connected to the compartmentalizing assembly 515 magnetically. In addition or alternatively, the wall components 518 can include coupling components 574 that allow suitable fixtures and accessories to be connected to the compartmentalizing assembly 515 mechanically and/or by gravity.

Figure 21:
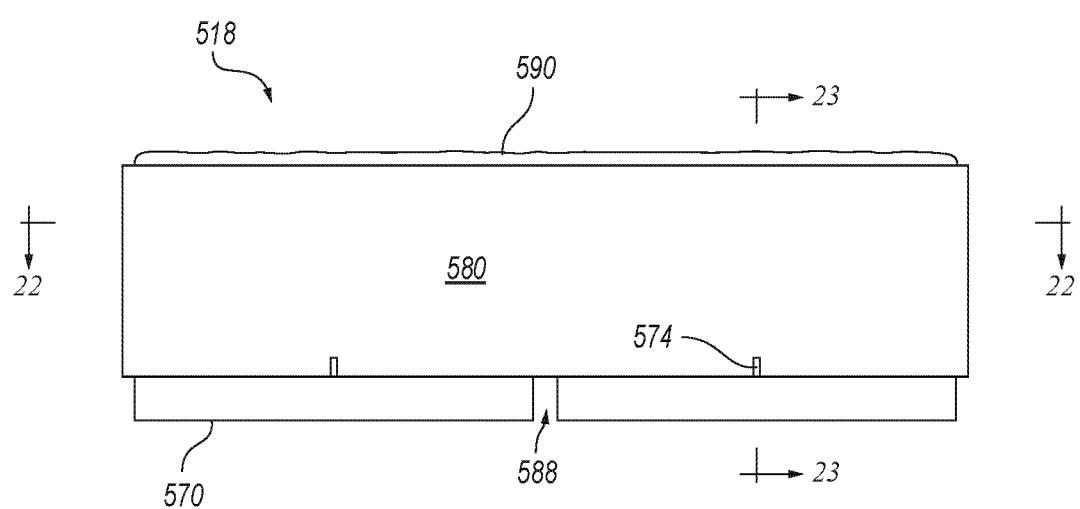
FIG. 21 is side profile view of a wall component of a compartmentalizing assembly of the hotel shown in FIG. 1.
Figure 22:
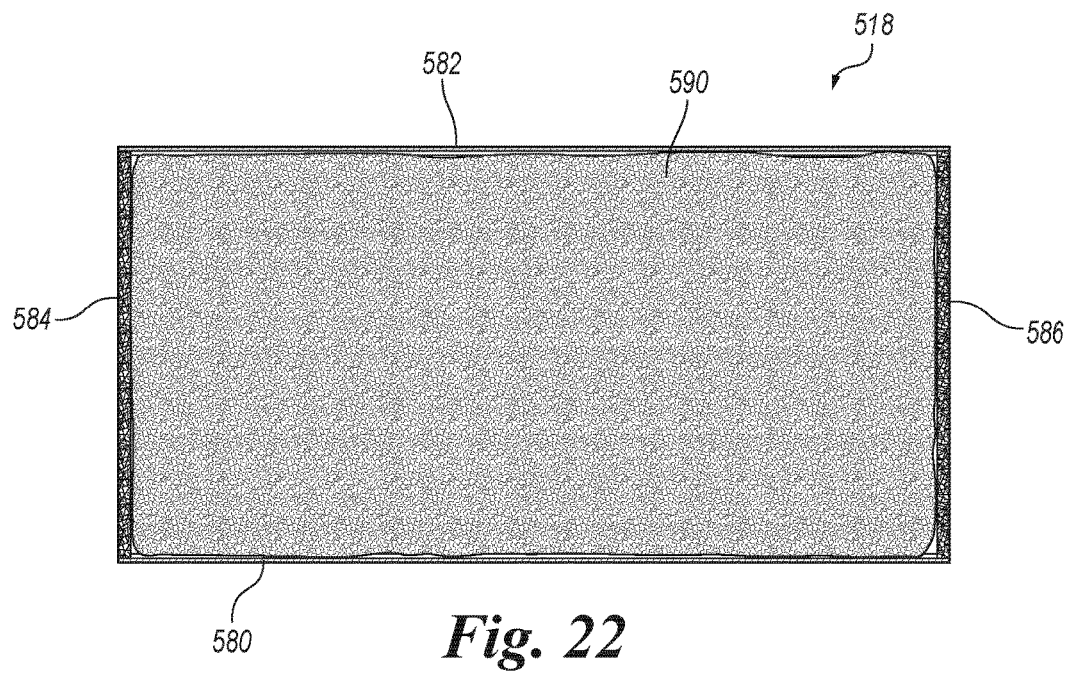
FIG. 22 is a cross-sectional top plan view of the wall component of the compartmentalizing assembly of the hotel shown in FIG. 1 taken along the line 22-22 in FIG. 21.
Figure 23:
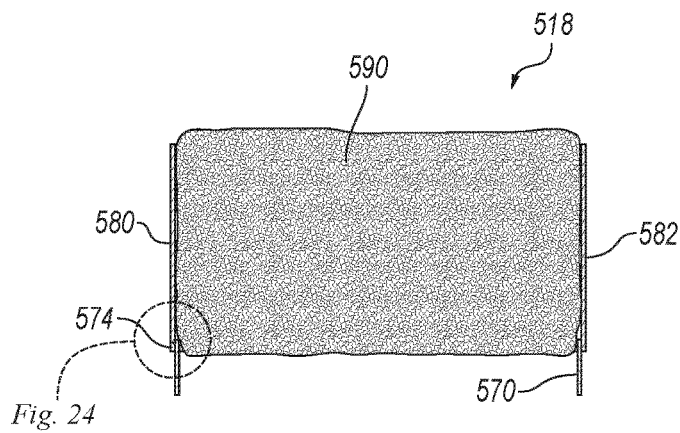
FIG. 23 is a cross-sectional end profile view of the wall component of the compartmentalizing assembly of the hotel shown in FIG. 1 taken along the line 23-23 in FIG. 21.

FIG. 21 is side profile view of a given one of the wall components 518 of the type 532a (FIG. 17) separate from other portions of the compartmentalizing assembly 515. FIG. 22 is a cross-sectional top plan view of the given wall component 518 taken along the line 22-22 in FIG. 21. FIG. 23 is a cross-sectional end plan view of the given wall component 518 taken along the line 23-23 in FIG. 21. In at least some embodiments, other (e.g., most or all) of the wall components 518 of the type 532a within the compartmentalizing assembly 515 at least substantially match the given wall component 518 illustrated in FIGS. 21-23. With reference to FIGS. 21-23 together, the given wall component 518 can include a first side panel 580 and an opposite second side panel 582 parallel to and spaced apart from the first side panel 580. Similarly, the given wall component 518 can include a first end panel 584 and an opposite second end panel 586 parallel to and spaced apart from the first end panel 584. The first and second side panels 580, 582 and the first and second end panels 584, 586 can define an interior region of the given wall component 518 shaped, for example, as a rectangular solid. The given wall component 518 can include two of the flanges 570 at the first side panel 580 and another two of the flanges 570 at the second side panel 582. As shown in FIG. 23, the flanges 570 can be parallel to and inset relative to the corresponding first and second side panels 580, 582. Between the flanges 570 at the first side panel 580 and between the flanges 570 at the second side panel 582, the given wall component 518 can include respective slots 588.

When the given wall component 518 is assembled with other wall components 518 of the type 532a within the compartmentalizing assembly 515, one of the flanges 570 at the first side panel 580 and an opposing one of the flanges 570 at the second side panel 582 can be received within the interior region of a first neighboring lower wall component 518. Similarly, the other of the flanges 570 at the first side panel 580 and the other of the flanges 570 at the second side panel 582 can be received within the interior region of a second neighboring lower wall component 518 adjacent to the first neighboring lower wall component 518. The second end panel 586 of the first neighboring lower wall component 518 and the first end panel 584 of the second neighboring lower wall component 518 can be directly adjacent to one another and received within the slots 588 of the given wall component 518. This interaction between the wall components 518 can facilitate convenient assembly of the compartmentalizing assembly 515 with neighboring rows of the wall components 518 evenly staggered.

In at least some embodiments, the given wall component 518 is rigid and the first and second side panels 580, 582 and the first and second end panels 584, 586 provide the given wall component 518 with most or all of its rigidity. In the illustrated embodiment, the first and second side panels 580, 582 are thinner than the first and second end panels 584, 586 and made of a different material. For example, the first and second side panels 580, 582 can be metal (e.g., iron) and the first and second end panels 584, 586 can be cementitious (e.g., fiber-reinforced cement). The metal composition of the first and second side panels 580, 582 can be useful, for example, for aesthetics, to facilitate magnetic coupling of fixtures and accessories to the compartmentalizing assembly 515, and/or for another reason. The cementitious composition of the first and second end panels 584, 586 can be useful, for example, to increase the fire rating of the compartmentalizing assembly 515, to reduce noise transmission through the compartmentalizing assembly 515, and/or for another reason. In other embodiments, the first and second side panels 580, 582 and the first and second end panels 584, 586 can have other suitable forms and/or compositions.

The given wall component 518 can further include compressible batting 590 disposed within its interior region. Similar to the batting 550 described above, the batting 590 can be reusable and/or non-combustible. For example, the batting 590 can be reusable bundles of lined or unlined mineral wool insulation. In at least some embodiments, the batting 590 is removable. Furthermore, the first and second side panels 580, 582 and the first and second end panels 584, 586 can be collapsible. For example, at corners where the first and second side panels 580, 582 and the first and second end panels 584, 586 meet, the given wall component 518 can include hinges (not shown), such as flexure bearings or piano hinges that allow each corner to fold in a direction that causes the first and second side panels 580, 582 and the first and second end panels 584, 586 to flatten. This feature along with the compressibility of the batting 590 can facilitate efficient storage and transport of the given wall component 518 between deployments. When the first and second side panels 580, 582 and the first and second end panels 584, 586 are collapsible, the given wall component 518 can include a rectangular inset (not shown) that rests on upper edges of the flanges 570. The inset can be removably disposed within the interior of the given wall component 518 to cause the given wall component 518 to maintain its rectangular form during use. When the first and second side panels 580, 582 and the first and second end panels 584, 586 are to be collapsed, the inset can be removed.

Figure 24:
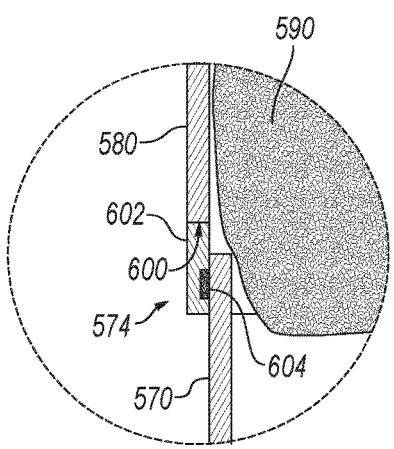
FIG. 24 is an enlarged view of a portion of FIG. 23.

FIG. 24 is an enlarged view of a portion of FIG. 23. As shown in FIG. 24, a lowermost portion of the first side panel 580 can overlap an uppermost portion of one the flanges 570. FIG. 24 further illustrates a given one of the coupling components 574 at the lowermost portion of the first side panel 580. In at least some embodiments, other (e.g., most or all) of the coupling components 574 of wall components 518 within the compartmentalizing assembly 515 at least substantially match the coupling component 574 illustrated in FIG. 24. The coupling component 574 can include a notch 600 and a plug 602 removably disposed within the notch 600. The plug 602 can include a magnet 604 that releasably connects the plug 602 to the uppermost portion of the adjacent flange 570. The plug 602 can be disposed within the notch 600 when the coupling component 574 is not in use. Removing the plug 602 from the notch 600 can expose an opening into the interior of the given wall component 518.

A hook or other suitable mechanical fastener (not shown) can be inserted into this opening. In this way, relatively heavy fixtures and accessories can be connected to the compartmentalizing assembly 515 through a reliable mechanical connection in addition to or instead of a magnetic connection.

Figure 25:
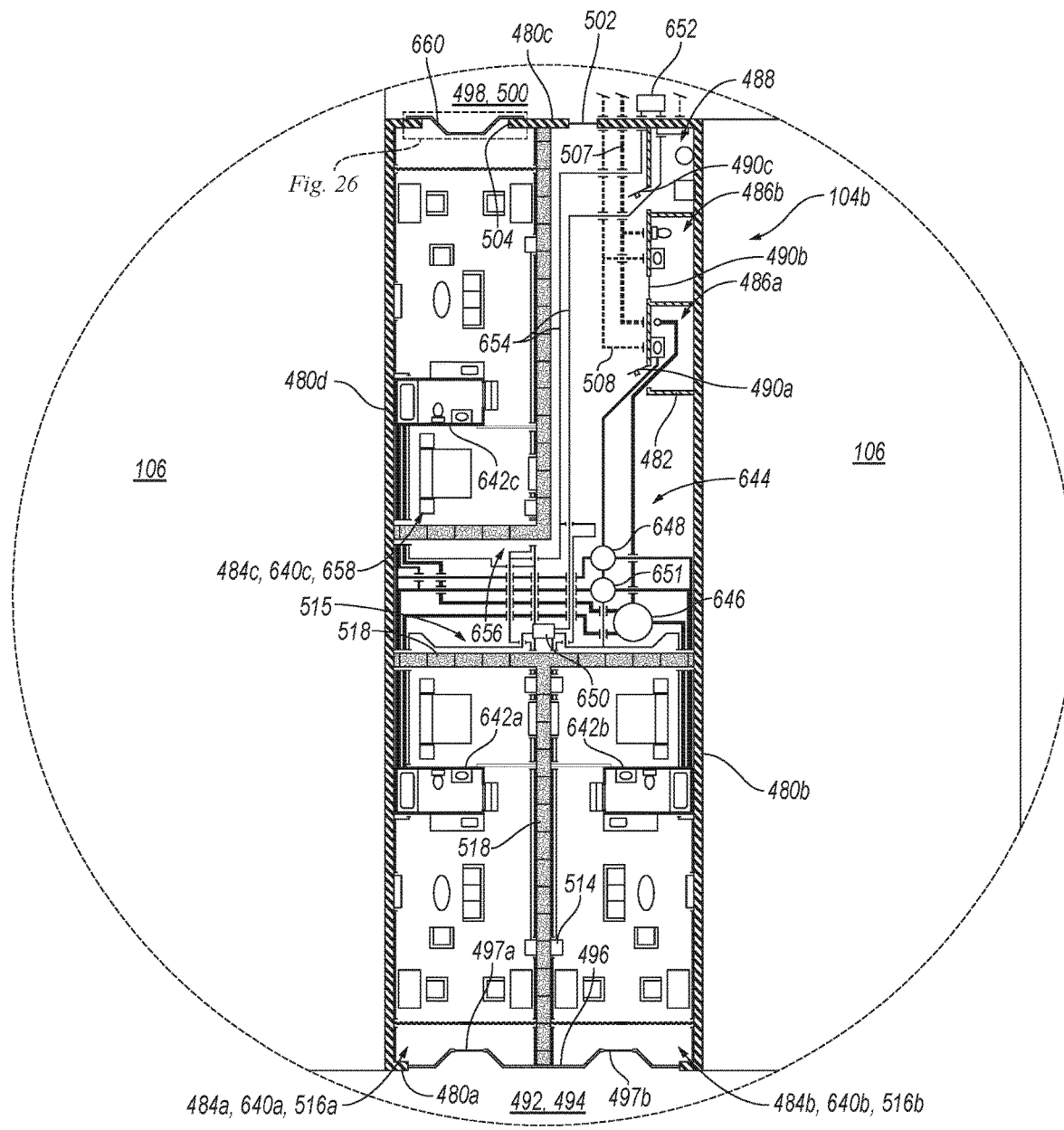
FIG. 25 is a cross-sectional top plan view of the building at the second block of the urban area shown in FIG. 1 taken along the line B-B in FIG. 14 and showing a cluster of lodging units of a hotel in accordance with another embodiment of the present technology, the cluster of lodging units including the interior regions within the building in the second state.

FIG. 25 is a cross-sectional top plan view of the building 104b taken along the line B-B in FIG. 14 and showing a cluster of lodging units 640 (individually identified as lodging units 640a-640c) of a hotel in accordance with another embodiment of the present technology. The lodging units 640a-640c can include the interior regions 484a-484c (FIG. 15), respectively, in the second state. The lodging units 640 can have features the same as or similar to the features of the lodging units 150, 510 described above. As shown in FIG. 25, the lodging units 640a-640c can respectively include bathrooms 642 (individually identified as bathrooms 642a-642c) disposed (e.g., removably disposed) within the building 104b. The bathrooms 642 can have features the same as or similar to the features of the bathroom 152, 512 described above. The cluster of lodging units 640 can further include retrofitted support systems 644 having features the same as or similar to the features of the retrofitted support systems 513 of the lodging units 510 and the retrofitted support systems described above for the lodging units 150.

As shown in FIG. 25, the retrofitted support systems 644 can include an above-floor sewage detention tank 646, an above-floor water reservoir 648, and a battery 650 through which the lodging units 640 are operably connected to sewage, water, and electrical systems of the building 104b, respectively. The retrofitted support systems 644 can further include a water heater 651 operably connected to the above-floor water reservoir 648. In at least some cases, the above-floor sewage detention tank 646, the above-floor water reservoir 648, the battery 650, and the water heater 651 are reusable and removably disposed within the building 104b. The retrofitted support systems 644 can further include a compressor 652 and above-floor refrigerant lines 654 through which climate-control units 514 of the lodging units 640 are operably connected to the compressor 652. The above-floor refrigerant lines 654 can be reusable and removably disposed within the building 104b. The compressor 652 can be reusable and removably disposed outside the building 104b. The retrofitted support systems 644 can still further include retrofitted ventilation lines, retrofitted exhaust lines, and a retrofitted exhaust filter, which are not shown for clarity of illustration.

The cluster of lodging units 640 can further include an additional compartmentalizing assembly 656. The interior region 484c can be located within an additional compartment 658 at least partially defined by the additional compartmentalizing assembly 656. The additional compartmentalizing assembly 656 can have features the same as or similar to the features of the compartmentalizing assembly 515 of the cluster of lodging units 510 described above. As shown in FIG. 25, the additional compartment 658 is near the opening 504. The lodging unit 640c can include a barrier 660 disposed between the interior region 484c and the second outdoor area 498. For example, a primary egress path from the interior region 484c to the second outdoor area 498 can extend through the opening 504 and through the barrier 660. Furthermore, the barrier 660 can be stationarily disposed between the interior region 484c and the second outdoor area 498. For example, unlike the overhead door 506, which is configured to move on a regular basis during normal operation of the interior region 484c in the first state, the barrier 660 can be configured to remain at least substantially stationary during normal operation of the lodging unit 640c.

Figure 26:
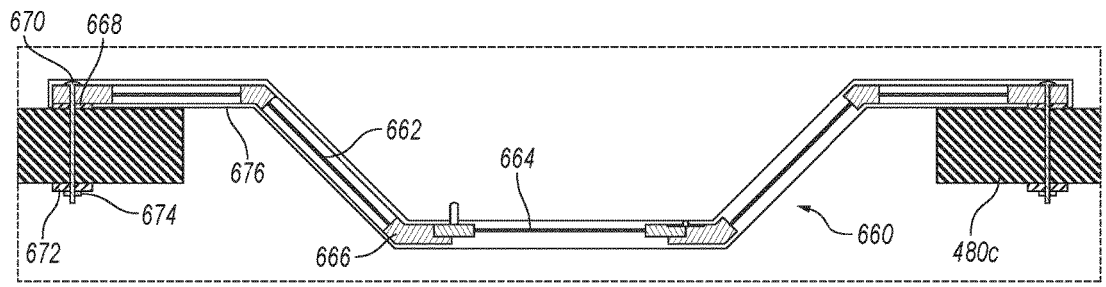
FIG. 26 is an enlarged view of a portion of FIG. 25.
Figure 27:
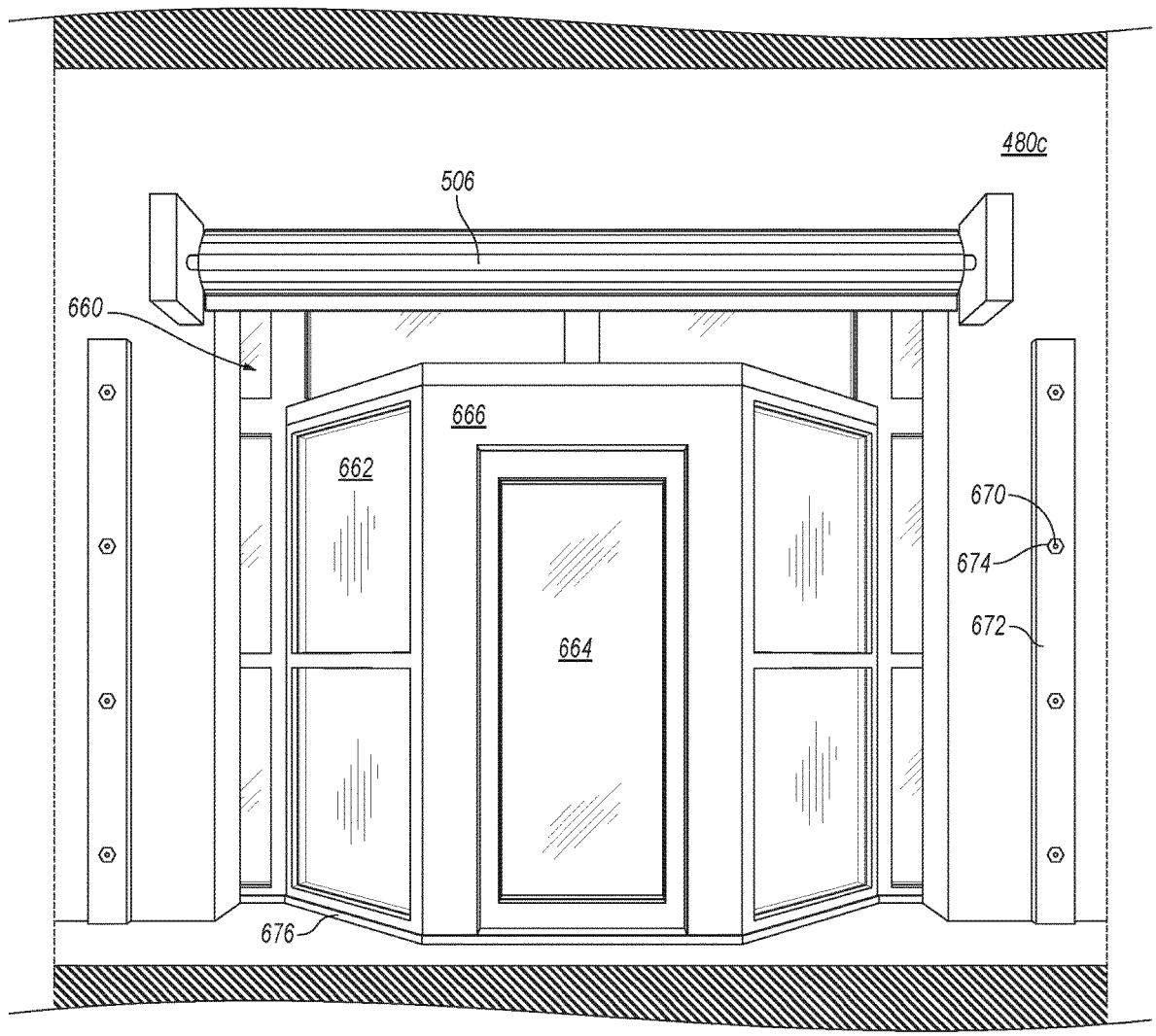
FIG. 27 is a cross-sectional exterior side profile view of a portion of the cluster of lodging units shown in FIG. 25 corresponding to the portion of FIG. 25 shown in FIG. 26.

FIG. 26 is an enlarged view of a portion of FIG. 25. FIG. 27 is a cross-sectional exterior side profile view of a portion of the cluster of lodging units 640 corresponding to the portion of FIG. 25 shown in FIG. 26. With reference to FIGS. 25-27 together, the barrier 660 can be fenestrated and can include windows 662 that allow natural light to enter the interior region 484c from the second outdoor area 498. The barrier 660 can further include a door 664. The barrier 660 can be reusable and removably disposed between the interior region 484c and the second outdoor area 498. For example, the barrier 660 can be configured to be installed with little or no need for heavy construction and removed with little or no need for heavy demolition. Furthermore, the barrier 660 can be configured to be conveniently transported and reused after its removal. In the illustrated embodiment, the barrier 660 is rigid, portable, and configured for rapid deployment into and removal from operable association with the interior region 484c without significant disassembly. This deployment and removal can occur by forklift, by dolly, by operation of wheels (not shown) integrated into the barrier 660, or in another manner. In other embodiments, a counterpart of the barrier 660 can be an assembly of reusable barrier modules configured for rapid deployment into and removal from between the interior region 484c and the second outdoor area 498 in an at least partially disassembled state. For example, a counterpart of the barrier 660 can be made up mostly or entirely of reusable modular components.

With reference again to FIGS. 25-27, the barrier 660 can be removably fastened to the exterior wall 480c. For example, the barrier 660 can be removably bolted to the exterior wall 480c. Alternatively, a counterpart of the barrier 660 can be removably screwed to the exterior wall 480c, removably clamped to the exterior wall 480c, and/or removably fastened to the exterior wall 480c in another manner in addition to or instead of being removably bolted to the exterior wall 480c. As yet another alternative, a counterpart of the barrier 660 can be permanently installed at the exterior wall 480c. As shown in FIG. 27, the barrier 660 can include a frame 666 and a gasket 668 disposed between the frame 666 and the exterior wall 480c. The gasket 668 can be compressible such that it conforms to irregularities in the exterior wall 480c and thereby enhances a weather resistance of a connection between the barrier 660 and the exterior wall 480c. The barrier 660 can further include bolts 670 that extend through the frame 666, through the gasket 668, and through the exterior wall 480c. At an inside surface of the exterior wall 480c, the barrier 660 can include furring strips 672 through which the bolts 670 also extend, and nuts 674 operably connected to the bolts 670 and bearing on the furring strips 672. The barrier 660 can further include a mass of self-leveling material 676 having features the same as or similar to features of the mass of self-leveling material 548 described above. The self-leveling material 676 can be integrally formed along most or all of an overall footprint of the barrier 660.

In the illustrated embodiment, the barrier 660 is an overlay that covers the opening 504 at an exterior side of the exterior wall 480c. In other embodiments, the barrier 660 can have another form and/or position relative to the opening 504. For example, rather than being disposed at the exterior side of the exterior wall 480c, a counterpart of the barrier 660 can be disposed at an interior side of the exterior wall 480c. As another example, rather than overlying the opening 504, the barrier 660 can be inset within the opening 504. As shown in FIG. 27, in the illustrated embodiment, the overhead door 506 is stowed within the interior region 484c in an open state. For example, a door track (not shown) associated with the overhead door 506 can remain in place after the interior region 484c is retrofitted for lodging use. A motor (not shown) operably associated with the overhead door 506 can be temporarily disabled so that the overhead door 506 remains out-of-service during operation of the lodging unit 510c. Leaving the overhead door 506, the door track, and the motor in place after the interior region 484c is retrofitted for an alternative use can be useful, for example, to reduce an investment necessary to return the interior region 484c its purpose-built use, as needed. In other embodiments, the overhead door 506, the door track, and/or the motor can be removed when the interior region 484c is retrofitted for lodging use. In still other embodiments, a counterpart of the overhead door 506 can be retrofitted with windows and/or a doorway. In these embodiments, the counterpart of the overhead door 506 can take the place of the barrier 660.

Figure 28:
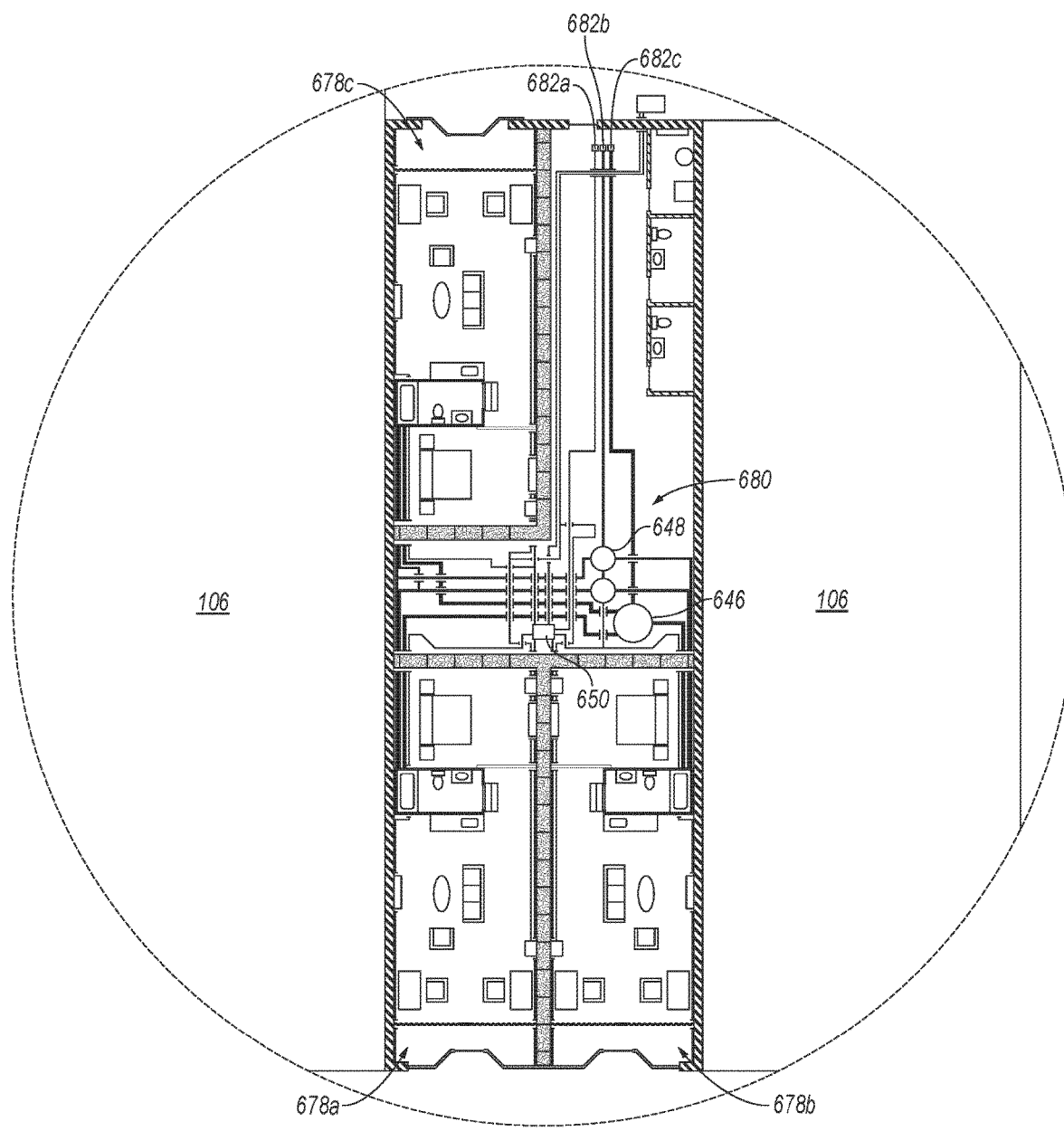
FIG. 28 is a cross-sectional top plan view of the building at the second block of the urban area shown in FIG. 1 taken along the line B-B in FIG. 14 and showing a cluster of lodging units of a hotel in accordance with another embodiment of the present technology, the cluster of lodging units including the interior regions within the building in the second state.

In the embodiment illustrated in FIG. 25, the cluster of lodging units 640 is tethered to the building bathroom 486a and the utility room 488. The cluster of lodging units 640, therefore, can be on-grid (i.e., dependent on service connections to local utilities serving the building 104b). In other embodiments, a counterpart of the cluster of lodging unit 640 can be configured to operate at least substantially off-grid (i.e., independent of service connections to local utilities serving the building 104b). One example of such a cluster of lodging units is shown in FIG. 28. In particular, FIG. 28 is a cross-sectional top plan view of the building 104b taken along the line B-B in FIG. 14 and showing a cluster of lodging units 678 (individually identified as lodging units 678a-678c) of a hotel in accordance with another embodiment of the present technology. The lodging units 678a-678c can include the interior regions 484a-484c (FIG. 15), respectively, in the second state. The lodging units 678 can have features the same as or similar to the features of the lodging units 150, 510, 640 described above. For example, the cluster of lodging units 678 can include retrofitted support systems 680 similar to the retrofitted support systems 644 described above in the context of the cluster of lodging units 640.

As shown in FIG. 28, the retrofitted support systems 680 can include hookups 682 (individually identified as hookups 682a-682c) through which the battery 650, the above-floor water reservoir 648, and the above-floor sewage detention tank 646 of the retrofitted support systems 680 can be respectively serviced. For example, the battery 650 of the cluster of lodging units 678 can be configured for occasional recharging from a mobile recharging station (not shown) via the hookup 682a. As another example, the above-floor water reservoir 648 of the cluster of lodging units 678 can be configured for occasional replenishment from a mobile tanker (e.g., a water supply truck) via the hookup 682b. As yet another example, the above-floor sewage detention tank 646 of the cluster of lodging units 678 can be configured for occasional evacuation into a mobile tanker (e.g., a septic system pump truck) via the hookup 682c. Having all or a portion of the retrofitted support systems 680 be off-grid can be useful, for example, to avoid costs and complications associated with utility hookups, to reduce the environmental impact of the lodging units 678, to facilitate efficient management of the lodging units 678, to reduce costs associated with maintaining the lodging units 678 during periods of nonuse or low use, and/or for other reasons.

Figure 29:
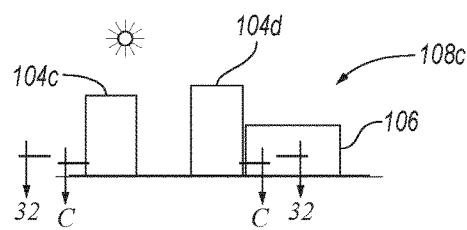
FIG. 29 is a front profile view of a third block of the urban area shown in FIG. 1.
Figure 30:
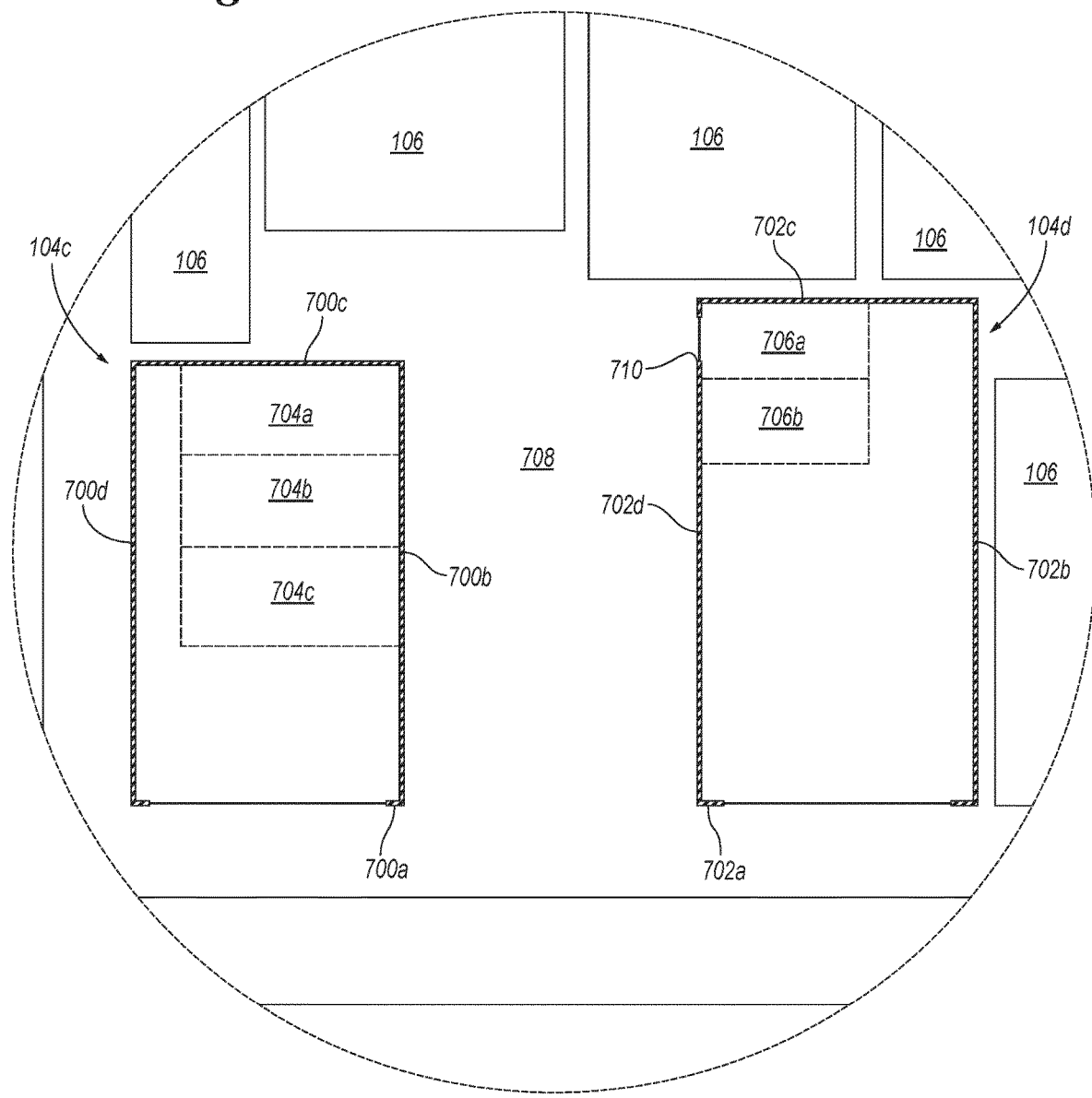
FIG. 30 is a cross-sectional top plan view of buildings at the third block of the urban area shown in FIG. 1 taken along the line C-C in FIG. 29 with interior regions within the buildings in the first state.

FIG. 29 is a front profile view of the block 108c. FIG. 30 is a cross-sectional top plan view of the buildings 104c, 104d at the block 108c taken along the line C-C in FIG. 29. The building 104c can include permanent exterior walls 700 (individually identified as exterior walls 700a-700d). Similarly, the building 104d can include permanent exterior walls 702 (individually identified as exterior walls 702a-702d). Within the exterior walls 700, the building 104c can include interior regions 704 (individually identified as interior regions 704a-704c). Similarly, within the exterior walls 702, the building 104d can include interior regions 706 (individually identified as interior regions 706a, 706b). In FIG. 30, the interior regions 704, 706 are shown in the first state. In at least some embodiments, the interior regions 704, 706 are purpose-built for respective uses independently selected from the group consisting of retail use, office use, restaurant use, industrial use, warehouse use, storage use, garage use, and combinations thereof. The exterior wall 700b can be between the interior regions 704 and an intra-block paved area 708. Similarly, the exterior wall 702d can be between the interior regions 706 and the intra-block paved area 708. At the exterior wall 702d, the building 104d can include an opening 710 between the interior region 706a and the intra-block paved area 708. The opening 710 can have features similar to or the same as features of the opening 504 described above.

Figure 31:
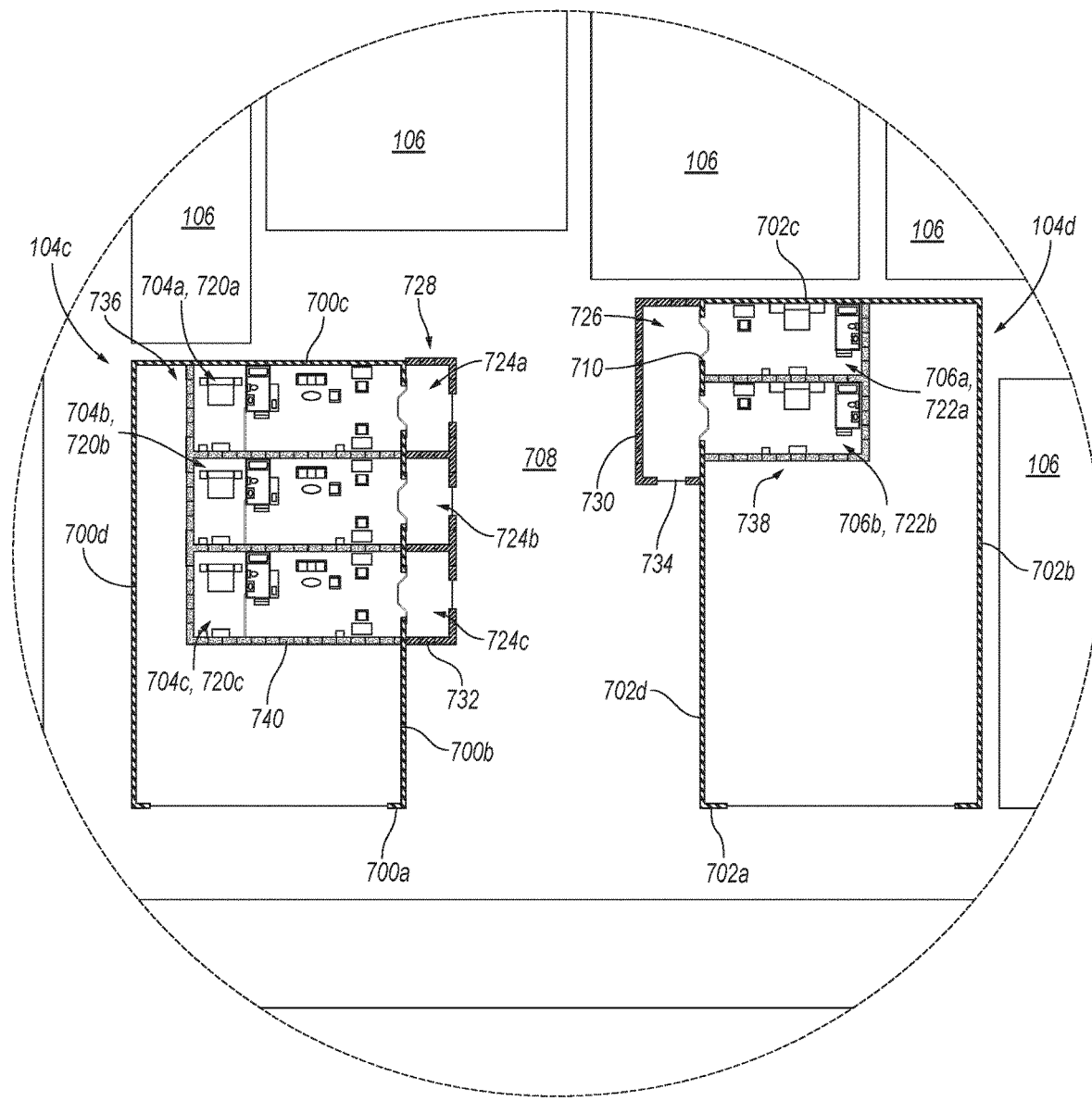
FIGS. 31 and 32 are cross-sectional top plan views of the buildings at the third block of the urban area shown in FIG. 1 taken, respectively, along the lines C-C and 32-32 in FIG. 29 and showing a cluster of lodging units of the hotel shown in FIG. 1, the cluster of lodging units including the interior regions within the buildings in the second state.

FIG. 31 is a cross-sectional top plan view of the buildings 104c, 104d taken along the line C-C in FIG. 29 and showing a cluster of lodging units 720 (individually identified as lodging units 720a-720c) and another cluster of lodging units 722 (individually identified as lodging units 722a, 722b) of the hotel 102. The lodging units 720a-720c can include the interior regions 704a-704c, respectively, in the second state. The lodging units 722a, 722b can include the interior regions 706a, 706b, respectively, in the second state. The interior regions 704, 706 and the lodging units 720, 722 can have features the same as or similar to the features of the interior regions 114, 484 and the lodging units 150, 510, 640, 678 described above. As shown in FIG. 31, the cluster of lodging units 720 can include retrofitted courtyards 724 (individually identified as courtyards 724a-724c) at a portion of the intra-block paved area 708 closest to the building 104c. Similarly, the cluster of lodging units 722 can include a retrofitted courtyard 726 at a portion of the intra-block paved area 708 closest to the building 104d.

The cluster of lodging units 720 can include an exterior enclosure 728 at least partially defining the courtyards 724. Similarly, the cluster of lodging units 722 can include an exterior enclosure 730 at least partially defining the courtyard 726. In the illustrated embodiment, the courtyards 724, 726 are open air. In other embodiments, all or a portion of counterparts of the courtyards 724, 726 can have a roof (e.g., to define a solarium). As shown in FIG. 31, the exterior enclosures 728, 730 can include exterior wall components 732 and gates 734 disposed at perimeter portions of the courtyards 724, 726. The exterior enclosures 728, 730 can have features similar to or the same as features of the compartmentalizing assembly 515 described above. For example, the exterior wall components 732 can be the same as or similar to the wall components 518 described above. In at least some cases, the exterior wall components 732 are planters that support vegetation (not shown). For example, the exterior wall components 732 can internally support root systems (not shown) of the vegetation. Thus, the exterior enclosures 728, 730 can include living walls.

Figure 32:
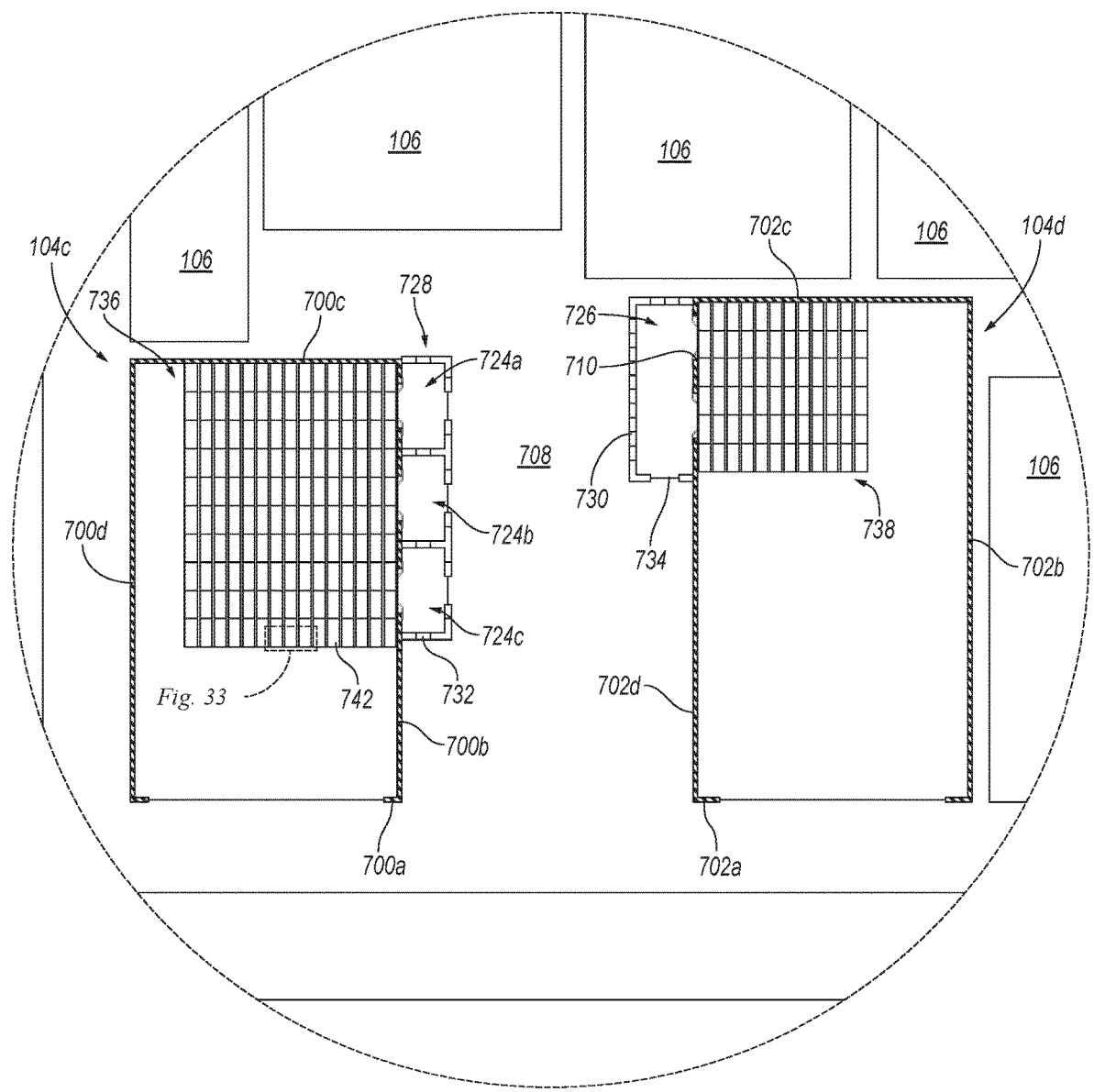
Figure 33:
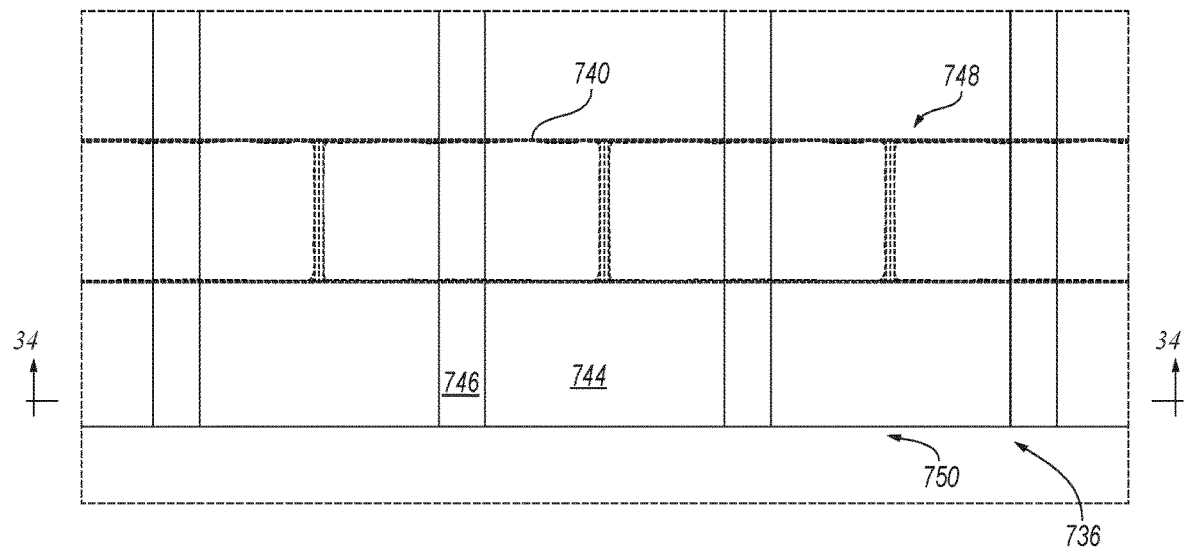
FIG. 33 is an enlarged view of a portion of FIG. 32.
Figure 34:
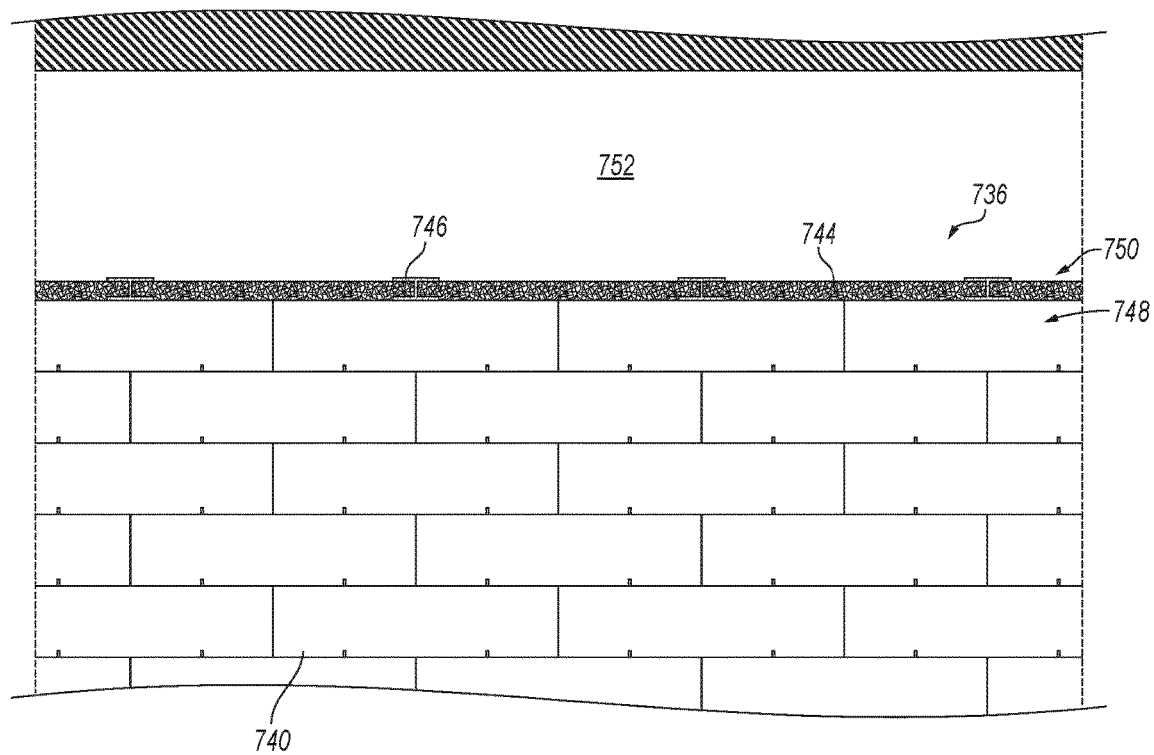
FIG. 34 is a cross-sectional exterior side profile view of a portion of the cluster of lodging units shown in FIG. 32 corresponding to the portion of FIG. 32 shown in FIG. 33.

FIG. 32 is a cross-sectional top plan view of the buildings 104c, 104d taken along the line 32-32 in FIG. 29. FIG. 33 is an enlarged view of a portion of FIG. 32. FIG. 34 is a cross-sectional exterior side profile view of a portion of the cluster of lodging units 720 corresponding to the portion of FIG. 32 shown in FIG. 33. With reference to FIGS. 29-34 together, the cluster of lodging units 720 can include a compartmentalizing assembly 736, and the cluster of lodging units 722 can include a compartmentalizing assembly 738. The compartmentalizing assemblies 736, 738 can have features the same as or similar to features of the compartmentalizing assemblies 515, 656 described above. The compartmentalizing assemblies 736, 738 can include reusable interior wall components 740 and reusable interior ceiling components 742 removably disposed within the buildings 104c, 104d. For example, the compartmentalizing assemblies 736, 738 can include rigid ceiling panels 744 and elongate ceiling beams 746 interspersed between the ceiling panels 744.

The ceiling beams 746 can support the ceiling panels 744, and the interior wall components 740 can support the ceiling beams 746. The interior wall components 740 can be assembled into walls, columns, or other suitable structures that extend between the ceiling beams 746 and finished floor surfaces of the buildings 104c, 104d. For example, the compartmentalizing assembly 736 can include a wall 748 parallel to and spaced apart from the exterior wall 700c, and a series of columns (not shown) abutting an interior surface of the exterior wall 700c. The ceiling beams 746 can extend between the wall 748 and the columns. When a distance between the wall 748 and the columns does not correspond to a multiple of the length of the ceiling panels 744, and in other cases, the ceiling panels 744 and the ceiling beams 746 can be cantilevered over the wall 748. As shown in FIG. 34, the individual ceiling beams 746 can have an I-shape transverse cross-section including two channels at opposite sides of a central web. The individual ceiling panels 744 can have side edge portions snugly received within corresponding channels of adjacent ceiling beams 746. Together, the ceiling panels 744 and the ceiling beams 746 can form ceilings 750 of the clusters of lodging units 720, 722. The ceilings 750 can be below airspaces 752 within the buildings 104c, 104d.

Figure 35:
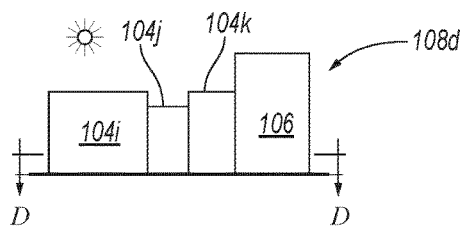
FIG. 35 is a front profile view of a fourth block of the urban area shown in FIG. 1.
Figure 36:
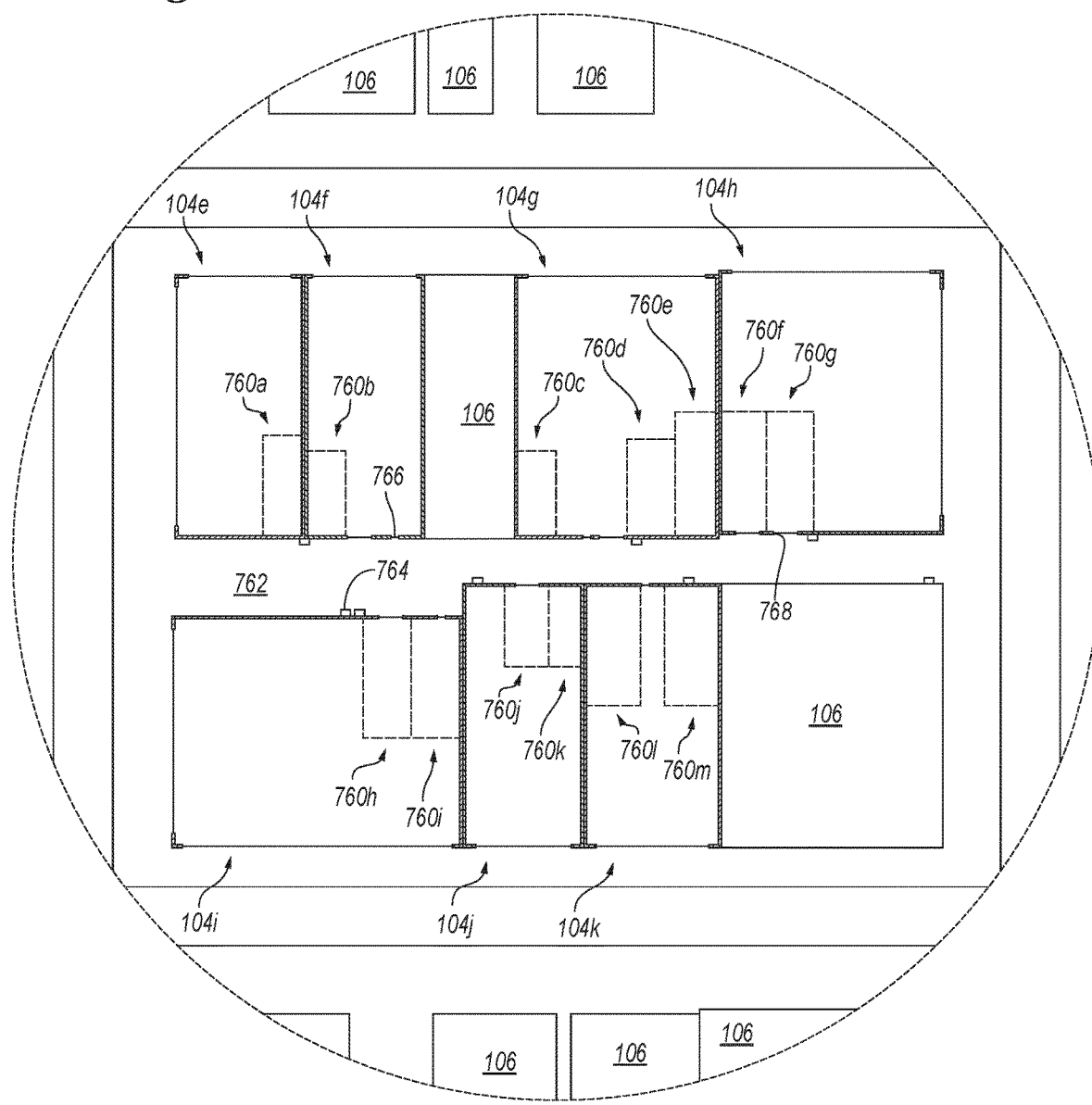
FIG. 36 is a cross-sectional top plan view of buildings at the fourth block of the urban area shown in FIG. 1 taken along the line D-D in FIG. 35 with interior regions within the buildings in the first state.

FIG. 35 is a front profile view of the block 108d. FIG. 36 is a cross-sectional top plan view of the buildings 104e-104k taken along the line D-D in FIG. 35. The buildings 104e-104k can include permanent exterior walls within which the building 104e-104k include interior regions 760 (individually identified as interior regions 760a-760m). In FIG. 36, the interior regions 760 are shown in the first state. In at least some embodiments, the interior regions 760 are purpose-built for respective uses independently selected from the group consisting of retail use, office use, restaurant use, industrial use, warehouse use, storage use, garage use, and combinations thereof. The exterior walls of the buildings 104e-104k can include back walls between the interior regions 760 and an alley 762 of the block 108d. In the illustrated embodiment, the alley 762 is a through alley. In other embodiments, a counterpart of the alley 762 can be a blind alley. With reference again to FIG. 36, the buildings 104e-104k can be in two groups at opposite respective sides of the alley 762. Within the alley 762, the block 108d can include dumpsters 764 individually serving one or more of the buildings 104e-104k. The buildings 104e-104k can include back doors 766 and openings 768 similar to the back doors 132, 502 and openings 504, 710 described above.

Figure 37:
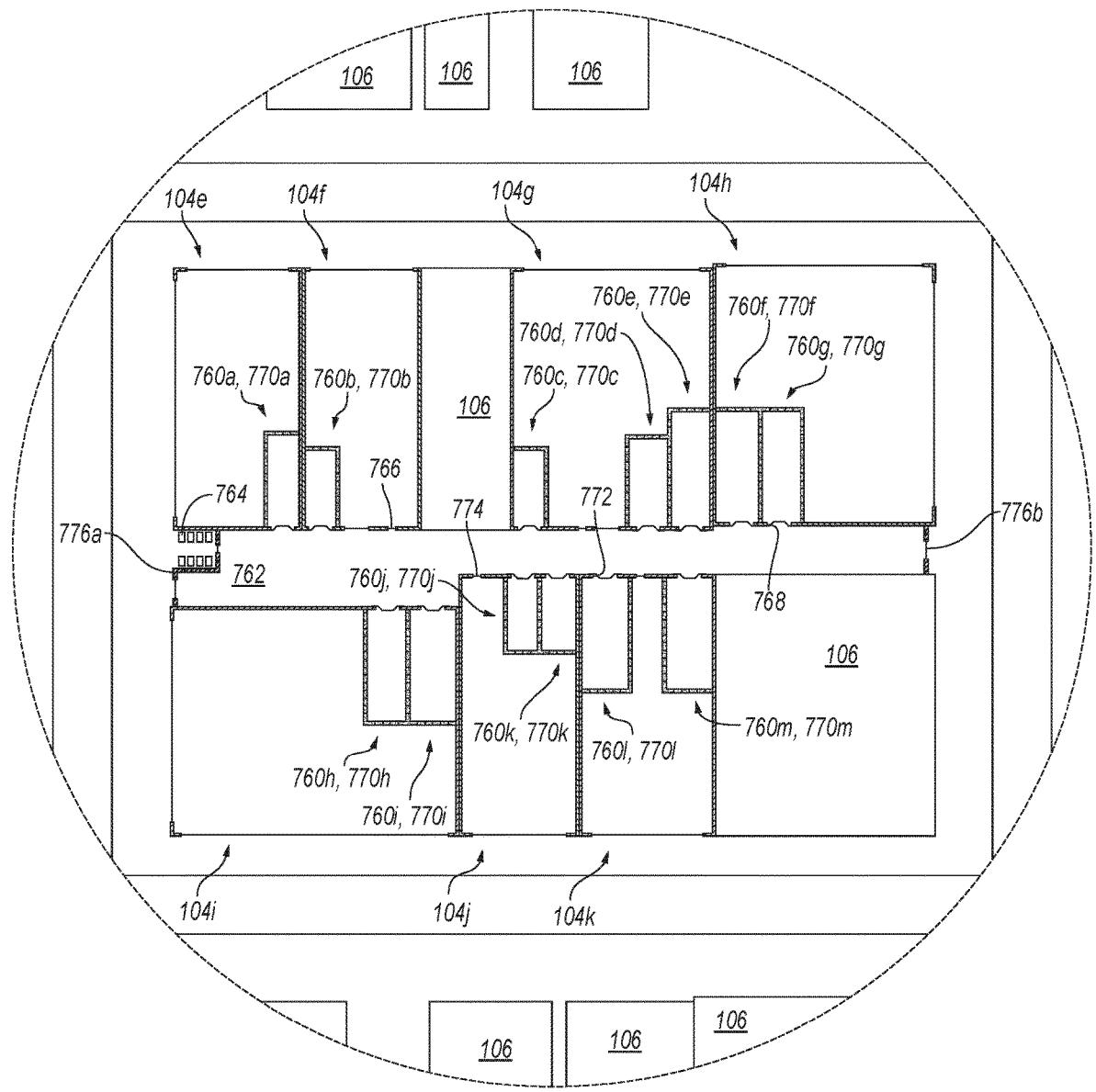
FIG. 37 is a cross-sectional top plan view of the buildings at the fourth block of the urban area shown in FIG. 1 taken along the line D-D in FIG. 35 and showing a cluster of lodging units of the hotel shown in FIG. 1, the cluster of lodging units including the interior regions within the buildings in the second state.

FIG. 37 is a cross-sectional top plan view of the buildings 104e-104k taken along the line D-D in FIG. 35 and showing a cluster of lodging units 770 (individually identified as lodging units 770a-770m) of the hotel 102. The lodging units 770a-770m can include the interior regions 760a-760m, respectively, in the second state. The interior regions 760 and the lodging units 770 can have features the same as or similar to the features of the interior regions 114, 484, 704, 706 and the lodging units 150, 510, 640, 678, 720, 722 described above. For clarity of illustration, most details of the lodging units 770 are not shown in FIG. 37. The features of the lodging units 770 can differ. For example, in the illustrated embodiment, many of the lodging units 770 have different respective sizes. Furthermore, in the illustrated embodiment, the buildings 104g-104k respectively include multiple lodging units 770, and the buildings 104e, 104f respectively include single lodging units 770. In other embodiments, a counterpart of the cluster of lodging units 770 can have other distributions of counterparts of the lodging units 770.

As shown in FIG. 37, the back walls of the buildings 104e-104k can be retrofitted to accommodate the lodging units 770. For example, the lodging units 770f-770h, 770j can be at the respective existing openings 768, and the lodging units 770a-770e, 770i, 770k-770m can be at respective new (e.g., cut) openings 772. Other modifications of the back walls of the buildings 104e-104k can be made to serve continuing operations within the buildings 104e-104k other than operations associated with the lodging units 770. For example, the back walls can be retrofitted to include new back doors 774. The alley 762 can be closed off to automobile traffic to form a common area for the cluster of lodging units 770. The cluster of lodging units 770 can include gates 776 (individually identified as gates 776a, 776b) at opposite respective ends of the alley 762. The dumpsters 764 can be relocated to portion of the alley 762 outside the gate 776a. In some embodiments, the alley 762 is at least substantially reversibly closed off. For example, the alley 762 can be closed off during certain hours (e.g., by closing the gates 776) and reopened during other hours (e.g., by opening the gates 776). In a particular embodiment, the alley 762 is at least substantially reversibly closed off at night, and the alley 762 is reopened during the day. In other embodiments, the alley 762 can be at least substantially reversibly closed off until the cluster of lodging units 770 is decommissioned, permanently closed off, not closed off, or managed in another manner.

Figure 38:
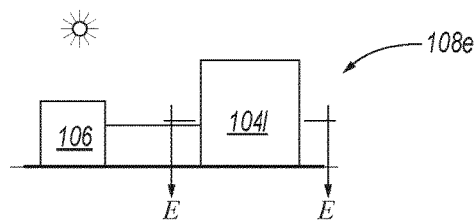
FIG. 38 is a front profile view of a fifth block of the urban area shown in FIG. 1.
Figure 39:
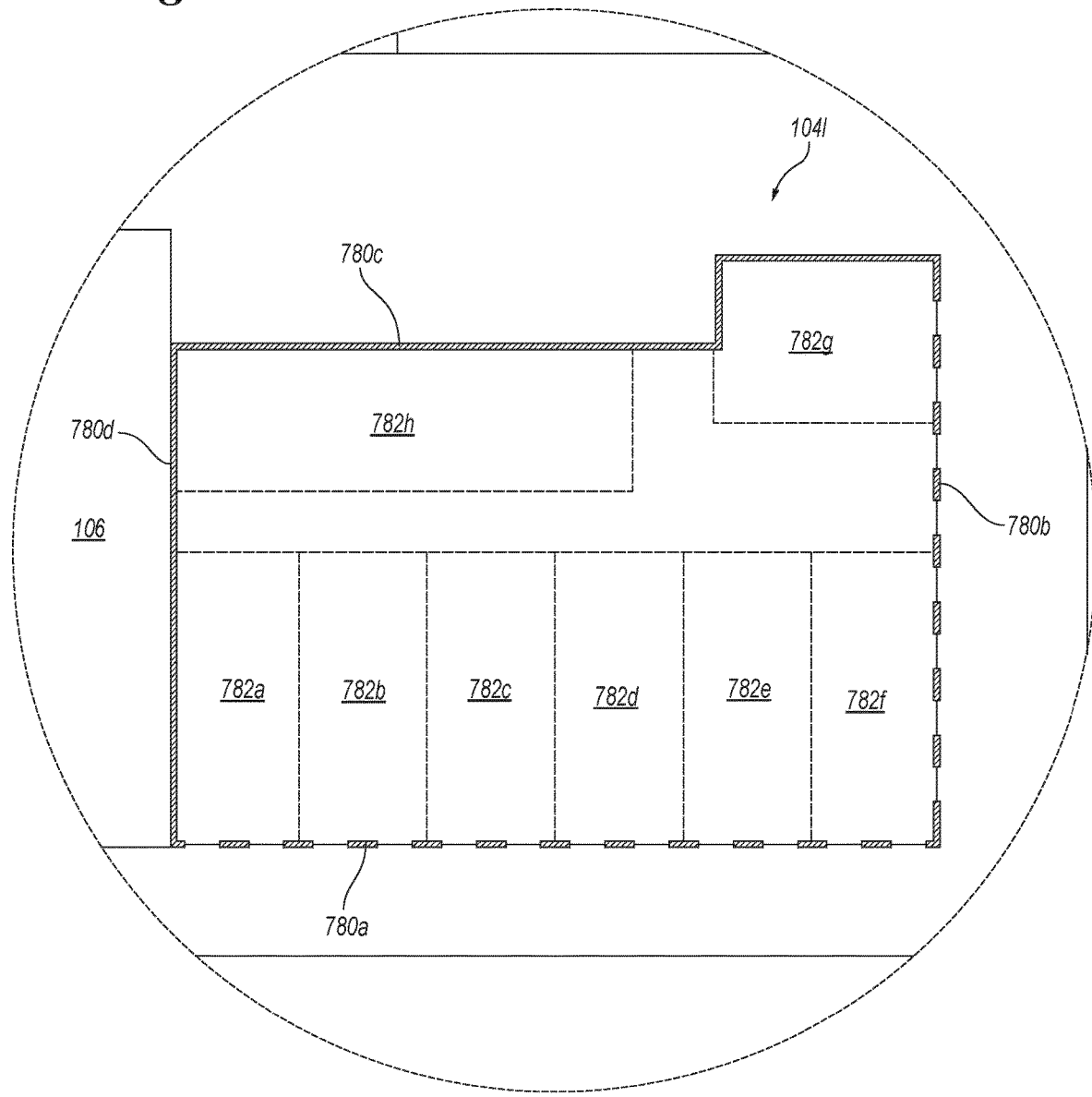
FIG. 39 is a cross-sectional top plan view of a building at the fifth block of the urban area shown in FIG. 1 taken along the line E-E in FIG. 38 with interior regions within the building in the first state.
Figure 40:
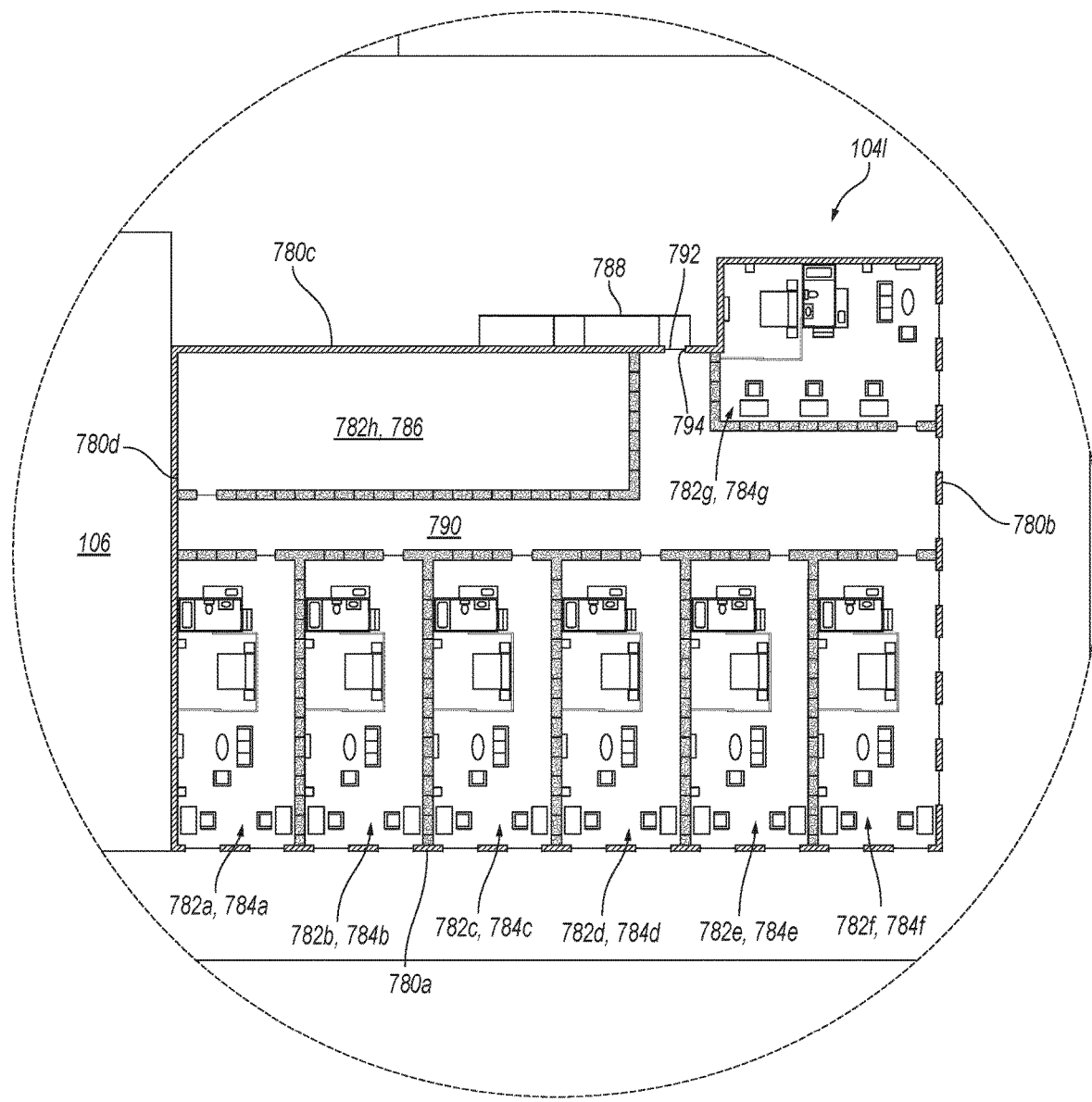
FIG. 40 is a cross-sectional top plan view of the building at the fifth block of the urban area shown in FIG. 1 taken along the line E-E n FIG. 38 and showing a cluster of lodging units of the hotel shown in FIG. 1, the cluster of lodging units including the interior regions within the building in the second state.

FIG. 38 is a front profile view of the block 108e. FIG. 39 is a cross-sectional top plan view of the building 104l taken along the line E-E in FIG. 38. The building 104l can include permanent exterior walls 780 (individually identified as exterior walls 780a-780d) within which the building 104l includes interior regions 782 (individually identified as interior regions 782a-782h). In FIG. 35, the interior regions 782 are shown in the first state. In at least some embodiments, the interior regions 782 are purpose-built for respective uses independently selected from the group consisting of retail use, office use, restaurant use, industrial use, warehouse use, storage use, garage use, and combinations thereof. FIG. 40 is a cross-sectional top plan view of the building 104l taken along the line E-E in FIG. 38 and showing a cluster of lodging units 784 (individually identified as lodging units 784a-784g) of the hotel 102. The lodging units 784a-784g can include the interior regions 782a-782g, respectively, in the second state. The cluster of lodging units 784 can further include an enclosed utility area 786 at the interior region 782h. The utility area 786 can include retrofitted systems (not shown) serving the lodging units 784. The interior regions 782a-782g and the lodging units 784 can have features the same as or similar to the features of the interior regions 114, 484, 704, 706, 760 and the lodging units 150, 510, 640, 678, 720, 722, 770 described above.

The interior regions 782 can be at a higher-than-ground-floor level of the building 104m. The cluster of lodging units 784 can include an exterior stairway and platform structure 788 at the exterior wall 780c. The stairway and platform structure 788 can be reusable and removably disposed adjacent to the exterior wall 780c. In some embodiments, the stairway and platform structure 788 is a portable stairway and platform unit. In other embodiments, the stairway and platform structure 788 is an assembly of reusable exterior stairway and platform modules. For example, the stairway and platform structure 788 can be made up mostly or entirely of reusable stairway and platform modules. In still other embodiments the stairway and platform structure 788 can have other suitable forms. As shown in FIG. 40, the cluster of lodging units 784 can include a corridor 790 serving the lodging units 784, and a retrofitted entry door 792 between the stairway and platform structure 788 and the corridor 790. The retrofitted entry door 792 can be within a cut opening 794. Alternatively or in addition, the retrofitted entry door 792 can be at a window opening of the building 104m retrofitted for egress use.

Figure 41:
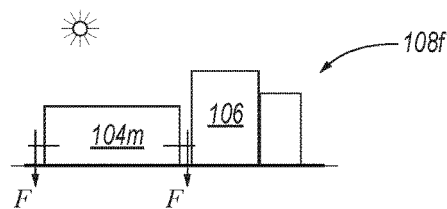
FIG. 41 is a front profile view of a sixth block of the urban area shown in FIG. 1.
Figure 42:
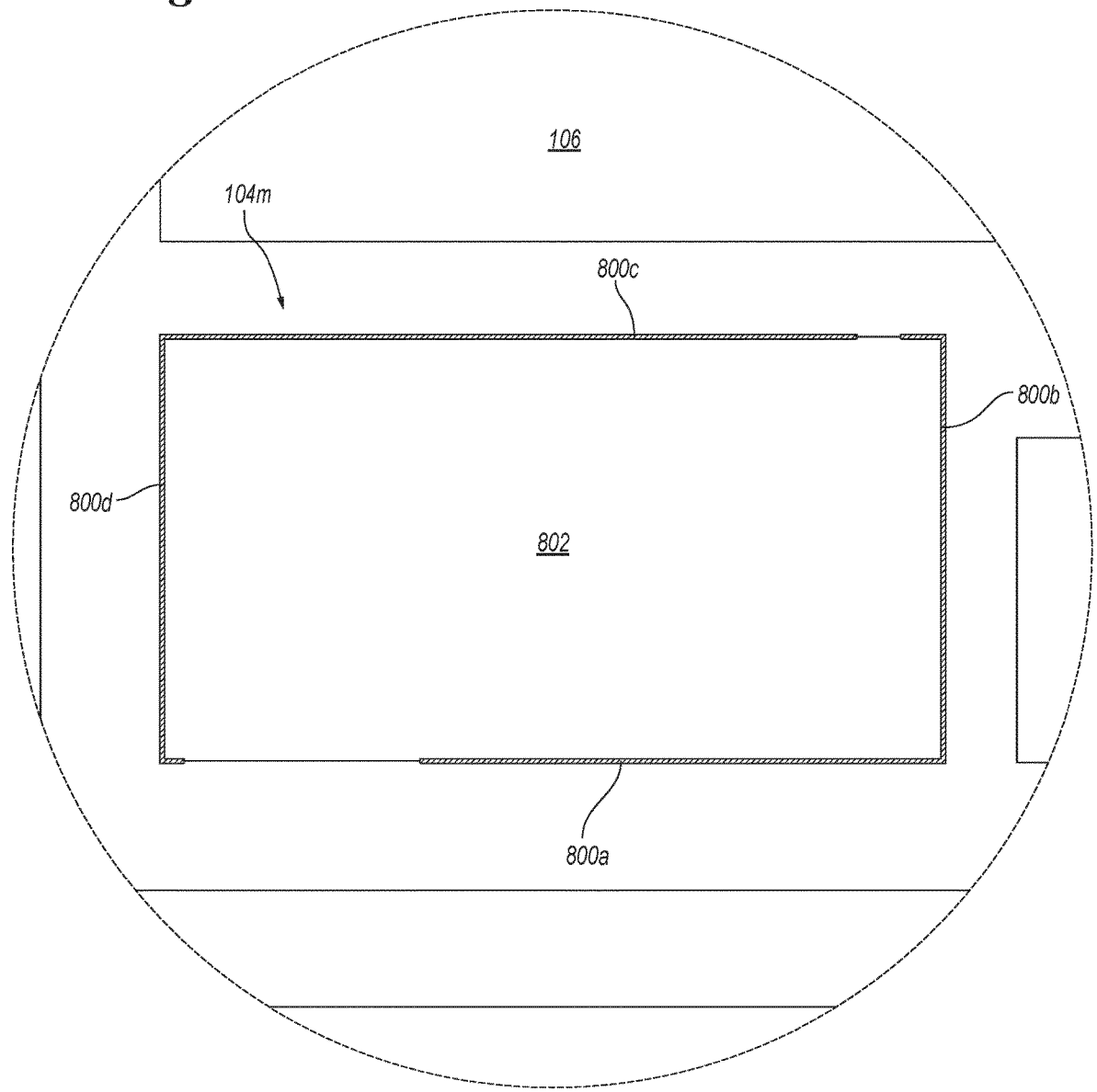
FIG. 42 is a cross-sectional top plan view of a building at the sixth block of the urban area shown in FIG. 1 taken along the line F-F in FIG. 41 with an interior region within the building in the first state.
Figure 43:
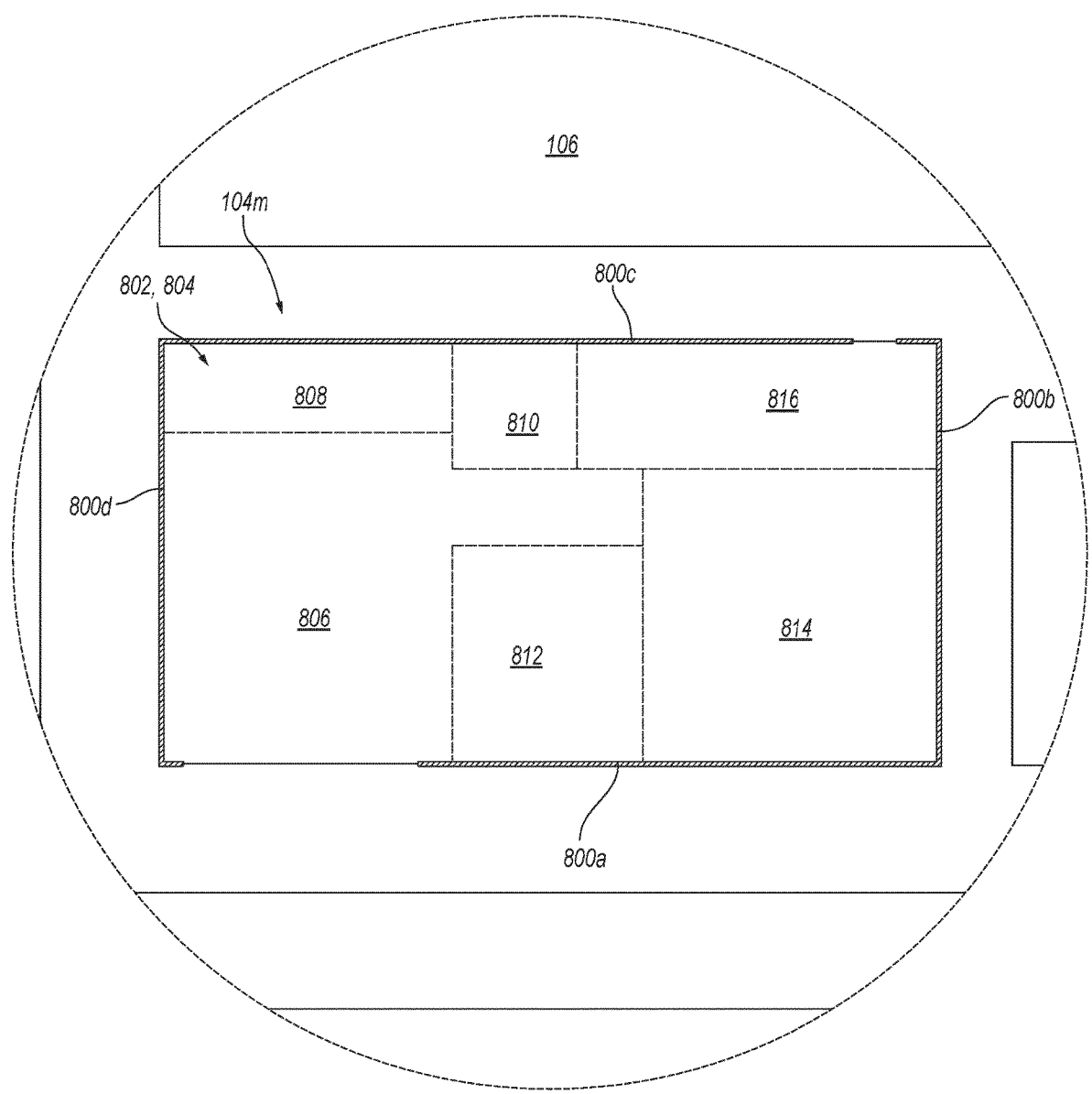
FIG. 43 is a cross-sectional top plan view of the building at the sixth block of the urban area shown in FIG. 1 taken along the line F-F in FIG. 41 and showing a guest-services hub of the hotel shown in FIG. 1, the guest-services hub including the interior region within the building in the second state.

FIG. 41 is a front profile view of the block 108g. FIG. 42 is a cross-sectional top plan view of the building 104m at the block 108g taken along the line F-F in FIG. 41. The building 104m can include permanent exterior walls 800 (individually identified as exterior walls 800a-800d) within which the building 104m includes an interior region 802. In FIG. 42, the interior region 802 is shown in the first state. In at least some embodiments, the interior regions 802 is purpose-built for a use selected from the group consisting of retail use, office use, restaurant use, industrial use, warehouse use, storage use, garage use, and combinations thereof. FIG. 43 is a cross-sectional top plan view of the building 104m taken along the line F-F in FIG. 41 and showing a guest-services hub 804 of the hotel 102. The guest-services hub 804 can include the interior region 802 in the second state. The guest-services hub 804 can be a location at which in-person services ancillary to lodging are provided to guests of the hotel 102. In the illustrated embodiment, the guest-services hub 804 includes a lobby area 806, a check-in area 808, a concierge/baggage check area 810, a lounge area 812, a food-service area 814, and a logistics/office area 816. In other embodiments, the guest-services hub 804 can have other suitable forms.

Figure 44:
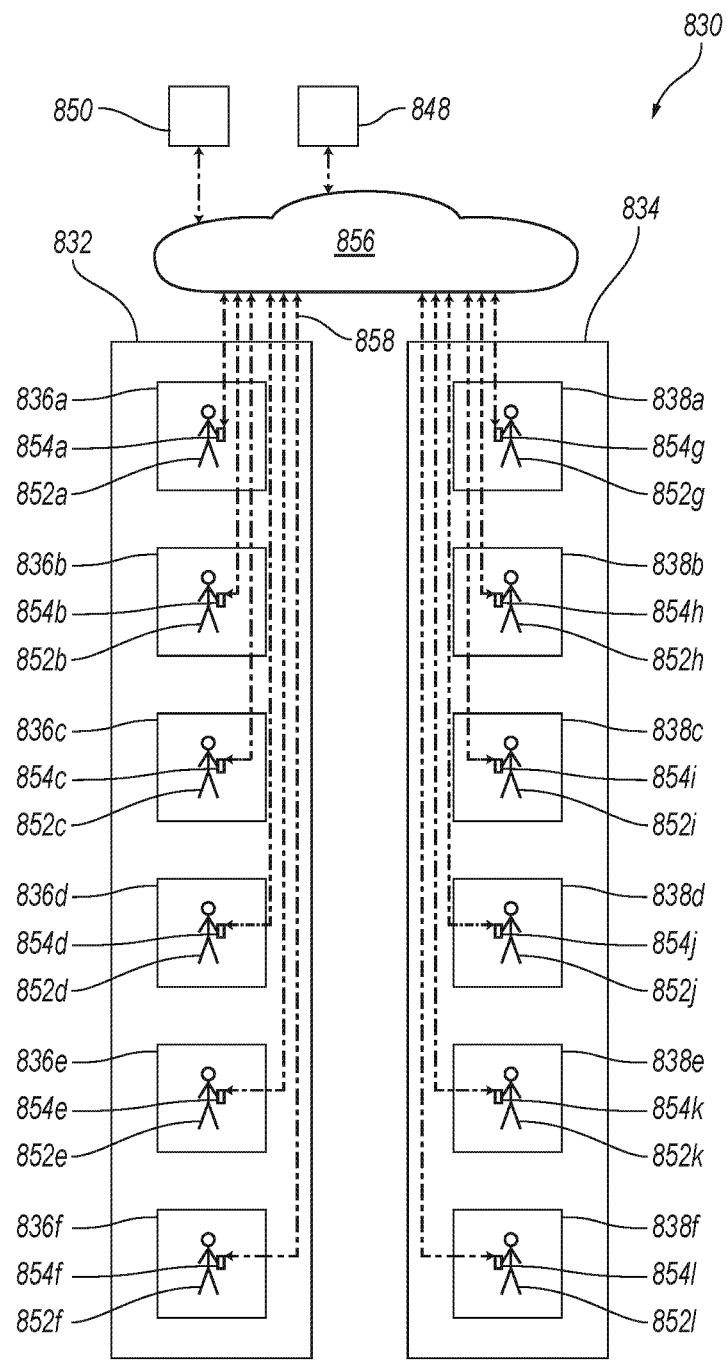
FIGS. 44 and 45 are schematic diagrams illustrating a network of hotels in accordance with an embodiment of the present technology.
Figure 45:
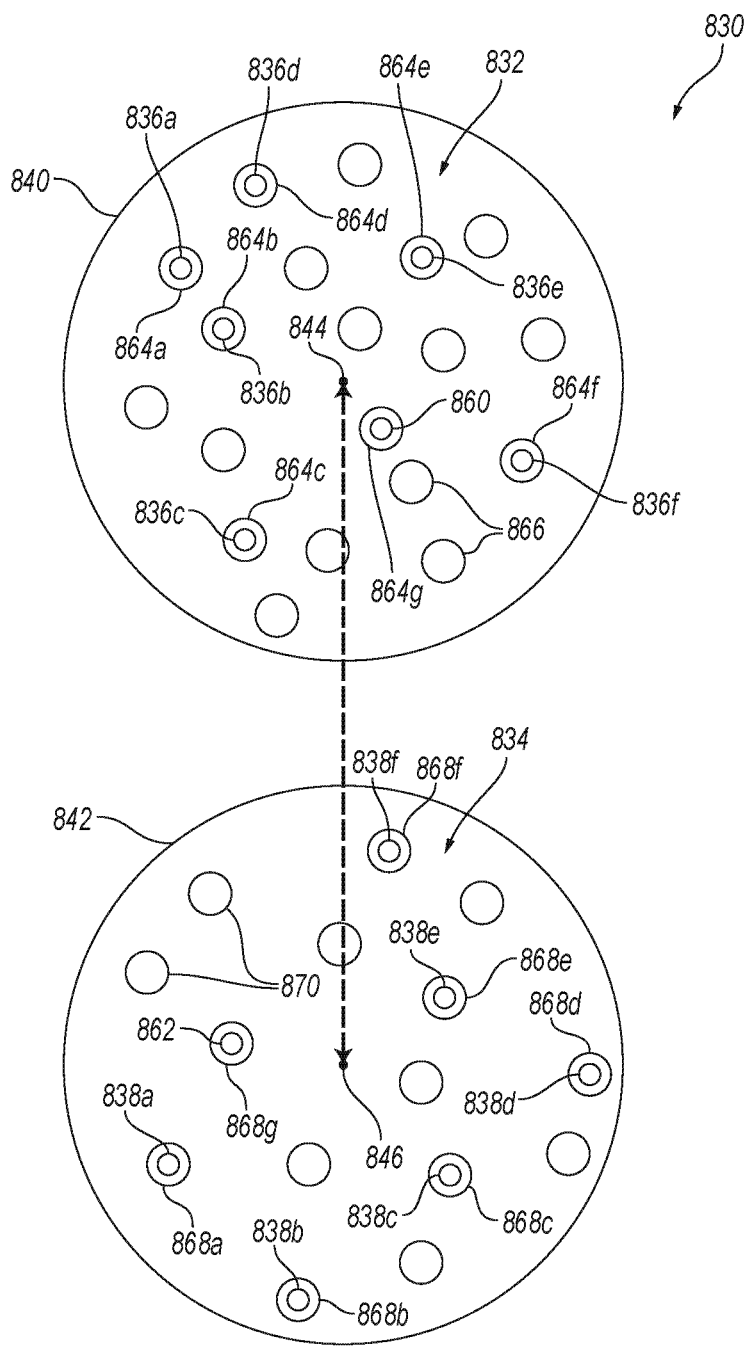

FIGS. 44 and 45 are schematic diagrams illustrating a network of hotels 830 in accordance with an embodiment of the present technology. The network 830 can include a first hotel 832 and a second hotel 834. The first and second hotels 832, 834 can have features the same as or similar to features of the hotel 102 described above. The first hotel 832 can include a first inventory of first lodging units 836 (individually identified as first lodging units 836a-836f) available for provision of lodging to guests of the first hotel 832. Similarly, the second hotel 834 can include a second inventory of second lodging units 838 (individually identified as second lodging units 838a-838f) available for provision of lodging to guests of the second hotel 834. The first and second hotels 832, 834 can be at a first urban area 840 (e.g., a first district of a first greater urban area) and a second urban area 842 (e.g., a second district of a second greater urban area), respectively. A first center point 844 of the first urban area 840 and a second center point 846 of the second urban area 842 can be at least 50 miles from one another. Alternatively, the first and second center points 844, 846 can be closer together, such as when the first and second urban areas 840, 842 are within the same greater urban area. Furthermore, although FIGS. 44 and 45 show only the first and second hotels 832, 834, the network 830 can include more than two hotels at different respective urban areas.

In some embodiments, the first lodging units 836 are at least substantially fungible components of the corresponding inventory for fulfilling reservations for the first hotel 832. Similarly, the second lodging units 838 can be at least substantially fungible components of the corresponding inventory for fulfilling reservations for the second hotel 834. For example, like conventional hotel rooms, the individual first lodging units 836 among themselves and the individual second lodging units 838 among themselves can be alike in amenities, furnishings, systems, etc. Particular ones of the first and second lodging units 836, 838 can be assigned to guests of the first and second hotels 832, 834, respectively, after the guests make reservations for future stays at the first and second hotels 832, 834, respectively. This assignment can occur at check-in or at another suitable time at or near a time when a reserved stay actually begins. In other embodiments, the first lodging units 836 can be non-fungible components of the corresponding inventory for fulfilling reservations for the first hotel 832, and the second lodging units 838 can be non-fungible components of the corresponding inventory for fulfilling reservations for the second hotel 834. For example, like conventional peer-to-peer lodging units, the individual first lodging units 836 among themselves and the individual second lodging units 838 among themselves can be distinct in amenities, furnishings, systems, etc. Particular ones of the first and second lodging units 836, 838 can be specifically reserved by guests of the first and second hotels 832, 834, respectively.

In at least some embodiments, the inventories are dynamic. For example, the constituent first lodging units 836 of the first hotel 832 and/or the constituent second lodging units 838 of the second hotel 834 can change over time. In addition or alternatively, the total number of first lodging units 836 within the inventory of the first hotel 832 and/or the total number of second lodging units 838 within the inventory of the second hotel 834 can change over time. These changes in the total numbers of the first and second lodging units 836, 838 can correspond to changing market conditions in the first and second urban areas 840, 842. For example, change in the total number of first lodging units 836 within the corresponding inventory can be inversely proportional to change in an overall non-lodging occupancy rate within the first urban area 840. Such change can correspond to greater availability of relatively inexpensive urban interstices within the first urban area 840, thereby potentially increasing the profitability of the first lodging units 836. As another example, change in the total number of first lodging units 836 within the corresponding inventory can be directly proportional to change in an overall lodging occupancy rate within the first urban area 840. Such change can correspond to greater demand for the first lodging units 836, thereby also potentially increasing the profitability of the first lodging units 836. As another example, change in the total number of first lodging units 836 within the corresponding inventory can be in concert with seasonal change in an overall lodging occupancy rate within the first urban area 840. For example, the corresponding inventory can be sufficiently dynamic to shrink during seasonal periods of relatively low demand for lodging and to grow during seasonal periods of relatively high demand for lodging. Similar correlations can apply to the total number of second lodging units 838 in the corresponding inventory relative to changes in market conditions in the second urban area 842.

The total number of first lodging units 836 in the corresponding inventory and the total number of second lodging units 838 in the corresponding inventory can be interrelated. For example, capital used to form the first lodging units 836 can be reallocated to form the second lodging units 838 when demand for lodging at the second urban area 842 is increasing and demand for lodging at the first urban area 840 is decreasing. Correspondingly, capital used to form the second lodging units 838 can be reallocated to form the first lodging units 836 when demand for lodging at the first urban area 840 is increasing and demand for lodging at the second urban area 842 is decreasing. Thus, the total number of first lodging units 836 within the corresponding inventory can be inversely proportional to the total number of second lodging units 838 within the corresponding inventory and vice versa. In at least some embodiments, an average residence time for the first lodging units 836 within the corresponding inventory is not more than three years (e.g., not more than two years or not more than one year). Similarly, an average residence time for the second lodging units 838 within the corresponding inventory can be not more than three years (e.g., not more than two years or not more than one year).

The network 830 can further include a server 848 and a computer-implemented reservation system 850 separate from the server 848 (as illustrated) or stored on the server 848. The reservation system 850 can be operable to generate reservations for future stays at the first and second hotels 832, 834. As shown in FIG. 44, guests 852 (individually identified as guests 852*a*-852*l*) having respective mobile electronic devices 854 (individually identified as mobile electronic devices 854*a*-854*l*) can communicate with the server 848 and with the reservation system 850 via an electronic network 856 (e.g., the Internet). For example, information 858 can flow between the server 848 and the reservation system 850, between the server 848 and the guests 852, between the reservation system 850 and the guests 852, and/or among the guests 852 via the electronic network 856. The information 858 can include guest locations (e.g., from GPS components of the electronic devices 854), notifications, offers, etc. In at least some embodiments, the first and second lodging units 836, 838 are configured for unmanned check-in and/or other unmanned operations that utilize the information 858. The first and second lodging units 836, 838 can be directly rentable, rentable via a membership system (e.g., in a member-based network of lodging units), rentable under short-term use arrangements, and/or rentable in another suitable manner.

FIG. 45 schematically illustrates how the first and second lodging units 836, 838 are distributed in the first and second urban areas 840, 842, respectively. As shown in FIG. 45, the first and second hotels 832, 834 can include first and second guest-services hubs 860, 862, respectively. The first lodging units 836 and the first guest-services hub 860 can be at respective first buildings 864 (individually identified as first buildings 864*a*-864*g*) dispersed among miscellaneous other buildings 866 within the first urban area 840. Similarly, the second lodging units 838 and the second guest-services hub 862 can be at respective second buildings 868 (individually identified as second buildings 868*a*-868*g*) dispersed among miscellaneous other buildings 870 within the second urban area 842. The first and second guest-services hubs 860, 862 can be locations at which in-person services ancillary to lodging are provided to guests of the first and second hotels 832, 834, respectively.

Figure 46:
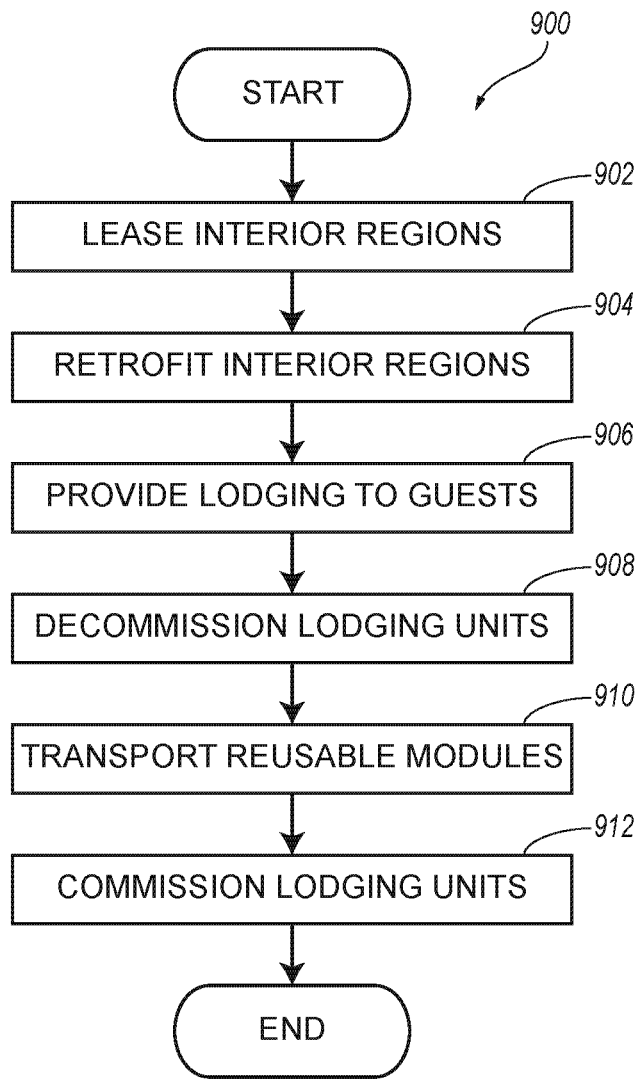
FIG. 46 is a block diagram illustrating a method for operating the network of hotels shown in FIGS. 44 and 45 in accordance with an embodiment of the present technology.

FIG. 46 is a block diagram illustrating a method 900 for operating the network 830 in accordance with an embodiment of the present technology. In the method 900, features of the first and second hotels 832, 834 may be described using reference numbers corresponding to counterpart features of the hotel 102. It should be understood that the method 900, when suitable, and/or portions of the method 900, when suitable, can be practiced with respect to other hotels described herein as well as with respect to hotels in accordance with other embodiments of the present technology. Similarly, although the method 900 may be described primarily in the context of the building 104b and/or the lodging units 640, it should be understood that the method 900, when suitable, and/or portions of the method 900, when suitable, can be practiced with respect to other suitable buildings and lodging units in accordance with embodiments of the present technology.

With reference to FIGS. 15, 25 and 46 together, the method 900 can include leasing the interior regions 484 (block 902) or establishing control of the interior regions 484 in another manner. For example, the interior regions 484 can be leased from an owner of the building 104b for provision of lodging to third parties. In some cases, one or more of the interior regions 484 is leased or purchased separately from other interior regions within the building 104b. For example, a leased or purchased one of the interior regions 484 may be underutilized by an ongoing operation at the other interior regions such that the ongoing operation is not adversely affected to a significant degree by losing control over the leased or purchased one of the interior regions 484. In other cases, all interior regions within the building 104b can be leased or purchased together.

After control of the interior regions 484 is established, the method 900 can include retrofitting the interior regions 484 to accommodate lodging use (block 904). The building 104b can be originally constructed at least 20 years before this retrofitting occurs. In at least some embodiments, the method 900 includes at least substantially reversibly retrofitting the interior regions 484 to accommodate lodging use. In these and other embodiments, it may be economically feasible to lease and retrofit the interior regions 484 with little or no long-term commitment from an owner of the building 104b. This can be due to the reusability of a significant amount of the capital associated with retrofitting the interior regions 484 and/or for other reasons. Accordingly, in some embodiments, the interior regions 484 are leased month-to-month. In other embodiments, the interior regions 484 can be leased under terms that allow the owner of the building 104b to terminate the lease with notice of less than one month. In still other embodiments, the interior regions 484 can be controlled by an operator of the lodging units 640 under other lease arrangements, under non-lease contractual arrangements (e.g., franchising), under fee simple ownership, or in another suitable manner.

After direct or indirect control over the interior regions 484 is established, the method 900 can include providing lodging to guests of the hotel 102 (block 906) at the lodging units 640. While lodging is provided to the guests, the building 104b can be publicly marketed for sale and/or the interior regions 484 can be publicly marketed for a non-lodging tenancy. In these and other cases, lodging use of the interior regions 484 can be an interim use of the interior regions 484 during a time when the interior regions 484 would otherwise be vacant. When the interior regions 484 are leased or otherwise controlled separately from other portions of the building 104b, an owner of the building 104b can occupy or otherwise use the other portions of the building 104b while the interior regions 484 are used for lodging. When the interior regions 484 are leased together with other portions of the building 104b, an operator of the lodging units 640 can operate the lodging units 640 at the interior regions 484 and lease and some or all of the other portions of the building 104b for other uses.

The method 900 can further include decommissioning the lodging units 640 (block 908). This can reduce a total number of lodging units within an inventory of the hotel 102. Furthermore, decommissioning the lodging units 640 can be at least partially in response to a sustained increase in an overall non-lodging occupancy rate within the urban area 100, at least partially in response to a sustained decrease in an overall lodging occupancy rate within the urban area 100, and/or seasonal (e.g., in concert with a seasonal decrease in an overall lodging occupancy rate within the urban area 100). When seasonal and in other cases, the lodging units 640 can be commissioned and decommissioned more than once. In these and other cases, decommissioning the lodging units 640 can occur by attrition in conjunction with a planned sale of the building 104b, a planned non-lodging tenancy of the interior regions 484, or both. Decommissioning the lodging units 640 can include recovering capital from the lodging units 640, such as by removing reusable modules from the lodging units 640. Examples of reusable modules that can be removed from the lodging units 640 include the bathrooms 642, reusable components of the retrofitted support systems 644, the wall components 518, the barrier 660, the exterior wall components 732 (FIG. 31), the exterior stairway and platform structure 788 (FIG. 40), and furnishings, among others.

After the reusable modules are removed from the lodging units 640, the method 900 can include transporting the reusable modules to another building (block 910), such as a building in another urban area. Some or all of the modules can be transported in a compact state. For example, the bathrooms 642 can be transported in a disassembled state. As another example, the wall components 518 can be transported in a disassembled state. Furthermore, the first and second side panels 580, 582 and the first and second end panels 584, 586 can be transported in a collapsed state. The method 900 can further include receiving the modules at the other building. For example, at least some of the modules can be received at the other building in an at least substantially pre-manufactured state. As shown in FIG. 46, the method 900 can further include commissioning lodging units (block 912) at the building at which the modules are received. Commissioning the lodging units can include deploying the modules at this building. Commissioning the new lodging units can increase a total number of lodging units within an inventory of another hotel affiliated with the hotel 102, but at a different urban area. Furthermore, commissioning the new lodging units can be at least partially in response to a sustained decrease in an overall non-lodging occupancy rate within the other urban area, at least partially in response to a sustained increase in an overall lodging occupancy rate within the other urban area, and/or seasonal (e.g., in concert with a seasonal increase in an overall lodging occupancy rate within the other urban area).

FIGS. 47-50 are operational diagrams showing, respectively, the spring, summer, fall, and winter intake and migration of capital within the network 830. Intake of modules can be from a module source 950. Migration of modules can be among hotels in the network 830 at different respective urban areas. Seattle is shown in FIGS. 47-50 as having higher summer lodging occupancy rates than winter lodging occupancy rates, a general (non-seasonal) trend toward higher lodging occupancy rates, and a general (non-seasonal) trend toward higher non-lodging occupancy rates. This can correspond to favored incoming migration of modules in the spring and favored outgoing migration of modules in the fall. Portland is shown in FIGS. 47-50 as having higher summer lodging occupancy rates than winter lodging occupancy rates, a general (non-seasonal) trend toward higher lodging occupancy rates, and a general (non-seasonal) trend toward lower non-lodging occupancy rates. This can correspond to favored incoming migration of modules in the spring and the fall and favored intake of modules from the module source 950 in the summer and winter. San Francisco is shown in FIGS. 47-50 as having higher summer lodging occupancy rates than winter lodging occupancy rates, a general (non-seasonal) trend toward lower lodging occupancy rates, and a general (non-seasonal) trend toward higher non-lodging occupancy rates. This can correspond to favored outgoing migration of modules in the spring and the fall. Los Angeles is shown in FIGS. 47-50 as having higher summer lodging occupancy rates than winter lodging occupancy rates, a general (non-seasonal) trend toward lower lodging occupancy rates, and a general (non-seasonal) trend toward lower non-lodging occupancy rates. This can correspond to favored incoming migration of modules in the spring and favored outgoing migration of modules in the fall. Tucson is shown in FIGS. 47-50 as having lower summer lodging occupancy rates than winter lodging occupancy rates, a general (non-seasonal) trend toward higher lodging occupancy rates, and a general (non-seasonal) trend toward higher non-lodging occupancy rates. This can correspond to favored outgoing migration of modules in the spring and favored incoming migration of modules in the fall. Las Vegas is shown in FIGS. 47-50 as having lower summer lodging occupancy rates than winter lodging occupancy rates, a general (non-seasonal) trend toward lower lodging occupancy rates, and a general (non-seasonal) trend toward lower non-lodging occupancy rates. This can correspond to favored outgoing migration of modules in the spring and favored incoming migration of modules in the fall. Salt Lake City is shown in FIGS. 47-50 as having lower summer lodging occupancy rates than winter lodging occupancy rates, a general (non-seasonal) trend toward lower lodging occupancy rates, and a general (non-seasonal) trend toward higher non-lodging occupancy rates. This can correspond to favored outgoing migration of modules in the spring and the fall. Phoenix is shown in FIGS. 47-50 as having lower summer lodging occupancy rates than winter lodging occupancy rates, a general (non-seasonal) trend toward higher lodging occupancy rates, and a general (non-seasonal) trend toward lower non-lodging occupancy rates. This can correspond to favored incoming migration of modules in the spring and the fall and favored intake of modules from the module source 950 in the summer and winter.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments can also exhibit such advantages, and not all embodiments need necessarily exhibit such advantages or other advantages disclosed herein to fall within the scope of the present technology. Accordingly, this disclosure and associated technology can encompass other embodiments not expressly shown or described herein.

As a person having ordinary skill in the art will recognize, numerous permutations of the features disclosed herein are within the scope of the present technology. For example, a counterpart of the exterior enclosure 728 (FIG. 31) can be deployed at the lodging unit 640*c* (FIG. 25). As another example, a counterpart of the compartmentalizing assembly 515 (FIG. 19) can include the ceiling components 742 (FIG. 32) and be below an airspace rather than extending all the way to the finished ceiling surface 544 (FIG. 19). Furthermore, although features of the present technology are described herein primarily in the context of providing lodging, it should be understood that the same or similar features can be implemented in other suitable contexts. For example, the method 900 and other aspects of the present technology can be practiced in the context of providing office space, residential space, assembly space, etc. In these and other cases, the "lodging units" referred to herein can instead be office units, residential units, assembly units, etc. Several examples of non-lodging real estate units compatible with features of the present technology are disclosed in U.S. Patent Application Nos. 62/222,750, 62/273,700, and 62/310,045, which are incorporated herein by reference in their entireties.

Certain aspects of the present technology may take the form of computer-executable instructions, including routines executed by a controller or other data processor. In at least some embodiments, a controller or other data processor is specifically programmed, configured, and/or constructed to perform at least one of these computer-executable instructions. Furthermore, some aspects of the present technology may take the form of data (e.g., non-transitory data) stored or distributed on computer-readable media, including magnetic or optically readable and/or removable computer discs as well as media distributed electronically over networks. Accordingly, data structures and transmissions of data particular to aspects of the present technology are encompassed within the scope of the present technology. The present technology also encompasses methods of both programming computer-readable media to perform particular steps and executing the steps.

The methods disclosed herein include and encompass, in addition to methods of practicing the present technology (e.g., methods of making and using the disclosed devices and systems), methods of instructing others to practice the present technology. For example, a method in accordance with a particular embodiment includes providing lodging to a first guest at a first lodging unit at a first interior region of a first building, providing lodging to a second guest at a second lodging unit at a second interior region of a second building, and providing lodging to a third guest at a third lodging unit at a third interior region of a third building. A method in accordance with another embodiment includes instructing such a method.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various structures. It should be understood that such terms do not denote absolute orientation. Furthermore, reference herein to "one embodiment," "an embodiment," or similar phrases means that a particular feature, structure, operation, or characteristic described in connection with such phrases can be included in at least one embodiment of the present technology. Thus, the appearances of such phrases herein are not necessarily all referring to the same embodiment. Finally, it should be noted that various particular features, structures, operations, and characteristics of the embodiments described herein may be combined in any suitable manner in additional embodiments in accordance with the present technology.

I claim:

1. A lodging network, comprising:
   a first lodging unit at a ground-floor first interior region of a first building, wherein the first lodging unit includes—
      a first bathroom that is one of portable or an assembly of reusable bathroom modules, wherein waste from the first bathroom flows above a floor surface of the first interior region laterally away from the first bathroom,
      lodging furnishings including a bed within the first interior region, and
      a first reusable barrier, wherein the first building includes a first overhead door opening through which the first lodging unit receives natural light and has direct access to a first outdoor area, wherein the first reusable barrier is at the first overhead door opening, wherein the first overhead door opening is through a first wall of the first building, wherein the first reusable barrier is a reusable overlay including a first frame and a compressible gasket disposed between the first frame and the first wall, and wherein a primary egress path from the first interior region to the first outdoor area extends through the first overhead door opening and through the first reusable barrier;
   a second lodging unit at a ground-floor second interior region of a second building, wherein the second lodging unit includes—
      a second bathroom that is one of portable or an assembly of reusable bathroom modules, wherein waste from the second bathroom flows above a floor surface of the second interior region laterally away from the second bathroom,
      lodging furnishings including a bed within the second interior region, and
      a second reusable barrier, wherein the second building includes a second overhead door opening through which the second lodging unit receives natural light and has direct access to a second outdoor area, wherein the second reusable barrier is at the second overhead door opening, wherein the second overhead door opening is through a second wall of the second building, wherein the second reusable barrier is a reusable overlay including a second frame and a compressible gasket disposed between the second frame and the second wall, and wherein a primary egress path from the second interior region to the second outdoor area extends through the second overhead door opening and through the second reusable barrier; and
   a third lodging unit at a ground-floor third interior region of a third building, wherein the third lodging unit includes—
      a third bathroom that is one of portable or an assembly of reusable bathroom modules, wherein waste from the third bathroom flows above a floor surface of the third interior region laterally away from the third bathroom,
      lodging furnishings including a bed within the third interior region, and
      a third reusable barrier, wherein the third building includes a third overhead door opening through which the third lodging unit receives natural light and has direct access to a third outdoor area, wherein the third reusable barrier is at the third overhead door opening, wherein the third overhead door opening is through a third wall of the third building, wherein the third reusable barrier is a reusable overlay including a third frame and a compressible gasket disposed between the third frame and the third wall, and wherein a primary egress path from the third interior region to the third outdoor area extends through the third overhead door opening and through the third reusable barrier,
   wherein—
      the first, second, and third buildings are spaced apart from one another,
      the lodging network includes an inventory of lodging units available for fulfilling reservations made by guests of the lodging network, and
      the first, second, and third lodging units are included in the inventory.

2. The lodging network of claim 1 wherein:
   the first reusable barrier is bolted or screwed to the first wall;
   the second reusable barrier is bolted or screwed to the second wall; and
   the third reusable barrier is bolted or screwed to the third wall.

3. The lodging network of claim 1 wherein:
   the first reusable barrier is clamped to the first wall;
   the second reusable barrier is clamped to the second wall; and
   the third reusable barrier is clamped to the third wall.

4. The lodging network of claim 1 wherein:
   the first building includes a first below-floor plumbing drain line;
   the second building includes a second below-floor plumbing drain line;
   the third building includes a third below-floor plumbing drain line; and
   the lodging network further comprises—
      a first above-floor plumbing drain line, wherein the first bathroom is operably connected to the first below-floor plumbing drain line via the first above-floor plumbing drain line, and wherein the first above-floor plumbing drain line extends laterally away from the first bathroom at least one meter within the first building, a second above-floor plumbing drain line, wherein the second bathroom is operably connected to the second below-floor plumbing drain line via the second above-floor plumbing drain line, and wherein the second above-floor plumbing drain line extends laterally away from the second bathroom at least one meter within the second building, and a third above-floor plumbing drain line, wherein the third bathroom is operably connected to the third below-floor plumbing drain line via the third above-floor plumbing drain line, and wherein the third above-floor plumbing drain line extends laterally away from the third bathroom at least one meter within the third building.

5. A lodging network, comprising:

a first lodging unit at a ground-floor first interior region of a first building, wherein the first lodging unit includes—
 a first bathroom that is one of portable or an assembly of reusable bathroom modules, wherein waste from the first bathroom flows above a floor surface of the first interior region laterally away from the first bathroom,
 lodging furnishings including a bed within the first interior region, and
 a first reusable barrier, wherein the first building includes a first overhead door opening through which the first lodging unit receives natural light and has direct access to a first outdoor area, wherein the first reusable barrier is at the first overhead door opening, wherein the first building includes a first overhead door different than the first barrier, and wherein the first overhead door is operably associated with the first overhead door opening and is stowed in an open state;

a second lodging unit at a ground-floor second interior region of a second building, wherein the second lodging unit includes—
 a second bathroom that is one of portable or an assembly of reusable bathroom modules, wherein waste from the second bathroom flows above a floor surface of the second interior region laterally away from the second bathroom,
 lodging furnishings including a bed within the second interior region, and
 a second reusable barrier, wherein the second building includes a second overhead door opening through which the second lodging unit receives natural light and has direct access to a second outdoor area, wherein the second reusable barrier is at the second overhead door opening, wherein the second building includes a second overhead door different than the second barrier, and wherein the second overhead door is operably associated with the second overhead door opening and is stowed in an open state; and a third lodging unit at a ground-floor third interior region of a third building, wherein the third lodging unit includes—
 a third bathroom that is one of portable or an assembly of reusable bathroom modules, wherein waste from the third bathroom flows above a floor surface of the third interior region laterally away from the third bathroom,
 lodging furnishings including a bed within the third interior region, and
 a third reusable barrier, wherein the third building includes a third overhead door opening through which the third lodging unit receives natural light and has direct access to a third outdoor area, wherein the third reusable barrier is at the third overhead door opening, wherein the third building includes a third overhead door different than the third barrier, and wherein the third overhead door is operably associated with the third overhead door opening and is stowed in an open state, wherein—
 the first, second, and third buildings are spaced apart from one another,
 the lodging network includes an inventory of lodging units available for fulfilling reservations made by guests of the lodging network, and
 the first, second, and third lodging units are included in the inventory.

6. The lodging network of claim 5, further comprising:
a first wall assembly including a first plurality of reusable wall components removably disposed at a periphery of the first interior region;
a second wall assembly including a second plurality of reusable wall components removably disposed at a periphery of the second interior region; and
a third wall assembly including a third plurality of reusable wall components removably disposed at a periphery of the third interior region.

7. The lodging network of claim 6 wherein:
individual reusable wall components of the first plurality of reusable wall components are stacked and interlocked within the first wall assembly;
individual reusable wall components of the second plurality of reusable wall components are stacked and interlocked within the second wall assembly; and
individual reusable wall components of the third plurality of reusable wall components are stacked and interlocked within the third wall assembly.

8. The lodging network of claim 6 wherein the first, second, and third wall assemblies have respective fire ratings of at least two hours.

9. The lodging network of claim 5, further comprising:
a first compartmentalizing assembly made up mostly or entirely of reusable wall components and reusable ceiling components removably disposed at a periphery of the first interior region;
a second compartmentalizing assembly made up mostly or entirely of reusable wall components and reusable ceiling components removably disposed at a periphery of the second interior region; and
a third compartmentalizing assembly made up mostly or entirely of reusable wall components and reusable ceiling components removably disposed at a periphery of the third interior region.

10. The lodging network of claim 9 wherein:
the first compartmentalizing assembly creates a fire separation of at least two hours between the first interior region and a neighboring interior region of the first building;
the second compartmentalizing assembly creates a fire separation of at least two hours between the second interior region and a neighboring interior region of the second building; and
the third compartmentalizing assembly creates a fire separation of at least two hours between the third interior region and a neighboring interior region of the third building.

11. The lodging network of claim 9 wherein each of the first, second, and third compartmentalizing assemblies is self supporting.

12. The lodging network of claim 5 wherein:
the first building has a total floor space of at least 10,000 square feet;
the second building has a total floor space of at least 10,000 square feet;
the third building has a total floor space of at least 10,000 square feet;
the first interior region is within a first two-hour or greater fire-rated compartment of not more than 5,000 square feet;
the second interior region is within a second two-hour or greater fire-rated compartment of not more than 5,000 square feet; and
the third interior region is within a third two-hour or greater fire-rated compartment of not more than 5,000 square feet.

13. A lodging network, comprising:
a first lodging unit at a ground-floor first interior region of a first building, wherein the first lodging unit includes—
  a first bathroom that is one of portable or an assembly of reusable bathroom modules, wherein waste from the first bathroom flows above a floor surface of the first interior region laterally away from the first bathroom,
  lodging furnishings including a bed within the first interior region,
  a first reusable barrier, wherein the first building includes a first overhead door opening through which the first lodging unit receives natural light and has direct access to a first outdoor area, wherein the first reusable barrier is at the first overhead door opening,
  a first courtyard at the first outdoor area, wherein the first reusable barrier is directly between the first interior region and the first courtyard, and
  a first exterior enclosure at least partially defining the first courtyard, wherein the first exterior enclosure includes reusable exterior wall components removably disposed at a perimeter portion of the first courtyard;
a second lodging unit at a ground-floor second interior region of a second building, wherein the second lodging unit includes—
  a second bathroom that is one of portable or an assembly of reusable bathroom modules, wherein waste from the second bathroom flows above a floor surface of the second interior region laterally away from the second bathroom,
  lodging furnishings including a bed within the second interior region, and
  a second reusable barrier, wherein the second building includes a second overhead door opening through which the second lodging unit receives natural light and has direct access to a second outdoor area, wherein the second reusable barrier is at the second overhead door opening,
  a second courtyard at the second outdoor area, wherein the second reusable barrier is directly between the second interior region and the second courtyard, and
  a second exterior enclosure at least partially defining the second courtyard, wherein the second exterior enclosure includes reusable exterior wall components removably disposed at a perimeter portion of the second courtyard; and
a third lodging unit at a ground-floor third interior region of a third building, wherein the third lodging unit includes—
  a third bathroom that is one of portable or an assembly of reusable bathroom modules, wherein waste from the third bathroom flows above a floor surface of the third interior region laterally away from the third bathroom,
  lodging furnishings including a bed within the third interior region, and
  a third reusable barrier, wherein the third building includes a third overhead door opening through which the third lodging unit receives natural light and has direct access to a third outdoor area, wherein the third reusable barrier is at the third overhead door opening
  a third courtyard at the third outdoor area, wherein the third reusable barrier is directly between the third interior region and the third courtyard, and
  a third exterior enclosure at least partially defining the third courtyard, wherein the third exterior enclosure includes reusable exterior wall components removably disposed at a perimeter portion of the third courtyard,
wherein—
  the first, second, and third buildings are spaced apart from one another,
  the lodging network includes an inventory of lodging units available for fulfilling reservations made by guests of the lodging network, and
  the first, second, and third lodging units are included in the inventory.

14. The lodging network of claim 13 wherein:
the first building includes a first below-floor plumbing drain line;
the second building includes a second below-floor plumbing drain line;
the third building includes a third below-floor plumbing drain line; and
the lodging network further comprises—
  a first above-floor plumbing drain line, wherein the first bathroom is operably connected to the first below-floor plumbing drain line via the first above-floor plumbing drain line, and wherein the first above-floor plumbing drain line extends laterally away from the first bathroom at least one meter within the first building,
  a second above-floor plumbing drain line, wherein the second bathroom is operably connected to the second below-floor plumbing drain line via the second above-floor plumbing drain line, and wherein the second above-floor plumbing drain line extends laterally away from the second bathroom at least one meter within the second building, and
  a third above-floor plumbing drain line, wherein the third bathroom is operably connected to the third below-floor plumbing drain line via the third above-floor plumbing drain line, and wherein the third above-floor plumbing drain line extends laterally away from the third bathroom at least one meter within the third building.

15. The lodging network of claim 13, further comprising:
a first wall assembly including a first plurality of reusable wall components removably disposed at a periphery of the first interior region;

a second wall assembly including a second plurality of reusable wall components removably disposed at a periphery of the second interior region; and a third wall assembly including a third plurality of reusable wall components removably disposed at a periphery of the third interior region.

16. The lodging network of claim 15 wherein:

individual reusable wall components of the first plurality of reusable wall components are stacked and interlocking within the first wall assembly;

individual reusable wall components of the second plurality of reusable wall components are stacked and interlocking within the second wall assembly; and individual reusable wall components of the third plurality of reusable wall components are stacked and interlocking within the third wall assembly.

17. The lodging network of claim 15 wherein the first, second, and third wall assemblies have respective fire ratings of at least two hours.

18. The lodging network of claim 13, further comprising:

a first compartmentalizing assembly made up mostly or entirely of reusable wall components and reusable ceiling components removably disposed at a periphery of the first interior region;

a second compartmentalizing assembly made up mostly or entirely of reusable wall components and reusable ceiling components removably disposed at a periphery of the second interior region; and a third compartmentalizing assembly made up mostly or entirely of reusable wall components and reusable ceiling components removably disposed at a periphery of the third interior region.

19. The lodging network of claim 18 wherein:

the first compartmentalizing assembly creates a fire separation of at least two hours between the first interior region and a neighboring interior region of the first building;

the second compartmentalizing assembly creates a fire separation of at least two hours between the second interior region and a neighboring interior region of the second building; and the third compartmentalizing assembly creates a fire separation of at least two hours between the third interior region and a neighboring interior region of the third building.

20. The lodging network of claim 13 wherein:

the first building has a total floor space of at least 10,000 square feet;

the second building has a total floor space of at least 10,000 square feet;

the third building has a total floor space of at least 10,000 square feet;

the first interior region is within a first two-hour or greater fire-rated compartment of not more than 5,000 square feet;

the second interior region is within a second two-hour or greater fire-rated compartment of not more than 5,000 square feet; and the third interior region is within a third two-hour or greater fire-rated compartment of not more than 5,000 square feet.

* * * * *